(12) United States Patent
Cowtan et al.

(10) Patent No.: US 7,823,068 B2
(45) Date of Patent: Oct. 26, 2010

(54) INTERNET-BASED, DUAL-PANED VIRTUAL TOUR PRESENTATION SYSTEM WITH ORIENTATIONAL CAPABILITIES AND VERSATILE TABBED MENU-DRIVEN AREA FOR MULTI-MEDIA CONTENT DELIVERY

(76) Inventors: Mark Anthony Ogle Cowtan, 5294 Alum Rock Ave., San Jose, CA (US) 95127; Nelly Illary Cedano, 5294 Alum Rock Ave., San Jose, CA (US) 95127

(*) Notice: Subject to any disclaimer, the term of this patent is extended or adjusted under 35 U.S.C. 154(b) by 582 days.

(21) Appl. No.: 11/710,894

(22) Filed: Feb. 26, 2007

(65) Prior Publication Data

US 2009/0031246 A1      Jan. 29, 2009

Related U.S. Application Data

(60) Provisional application No. 60/777,952, filed on Feb. 28, 2006.

(51) Int. Cl.
*G06F 17/30* (2006.01)
*G06F 3/048* (2006.01)

(52) U.S. Cl. .................. 715/738; 715/240; 715/243; 715/744; 715/771; 715/810

(58) Field of Classification Search .............. 715/204, 715/240, 243, 738, 771, 810
See application file for complete search history.

(56) References Cited

U.S. PATENT DOCUMENTS 6,496,842 B1 * 12/2002 Lyness ................. 715/206

* cited by examiner

*Primary Examiner*—Namitha Pillai
(74) *Attorney, Agent, or Firm*—Michael Ries

(57) ABSTRACT

A graphical user interface for a comprehensive user-friendly Internet-based multi-media dual-paned virtual tour presentation system having orientational capabilities and having an image navigation section; an image display section; and a hierarchical information organization and navigation section, where the image navigation section, the image display section and the hierarchical information organization and navigation section are provided all visible at the same time, within the visible area of one browser window.

1 Claim, 46 Drawing Sheets

| Display as | Edit | State | SubTab Default | Visible |
|---|---|---|---|---|
| Email Me | | online | ● | true |
| Email a Friend | | offline | ○ | false |
| | | offline | ○ | false |
| My Portfolio | | offline | ○ | false |
| Other Listings | | offline | ○ | false |
| My Area | | offline | ○ | false |
| | | | ○ | false |

1890 — Email Me
1895 — Email a Friend
1900 — Audio Intro
1905 — Video Intro
1910 — My Portfolio
1915 — Agency Listings
1920 — My Area Map

INTERNET-BASED, DUAL-PANED VIRTUAL TOUR PRESENTATION SYSTEM WITH ORIENTATIONAL CAPABILITIES AND VERSATILE TABBED MENU-DRIVEN AREA FOR MULTI-MEDIA CONTENT DELIVERY

This application claims the benefit of U.S. Provisional Patent Application Ser. No. 60/777,952, filed Feb. 28, 2006.

TECHNICAL FIELD AND BACKGROUND

The present invention generally relates to the field of multi-media virtual tours. More specifically, the present invention relates to internet-based multi-media virtual tours in the real estate industry.

Conventional virtual tour systems do not include the ability to switch between one category of information and another category of information with only one mouse or pointer click while being able to simultaneously view a slideshow of still photographs, panoramic images, or streaming video in a different pane.

With conventional systems, users are forced to laboriously navigate through a large quantity of material by scrolling down web pages, opening new windows or pop-up windows and waiting for web pages to load or reload.

Real estate buyers increasingly demand faster delivery of more information and higher quality information in an easy-to-use and easy-to-access format. However, using conventional virtual tour systems, users often experience disorientation. That is, a user loses a sense of knowing where they are virtually standing whenever they view an individual image, a floor plan, or any part of an entire virtual tour. Also, it is often necessary to drill several layers into conventional virtual tour systems in order to access desired information on a given listing.

Real estate buyers have also increased their demand for the different types of information related to listings. Beyond basic facts, descriptive text, property disclosures and flyers, buyers increasingly demand video footage, panoramic photography, 3D visualizations, music, audio narration and the like. Conventional systems are ill equipped to efficiently and effectively present these additional forms of information in an intelligible manner.

Current efforts by others at presenting this information to buyers suffer in that they are often limited to showing stills, panoramas and basic agent branding. Some other systems lack interactive plans and maps or lack the ability to simultaneously deliver a broad selection of additional information.

Thus, when viewing a still image of a room or a panoramic image, in the absence of a floor plan or map, it is very difficult for the user to deduce precisely whereabouts in the property the subject of the image is located, and less so, what is near to it. For example, when viewing an image of a kitchen, using conventional methods, it is difficult for the user to determine whether the kitchen is at the front or back of the house, or to know where the bedrooms are, in relation to the kitchen.

Interactive plans and maps, go some way toward solving this problem, however, interactive plans and maps alone, do not solve the entire problem, because the other half of the problem is to not sacrifice providing more detailed information about a property or agent/realtor and substantially maintaining all this information in a one screen format that is compatible with and utilizes the various screen resolutions used for displays.

Consequently conventional attempts to incorporate interactive floor plans in order to address the problem of orientation, have failed in one or more of the following three ways.

(A) Failure to show an interactive plan or map and images simultaneously. Many implementations require the plan to show in a different browser window, or require the plan to be hidden or obscured as soon as an image is invoked. If a user cannot see both plan and image at the same time, they quickly forget what their virtual position was, when they invoked the image.

(B) Failure to maximize the orientational value of a plan or map. Many implementations omit directionally positioned Symbols (e.g. camera icons) that indicate what is to be seen. In some implementations, the whole room is identified as a hot spot (when you mouse over the room it is highlighted in some way indicating it is clickable) or instead, a generic camera icon (e.g. a camera facing you the user) that has no directional indication is used as a hot-spot. Neither approach gives a clear indication of what is to be seen.

(C) Failure to provide access to other information from within the tour. That is, conventional methods fail to provide a flexible method to present and organize all types of highly desirable information that is required for an effective tour and marketing tool.

The present invention overcomes these and other problems by delivering a graphical user interface (GUI) or unified single-window viewing system for a comprehensive user-friendly Internet-based multi-media dual paned virtual tour presentation system having orientational capabilities.

BRIEF DESCRIPTION OF THE DRAWINGS

The present invention will be described by way of exemplary embodiments, but not limitations, illustrated in the accompanying drawings in which like references denote similar elements, and in which:

FIGS. 6-46 describe examples of systems and methods used to input the raw data into the present system that is used to generate the displays shown in FIGS. 1-5.

FIG. 6 shows an example of a basic flow for loading floor plans into a tour.

FIG. 7 shows an example where seven sub tabs are provided for loading a floor plan before content is loaded into the system.

FIG. 8 shows an example of a data entry screen for changing the displayed sub tab title.

FIG. 9 shows an example of a data entry screen for loading a floor plan into an empty sub tab.

FIG. 10 shows an example of a screen for previewing, deleting or reloading, a floor plan that has been loaded into a sub tab.

FIG. 11 shows an example of a drag and drop annotation wizard with a floor plan having no annotations.

FIG. 12 shows an example of a drag and drop annotation wizard with a floor plan after annotations have been added.

FIG. 13 is similar to FIG. 7 and shows an example where seven sub tabs are provided for loading floor plans and where one of the sub tabs has content loaded.

FIG. 14 depicts an example of a basic flow for loading Maps into a tour.

FIG. 15 shows an example where five sub tabs are provided for loading maps, all with no content loaded.

FIG. 16 shows an example of a data entry screen for changing the displayed sub tab label for Local Maps.

FIG. 17 shows an example of a data entry screen for loading a Map into an empty sub tab.

FIG. 18 shows an example of a screen for previewing, deleting or reloading, a Map that has been loaded into a sub tab.

FIG. 19 is similar to FIG. 15 and shows an example where five sub tabs are provided for loading maps and where one of the sub tabs has content loaded.

FIG. 20 depicts an example of a basic flow for loading Details of a Property into a tour.

FIG. 21 shows an example where eight sub tabs are provided for loading details all with no content loaded.

FIG. 22 shows an example of a data entry screen for changing the displayed sub tab label for basic data.

FIG. 23 shows an example of a data entry screen for loading one basic data elements featuring a selection of basic data elements.

FIG. 24 shows an example of a data entry screen for loading one basic data elements with data added FIG. 25 shows an example of a screen for previewing, deleting or reloading any information that has been loaded into a sub tab.

FIG. 26 is similar to FIG. 21 and shows an example where eight sub tabs are provided for loading details and where one of the sub tabs has content loaded.

FIG. 27 depicts an example of a basic flow for loading a Realtor profile into a tour.

FIG. 28 shows an example of a listing summary page with no Agent Profile loaded.

FIG. 29 shows an example of a data entry screen for loading information into a realtor profile.

FIG. 30 shows an example of a data entry screen with Realtor information added.

FIG. 31 shows an example of a list of realtors that have been created.

FIG. 32 shows the first half of an example of a virtual tour listing summary page with the selected agent or Realtor FIG. 33 shows a continuation of the listing summary page with the selected Realtor shown in FIG. 32.

FIG. 34 depicts an example of a basic flow for setting the Default Tabs and Sub tabs for a tour.

FIG. 35 shows an example of a virtual tour listing summary page with Maps selected as the Default Tab FIG. 36 shows a portion of the virtual tour listing summary, showing the fourth Tab labeled Agent 300 sub tab controls and status.

FIG. 37 depicts an example of a basic flow for loading still photographs or panoramic images into a tour.

FIG. 38 shows an example of a virtual tour listing summary page, with buttons for selecting to upload still photographs and panoramic images and video files 1950 into a tour.

FIG. 39 shows an example of a data entry screen for loading a single still photograph or panoramic image to a tour.

FIG. 40 shows an example of a data entry screen for loading a multiple still photograph or panoramic image to a tour in a batch.

FIG. 41 shows an example of a data entry screen for loading a single Video file into a tour.

FIG. 42 shows an example of a data entry screen for loading a single still photograph or panoramic image to a tour with one or more images already loaded.

FIG. 43 shows an example of a data entry screen for loading a single QuickTime file format panoramas.

FIG. 44 shows an example of a data entry screen for loading a single still photograph or panoramic image to a tour after one or more images are loaded.

FIG. 45 shows an example of a data entry screen for configuring the general appearance of the GUI to suit different industries.

FIG. 46 shows an example of a data for editing the main tab labels 2085.

DETAILED DESCRIPTION OF ILLUSTRATIVE EMBODIMENTS

Figure 1:
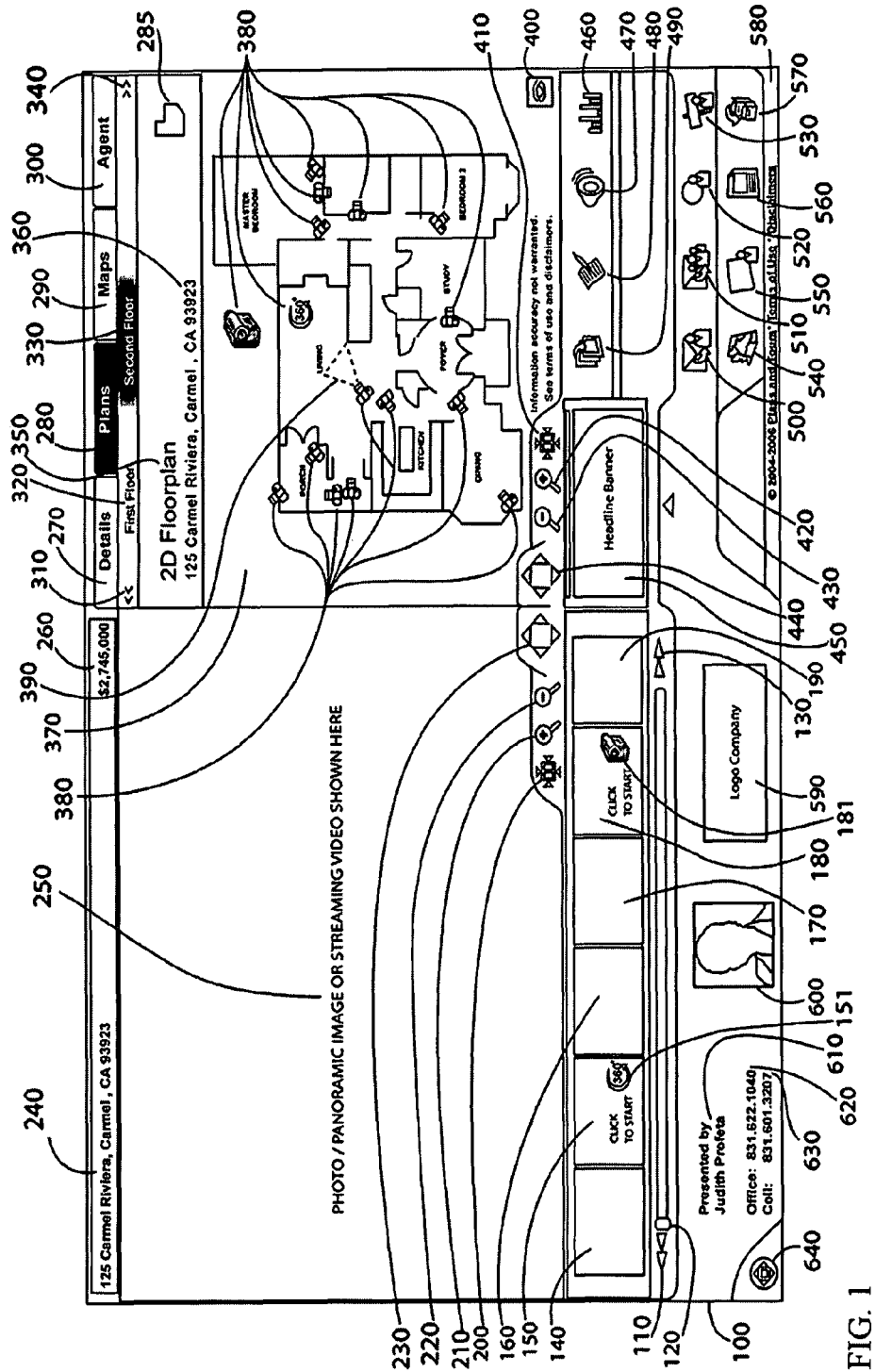
FIG. 1 is an example of a graphical user interface (GUI) for a comprehensive user-friendly Internet-based multi-media dual paned virtual tour presentation system having orientational capabilities.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation. The phrase in one embodiment is used repeatedly. The phrase generally does not refer to the same embodiment, however, it may. The terms comprising, having and including are synonymous, unless the context dictates otherwise.

The present invention comprises a unified single-window viewing system that permits the user to navigate through photographic, panoramic and moving video images contained in the tour by means of interactive plans or maps, in addition to other navigational tools. While the present invention gives users the ability to view images and plans simultaneously, it also provides a method for delivering a vast and variable amount of additional information, using different media, about the subject of the tour in an adjacent pane, all from within a unified single-window.

Compared with previous virtual tour solutions, this invention offers four distinct benefits as follows:

(A) users have an improved sense of orientation throughout the tour experience; and (B) a rich array of additional multi-media information is delivered to the user through one browser window.

(C) the architecture provides the administrator of the system the ability to offer a plurality of multi-media information without needing to alter the basic user interface as the need to offer new classes of information arises—the system has been architected with adaptability for the future and may accommodate new categories of information being added without changing the basic architecture.

(D) The unified single-window viewing system is separated from the database portion of the system, using an industry standard data interchange method utilizing XML. This allows the data in the unified single-window viewing system to be sourced from an unlimited number of different databases sources at the same time. The implications of this are far reaching. Specifically the present invention allows different operators of unified single-window viewing system to implement it in a way that is most practical for their business. Builders for example may populates the skin with content coming entirely from an existing database, while virtual tour operators may prefer to use the back-end web-based tour creation system, avoiding the cost of developing a database themselves.

The present invention is primarily intended for use in virtual tours of real-property such as residential or commercial property for sale or lease. However, other applications include virtual tours of boats, parks, museums, galleries, hotels, vacation resorts, recreational facilities, cities and the like, all of which benefit from the orienting attributes of an interactive plan or map.

While the invention enables embodiments under different themes to suit different industries such as automobile, marine, or real estate, for the sake of clarity, a residential property virtual tour will be described as the primary embodiment of the present invention.

One of many objectives of the present invention is to dramatically increase the user's sense of knowing where they are virtually standing whenever they view an individual image, a floor plan, or any part of an entire virtual tour, while another objective is to also enable users to obtain other information such as text and data about the property and about the agent selling the property.

This other information frequently required by users now includes, but is not limited to, basic facts, descriptive text, property disclosures and flyers. Also, the present invention is particularly adapted to meet increased demand for multimedia presentations of information, video footage, 3D visualizations and the like. There is a vast array of marketing and factual information that users want to see and agents want to deliver.

The present invention, featuring simultaneous viewing of images alongside interactive plans or maps, addresses this problem at its core. It gives users a clear appreciation of the distribution of rooms or buildings, while Symbols upon the Plans or Maps give users clear visual cues about the available content to be viewed.

In real-estate marketing applications the additional information is numerous and varied in format, and includes but is not limited to the following:

(1) Agent information (agent profile, contact information, video introduction, audio introduction, current listings, sold portfolio, other listings in office, and the like)

(2) Property information (basic data, descriptive text, feature list, flyers, video, audio, disclosures, and the like)

(3) Floor plan information (2D plans for multiple floors, 3D plans for multiple floors and from different points of origin, 3D walkthroughs, 3D Flyaround and the like)

(4) Maps and Aerial imagery (maps in different scale, maps in different styles (e.g. satellite imagery, street maps, landmarks, points of interest, and the like)

(5) Listing information (MLS identifier, visitor statistics, headline banners (e.g. Sales Pending/Open house, and the like)

The present invention directly addresses the requirement for additional information, both for information elements that are commonly required now, and information elements that will likely be required in the future. Furthermore, the invention has a flexible architecture that provides the flexibility to adapt to include additional features and media types that may be required. The invention provides an adaptable two-tier menu system for delivering all-manner of information in a variety of multi-media formats: audio, video, graphics, tabular text, descriptive text, bullet text, file downloads, real-time database content, Agent communication tools, Web URLs and more.

The present invention features a unified single-window viewing system. A significant characteristic of this invention is that all information pertaining to the object of the virtual tour is presented and contained within a single internet browser window user interface that features two principal panes containing user-selectable information. Both areas are visible simultaneously at all times, and may each be either operated independently or may be operated together by the user clicking on certain information in one pane that is designed to invoke and present related information in the other pane.

Without this characteristic, other attempts to provide this wealth of information, have resorted to using multiple web pages or multiple instances of internet browser windows or additional pop-up windows and have not succeeded in unifying all the information within a single internet browser window.

The present invention also features an Images Presentation Pane This is a combination of image display section and image navigation section. This pane is used exclusively for previewing, selecting and presenting images (still photographs, full panoramic, partial panoramic, and moving video images) to the user. It may be controlled entirely independently of any other part of the user interface, or in conjunction with the other pane One additional aspect of the invention exhibited in the images presentation pane, is the re-alignment of images during the slideshow. When presenting a slide show, the system steps through each of several thumbnails, indicating which one is the active image displayed in the main image window called image display section, and centers it in the middle of the thumbnail area. The benefits are two-fold. Firstly, the action of bringing previously hidden images into view in the thumbnail area, reveals to the user that there are several more images available, and secondly, when the slideshow stops, the user is left with the most recently displayed images in the thumbnail area. This is another way in which the user is aided in being oriented in the tour.

The present invention incorporates a Rich Media Presentation Pane or hierarchical information organization and navigation section. This pane is for presenting a wide array of Rich Media information independently of, and in conjunction with, the Images Presentation Pane. This pane is designed to support various media types: audio, video, graphics, tabular text, descriptive text, bullet text, file downloads, real-time database content, Agent communication tools, Web URLs and the like. The various types of information are grouped together in meaningful ways by way of an adaptable two-tier menu system or tabbed interface that may be the hierarchical information organization and navigation section.

The Rich Media presentation pane provides as a benefit the capability to present interactive plans and interactive maps (as described above) as well as ready access to much more information in one virtual tour presentation, than has previously been possible to contain and deliver, without requiring additional pop-up windows or browser windows to be opened, or requiring the user to scroll down to view information that is not displayed in the visible area of a single internet browser window. The present invention performs these functions while being able to view still photographs, panoramic or moving video images at the same time and without disruption.

In the present invention, there are specific user features of viewer system. A specific characteristic of this invention is that it is possible for a user to navigate through the virtual tour images via the plan, and is able to see both images and plan at the same time.

It is a further specific characteristic of this invention that all the information pertaining to the subject of the virtual tour is contained and accessible entirely within a single unified viewing window, without requiring secondary windows to be loaded. With the exception of links to separate websites or web pages stipulated at the request of the agent.

A specific characteristic of this invention is the provision of shortcuts to sub-sets of information contained within the Rich Media presentation pane, that have higher importance, such as local map or schools map, flyers, to give the visitor faster access to the most vital information and a choice of ways to reach it. Likewise, it is a specific characteristic of this invention that the viewer has a choice of three alternate methods (symbols on plans or maps, image thumbnails under the main image, image list in the rich-media pane) to select any individual image—both these characteristics contribute to easier navigation to the vast array of information.

Another characteristic of this invention is support for links to images in the image display section of the Images presentation pane from text pages within the rich-media presentation pane. These provide yet another mechanism for pin-point navigation to important features of a property. For example, the text may refer to an attractive fireplace, and the user can click on a Symbol positioned next to the word fireplace, to invoke the fireplace image in the Images presentation pane.

The benefits of the unified single-window viewing system architecture include the following: The unified single-window user interface is intended to be the consumer or users primary, if not sole, means of viewing and interacting with the information being presented. By combining an Image Viewing presentation pane with a multi-level Rich Media presentation pane, this invention gives the user of the tour unsurpassed accessibility to all manner of information being presented in the tour, with the flexibility to quickly switch between categories of information, without getting lost or confused because they can always return to the orienting plan or map. Furthermore, by keeping the user contained within a unified single-window viewing system, the information is presented to them in a consistent fashion that is easier to navigate, than if it is scattered across multiple windows, or contained below the visible viewing area of the internet browser window. If the user is required to scroll down to view something that is not presently visible, they are necessarily moving other items of information that were previously visible, out of sight, making it difficult for the user to assimilate the information, or remember it. This is disorienting.

The present invention also includes a back-end, web-based tour creation system. In addition to the unified single-window viewing system for use by consumers (FIGS. 1-5), the invention also includes the back-end systems required to construct dual-paned virtual tours that contain an image display section, an image navigation section and a hierarchical information organization and navigation section (FIGS. 6-32). This includes a complete web-based listing administration application that enables tour producers or operators of the system (staff and affiliates of the company) to upload, download, delete or maintain images, maps and plans, video and audio files and textual information, from anywhere in the world via the internet. Further the architecture of this system allows for information to be loaded into the unified single-window viewing system from, not only the back-end system that is part of this invention, but also from ANY database. For example, a builder could utilize only the unified single-window viewing system, and not the back-end web-based tour creation system, populating the unified single-window viewing system entirely with information already contained within their existing databases. This would require the builder writing additional software to provide link information about the database and file locations of the content to be shown in the front-end, in a manner that is consistent with the XML interface specification defined for loading content into the unified single-window viewing system. This topic is also mentioned later in this section.

Another characteristic of this invention is that all changes implemented in the back-end, web-based tour creation system, the loading of a plan, the moving of an annotation, the naming of an image, the changing of default tab or sub tab settings, in fact any change affecting the content to be displayed or configuration settings of the unified single-window viewing system, are reflected immediately in real-time to any user that subsequently uses unified single-window viewing system. If a user is currently viewing a tour, and the content is changed. They will not see those changes. But if they refresh the internet browser window, or close and then reload the tour, all the changes will be apparent. There is no requirement to "publish" the tour per-se.

In contrast, there are currently tour creation applications that are limited to PC based models running specialized software. There are two principal penalties from a PC-based approach:

(A) It is not possible to make real-time changes to information, since it is necessary to first apply the changes on local copy on a desktop computer, and then upload the tour to the internet as a separate step in order to publish the changes.

(B) Although it is feasible, with the added cost of virtual private networks, additional internet security and shared data repositories, it is not practical for different contributors in different locations to play a part in creating the tour over the internet.

Figure 19:
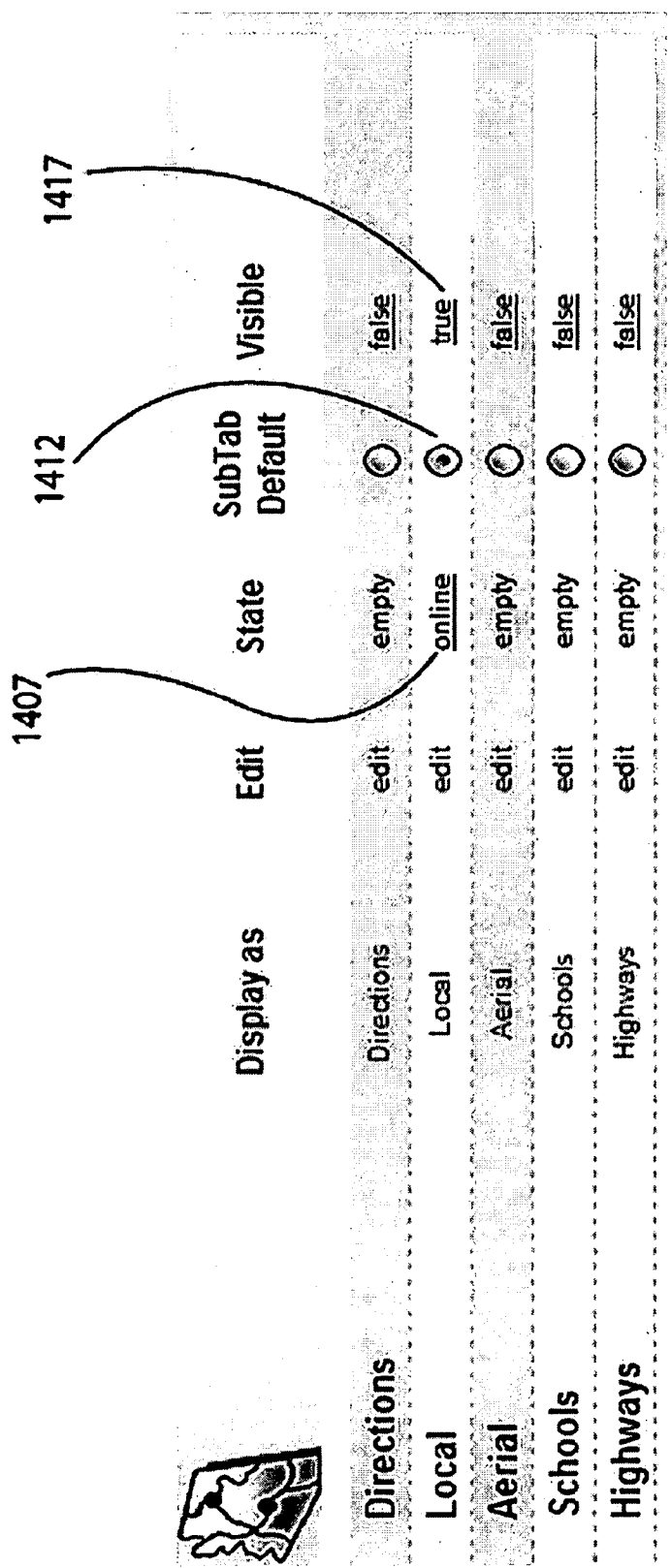

The listing administration system or "back-end web-based tour creation system" featured in this invention, enables tour producers with no special software other than a web-browser to upload any content and completely control which tabs and sub tabs containing content are made visible. Each page is made visible according to there being applicable content, and according to Visibility settings 1417 as shown in FIG. 19 that are selected by the tour producer. Thus, each listing can be tailored to match the available content. This is accomplished in real-time, resulting in immediate effectiveness of changes. The tour producer can control every element of the tour, in real-time, from any Internet connection.

In particular, another specific characteristic of this invention is that a tour producer has the ability to drag-and-drop various types of symbols, and overlay them on the plan or map or other sub tabs in the Rich Media presentation pane, to represent images or other types of information. At least three classes of Symbols can be overlaid on plans and maps: Image Symbols, Hyperlink Symbols and Information Symbols.

A specific characteristic of this invention is that the Image Symbols give a clear indication of (A) the type of image being represented (still photographs, panoramic images or video images), (B) the approximate position from where the image was captured, and (C) the approximate field of view that can be seen if the image is viewed. In addition, these indications are given implicitly without requiring the user of the tour to click on the image. This feature of the invention is achieved by having directionally oriented Image viewing icons that are positioned approximately where the photographer was standing when the shot was taken (point of origin and orientation), and show the image orientation in the direction of the object of the shot. Panoramic images may be represented by an Icon that implies 360 degree field of view, and partial panoramas may be represented by an Icon that implies approximately 180 degree field of view. Image Symbols additionally have mouse-over effects to further reinforce the information described above Example. FIG. 1 item 390 shows a cone shape emanating from the camera symbol to represent the likely field of view that would be seen by the user if they were to click on that camera symbol Another specific characteristic of this invention is that the Hyperlink Symbols shown on Plans or Maps or other pages in the Rich Media presentation pane, provide a mechanism to re-load the viewing window with an entirely different subject (i.e. another property). An example application is a local map showing other properties in the same price range in the same area. Upon clicking of a Hyperlink Symbol representing a different property, the unified single-window viewing system may be re-loaded with new content relating to that property. This gives the user a fast, efficient way to switch from property to property, without closing and reloading web-pages, or having to search for other properties outside of the confines of the unified single-window viewing system. Another application of this is for builders and property developers who wish to show a selection of model homes with different designs. In such an example the map could show a real or fictitious street showing one example of each model home. On clicking on a different model home symbol on the map, a tour for that model home could replace the tour currently on display, in the same internet browser window. Similarly a real-estate agent can show other listings he/she has on the market by way of Symbols on a map.

Another specific characteristic of this invention is that Information Symbols can be overlaid on a plan or map or other pages in the Rich Media presentation pane. The Information Symbols may vary in form, for example, as follows: Text Boxes containing textual information (e.g. providing descriptive information about an easement); Shapes (e.g. a shape showing the perimeter of easement, or shapes representing items of furniture) or Icons (e.g. an Icon representing the position of School, or an Icon indicating the direction of North).

The present invention utilizes Database Independent Architecture. Another specific characteristic of this invention is that it is database independent. The front-end utilizes an XML-based separation layer, making it possible to feed information into the front end from one or more databases owned or controlled by different entities. Specifically this makes it possible for a Virtual Tour company to rapidly adopt the front end and to populate it with data fed from their own back-end systems and database, without requiring any modification of the front-end software whatsoever. The present invention includes a hierarchical information organization and navigation section that promotes content flexibility. The present invention allows complete flexibility as to which type of content is delivered in the hierarchical information organization and navigation section.

The present invention makes it is possible to choose a default configuration of what is displayed in each pane for each tour. As such, for each tour, it means the virtual tour can open with a wide variety of appearances. The combination of an image display section and hierarchical information organization and navigation section results in a dual paned virtual tour presentation system, which allows a wide variety of starting points for the tour. For example, using the present invention, a tour could start out with high definition still images, partial panoramic images, full 360 degree panoramic images or streaming video content in the image display section and any one of the following in the hierarchical information organization and navigation section: a map of the local area, a map showing local schools, a first floor plan, a 3D landscape plan, a 3D rendering, a 3D animation, descriptive text, basic data, a list of features, a map of similar priced homes, a list of similar priced homes, a video flyover of the property, an audio tour of the property, an agent profile, a video greeting by the agent and the like.

The unified single-window viewing system allows that a color scheme may be defined for each agent to match with the brand colors for their respective agency. In the present invention, the original resolution of the images plans and maps used in the ultimate display is typically much higher than the window in which they are displayed. (this is what we mean by high definition). The system permits any supported image plan or map size and any supported image, plan or map resolution. For example, using the present invention, a 20 MB image file or floor plan could be loaded in the system, but such image would be displayed quickly as a 2 MB file. The high definition information contained in the high resolution image is still available to the user using the zoom and pan features. In the present system, high definition images are loaded and reduced to a smaller, more manageable size for initial loading. Then, if a user wishes to see more detail, they can zoom in and out of the image, plan or map. Given these capabilities it is not mandatory to use high definition images, the choice of resolution and depth of zooming may be decided by the tour producer, on a case-by-case basis, one image at a time.

The present invention is adapted to support video content in either the image display section or the hierarchical information organization and navigation section of the dual paned virtual tour presentation system. For example, a user could view a slideshow in the image display section and view a video in the hierarchical information organization and navigation section, in one moment, or a user could view one video in the image display section, and simultaneously view another video in the hierarchical information organization The present system may be adapted to have a default mode such that, when a tour of the present system starts, the tour begins with a slideshow in the image display section. The slideshow would step sequentially through the still photographic images in the order shown in the image navigation section. Alternatively the tour may begin with a panoramic image in the image display section, that continues rotating and does not switch to another image automatically.

The present invention is directed to a comprehensive user-friendly Internet-based multi-media dual-paned virtual tour presentation system having orientational capabilities. The present invention may include one or more of the following methods: a dashboard concept, an intuitive interface, a single-screen display, avoidance of the need to drill through multiple layers of web pages to access desired information, image swaps, disjointed or local image swaps, mouse-over effects, mouse-click selection methods, single or multiple within-window tabs, internal and external databases, proprietary and non-proprietary information sources, context-sensitive navigation and screen resolution auto sensing.

FIG. 1 is an example of a graphical user interface (GUI) 100 for a comprehensive user-friendly Internet-based multi-media dual-paned virtual tour presentation system having orientational capabilities. Throughout the present specification, it is to be generally understood that "image" is not limited to any one type of visual image information (e.g. still photographs, full panoramas, partial panoramas or video), but includes all types of visual image information including all types of digital visual image information. The GUI 100 may comprise one or more of the following features described in detail below and shown in FIG. 1, some or all of which may be provided on a single computer display screen at one time or all visible at the same time, within the visible area of one browser window:

(1) an image navigation section 110-190 comprising one or more of the following: a left select button 110, a slide bar 120, a right select button 130, a first thumbnail 140, a second thumbnail 150, a third thumbnail 160, a fourth thumbnail 170, a fifth thumbnail 180 and a sixth thumbnail 190; Potentially one could see 7 thumbnails—you could see half of one on the left side. 5 in the middle, and half of a $7^{th}$ on the right hand side of the image navigation section. Thumbnail images may carry an overlay with a panorama image indicator icon 151 or a video image indicator icon 181.

(2) an image display section 200-260 comprising one or more of the following: a reset button 200, a zoom in button 210, a zoom out button 220, a multi-directional pan button 230, a first property address field 240, a photographic or panoramic image or streaming video display section 250 and a property sale price field 260;

(3) a hierarchical information organization and navigation section 270-440 comprising one or more of the following: a first tab 270, a second tab 280, a second tab icon 285, a third tab 290, a fourth tab 300, its understood the architecture allows for an unlimited number of tabs then discussed here e.g. Services, a left select button 310, a first sub tab 320, a second sub tab 330, a right select button 340, a sub tab title 350, a second property address field 360, a plan-based navigation system 370 comprising a plurality of photograph, panorama or video point of origin and orientation icons 380, a mouse-over icon 390, a hide button 400, an image reset button 410, a zoom in button 420, a zoom out button 430 and a multi-directional pan button 440;

(4) a headline banner area 450;

(5) a user control button section 460-490 comprising one or more of the following: an audio playing indictor/volume control button 460, an audio on/off button 470, a disclaimers button 480 and a start/stop slideshow button 490; and (6) supplemental information (this area is for shortcuts and external links) section 500-640 comprising one or more of the following: a first supplemental button 500, a second supplemental button 510, an agent home page link button 520, an agent portfolio shortcut button 530, a local map shortcut button 540, a school information shortcut button 550, a flyers shortcut button 560, a disclosures shortcut button 570, a supplemental links and copyright notice section 580, a company logo field 590, an agent or realtor photo field 600, a name field 610, an office telephone number field 620, a cellular telephone number field 630 and an external webpage link 640. Fields 590, 600, 610, 620 and 630 may be populated, for example, in a manner described with reference to FIGS. 27-32.

As a default mode, the system of the present invention is adapted to display one image or video at a time from among a plurality of full size images or videos in the photographic or panoramic image or streaming video display section 250 that may be in a repeating slideshow mode. In the image navigation section 110-190, optionally, a user can select the left select button 110, the slide bar 120 and the right select button 130 to navigate between a potentially unlimited number of thumbnails associated with images regarding the subject property. In the example shown in FIG. 1, the user is presented with five complete thumbnails 140-180 and a sixth partial thumbnail 190. In this example, if there are more than six images in the image navigation section 110-190, the user can use the slide bar 120 to quickly navigate amongst the plurality of thumbnail images. A user may select one of the thumbnails to display a corresponding full size image in the photographic or panoramic image or streaming video display section 250.

As noted above, in a default mode, the image display section 200-260 may run in a slideshow mode. Optionally, a user may interact with the image display section 200-260 by use of the image reset button 200, the zoom in button 210, the zoom out button 220 and the multi-directional pan button 230. For example, upon clicking on one of the buttons 200-230 noted above or by clicking directly with the image displayed in photographic or panoramic image or streaming video display section 250, the slideshow exits slideshow mode and permits the user to zoom in and out and pan within the image displayed in the photographic or panoramic image or streaming video display section 250. If the user wishes to return to the default mode for that image, the user may select the image reset button 200. Once a user interacts with an image in this way, the slideshow would be halted. Similarly by interacting with any of the plurality of photograph, panorama or video point of origin and orientation icons 380 while in slideshow mode, would result in the slideshow being halted. The first property address field 240 and the property sale price field 260 or any other suitable type of information may also be provided in the image display section 200-260. Also, when a user clicks on the photographic or panoramic image or streaming video display section 250, the system may be adapted to perform a default function, such as zooming in—this depends on the size and resolution of the image.

A second level of control is added with the hierarchical information organization and navigation section 270-440. The hierarchical information organization and navigation section 270-440 enables delivery of a variable number of additional items in a variety of multi-media formats, that are grouped into a number of different categories, and share the space enclosed by items 270-440. The hierarchical information organization and navigation section 270-440 may, in some instances, be used to advantageously interact with the information presented in the image display section 200-260.

As a result of this design, a user can switch between one category of information and any other category of information with only one click, in addition to being able to simultaneously view a slideshow of stills or panoramic images, or video in the image display section. Also, a user can rapidly navigate through a large quantity of material without scrolling down web pages, opening new browser windows or pop-up windows, waiting for web pages to reload, etc. This system allows for much more material than could possibly ever fit on a single page in the field of view of the user without requiring either a vertical overflow (scrolling down) or overflow to additional browser windows. Further, a user gets a much better sense of where they are virtually standing, as a result of tightly integrated interactive floor plans, in combination with improved information management, and delivery of that information in a manner that does not require refreshing or reloading the entire viewable area, as would be the case with conventional web pages.

Figure 2:
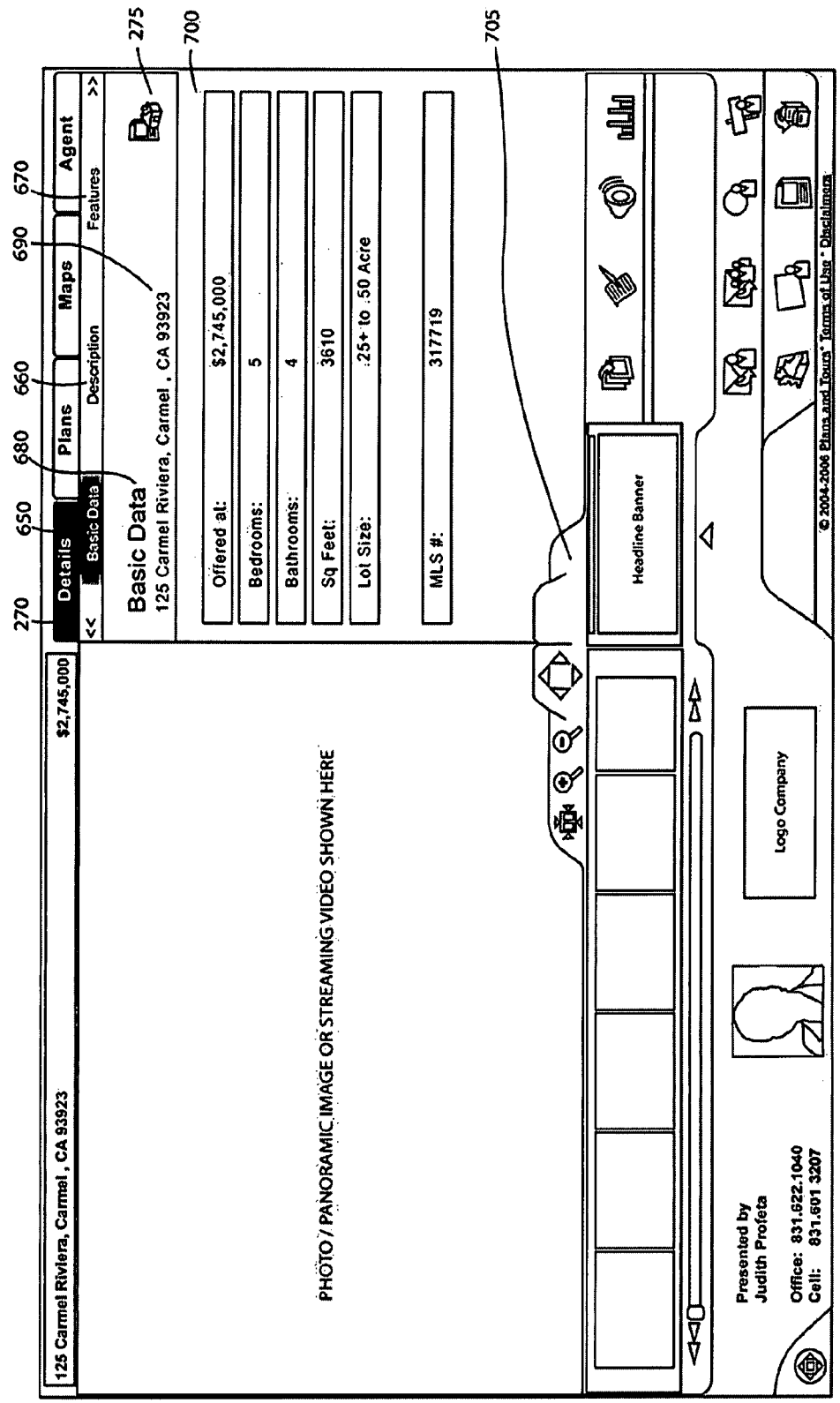
FIG. 2 is an example of the present invention when a first tab 270 is selected by a user.

Specifically, the first tier of the hierarchical information organization and navigation section 270-440 includes first through fourth tabs 270, 280, 290 and 300 however it's understood any number of tabs could be used. In one example, the first tab 270 is labeled "Details," the second tab 280 is labeled "Plans," the second tab icon 285 is a graphic symbol corresponding with the content of the second tab, the third tab 290 is labeled "Maps," and the fourth tab 300 is labeled "Agent." When the first tab 270 labeled "Details" is selected by a user, an example of the resulting information is shown in FIG. 2.

Figure 3:
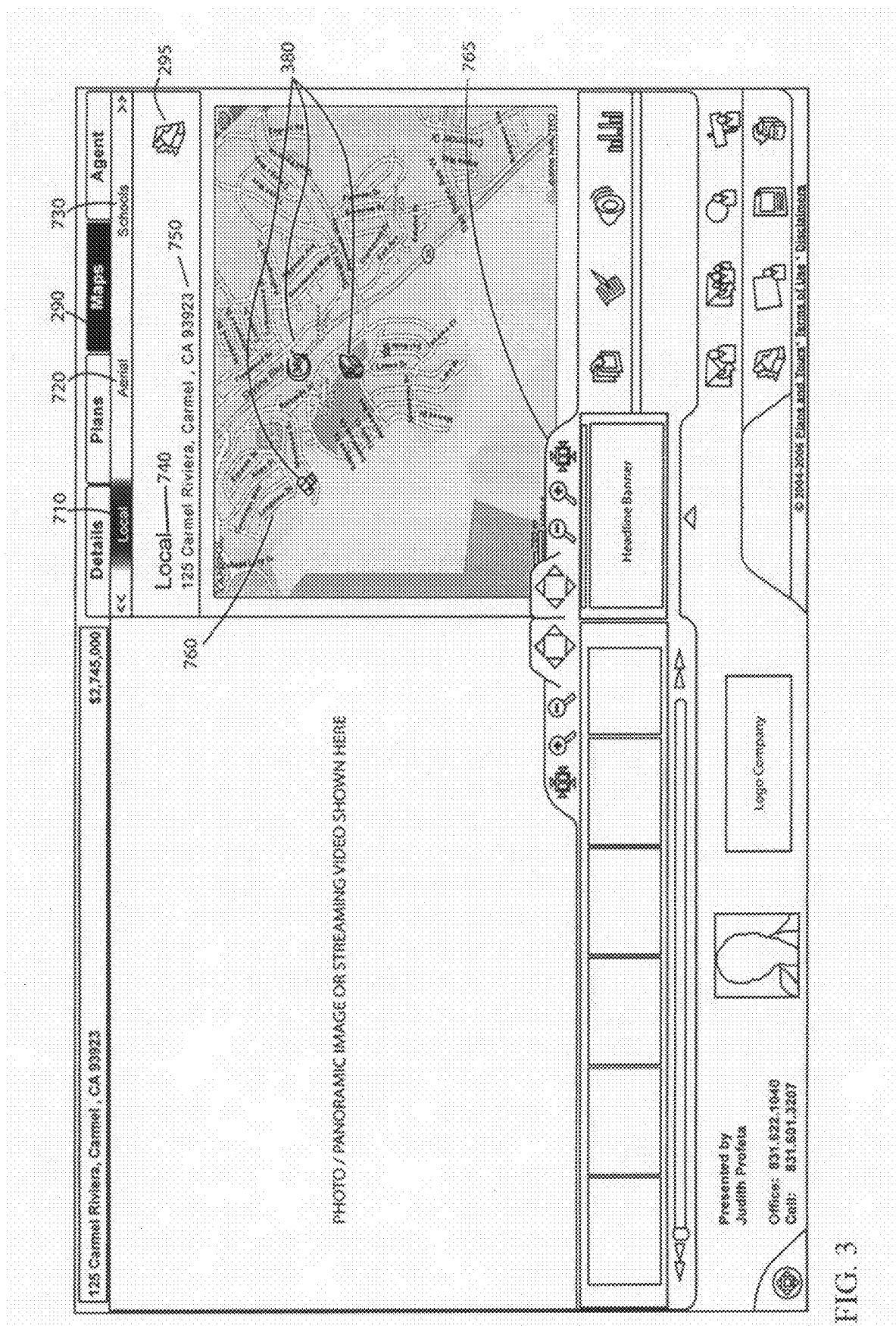
FIG. 3 is an example of the present invention when a third tab 290 is selected by a user.
Figure 4:
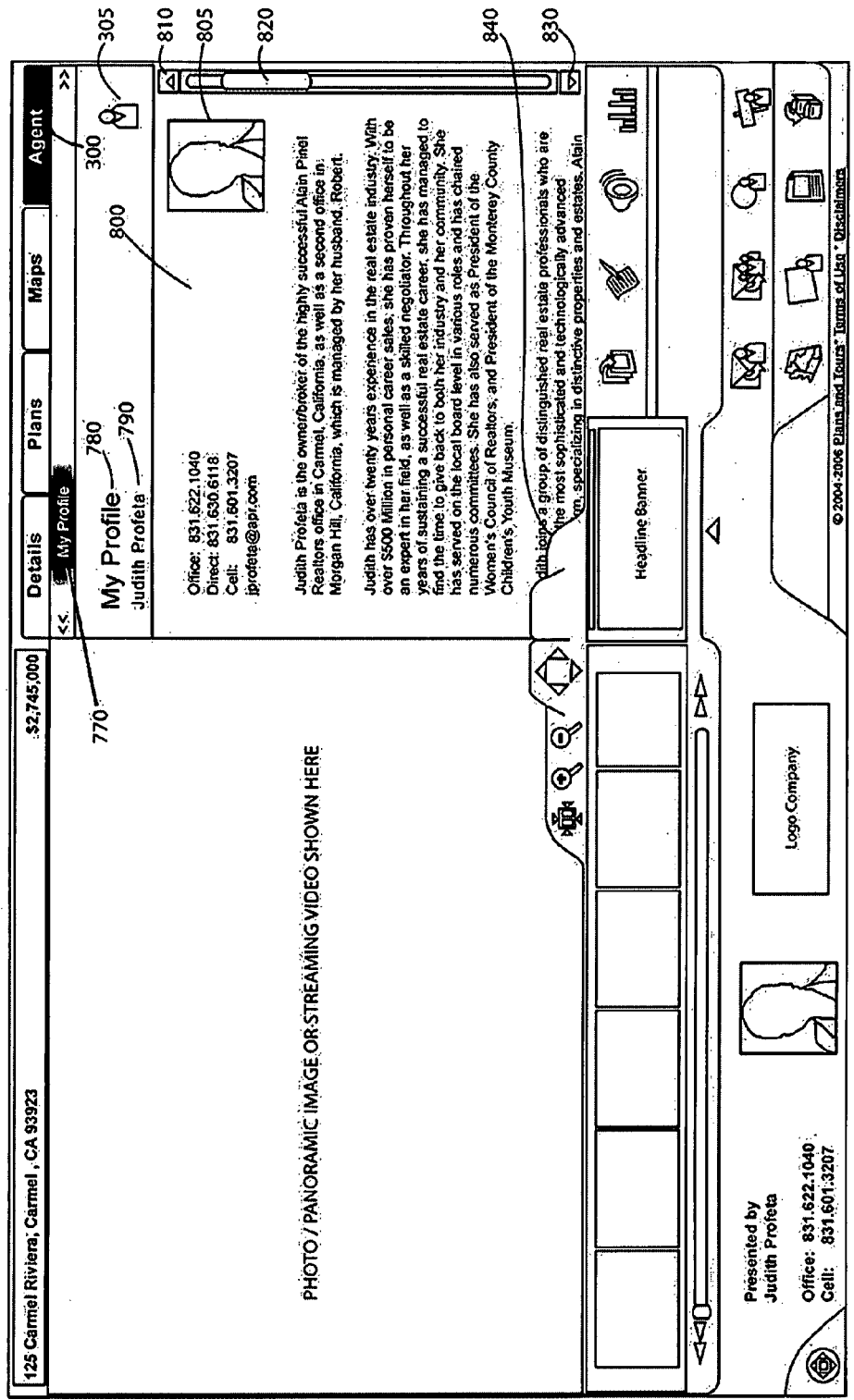
FIG. 4 is an example of the present invention when a fourth tab 300 is selected by a user.

When the second tab 280 labeled "Plans" is selected by a user, an example of the resulting information is shown in FIG. 1. When the third tab 290 labeled "Maps" is selected by a user, an example of the resulting information is shown in FIG. 3. When the fourth tab 300 labeled "Agent" is selected by a user, an example of the resulting information is shown in FIG. 4. Any of the four tabs noted above may be selected as the default tab for the system.

The second tier of the hierarchical information organization and navigation section 270-440 includes a plurality of sub tabs. For example, the "Plans" tab may include a sub-section comprising the left select button 310, the first sub tab 320 labeled "First Floor," the second sub tab 330 labeled "Second Floor" and the right select button 340. If there are more sub-sections than can be displayed in the space provided in the section 270-440, the left and right select buttons 310, 340 would become activated and may be used to navigate between multiple sub tabs. The section 270-440 may further comprise informational fields such as the sub-section title 350 and the second property address field 360.

In one example, the hierarchical information organization and navigation section 270-440 includes the plan-based navigation system 370, which displays an image corresponding with a floor plan for the subject property. Each of the plurality of photograph, panorama or video point of origin and orientation icons 380 corresponds with one of the photographs or videos from the thumbnails in the image navigation section 110-190, each of which is displayed in the image display section 200-260. Optionally, a user can select images or videos shown in the system 370 in a different order than the default order used in the slideshow. For example, one user may prefer to start the tour by viewing the kitchen and bathroom first; whereas, another user may prefer to start the tour by looking at external photographs, panoramic images or videos. The system 370 allows a user to navigate through the tour without losing a sense of what part of the property is currently being viewed in the image display section 200-260. In other words, the system 370 helps a user maintain a sense of orientation within the virtual environment. If a user orients the mouse pointer over one of the icons 180, the mouse-over effect 390 may be displayed and upon a mouse click a corresponding image may be displayed in the image display section 200-260. While that image is being displayed in the photographic or panoramic image or streaming video display section 250, the color of the photograph, panorama or video point of origin and orientation icons 380 may appear differently and the mouse-over icon 390 may remain exposed—thereby indicating where the user is virtually standing. The hide button 400 may be selected in order to hide the icons 380 and allow unobstructed display of the floor plan or image shown in system 370. The reset button 410, the zoom in button 420, the zoom out button 430 and the multi-directional pan button 440 operate in a manner similar to the image reset button 200, the zoom in button 210, the zoom out button 220 and the multi-directional pan button 230, respectively, described above, except that buttons 410-440 are provided to perform their respective functions in the plan-based navigation system 370. These same button 410-440 operate in the same manner for all types of images presented on any Tab or Sub tab of the hierarchical information organization and navigation section, for example on maps.

The headline banner area 450 may be provided to display information such as the status of the property, i.e. "FOR SALE," "PRICE REDUCED," "SOLD," "UNDER CONTRACT, OPEN HOUSE THIS WEEKEND" and the like. The headline banner area 450 may use any suitable type of static or animated image or video.

The user control button section 460-490 is optional and may be provided at any suitable location within the display. The audio playing indictor/volume control button may be used to indicate that audio is playing, and, once clicked to allow the user to alter the audio playback volume. The audio on/off control button 470 may be used to mute and un-mute the audio playback. The disclaimers button 480 may be used to access legal information about the listing. The start/stop slideshow button 490 may be used to start and stop the slideshow being displayed in the image display section 200-260.

The supplemental information section 500-640 is optional and may be provided at any suitable location within the display. In one example, one or more of the home page link button 520, agent portfolio shortcut button 530, the local map shortcut button 540, the school information shortcut button 550, the flyers shortcut button 560, the disclosures shortcut button 570, the supplemental links and copyright notice section 580, the company logo field 590, the agent or realtor photo field 600, the name field 610, the office telephone number field 620, the cellular telephone number field 630 and the external webpage link 640 may be provided as needed or desired. The first through second supplemental buttons 500, 510 are shown for illustrative purposes and may perform one or more of the following functions: hyperlinks, e-mail, editing, interfacing, and the like.

As shown in FIG. 2, when the first tab 270 labeled "Details" is selected by a user, the resulting information may be the same as described with respect to FIG. 1 as noted in detail above except as follows: the "Details" tab may comprise a sub-section comprising the first sub tab 650 labeled "Basic Data," the second sub tab 660 labeled "Description" and the third sub tab 670 labeled "Features." Also, a first sub tab icon 275 is a graphic symbol corresponding with the content of the first sub tab. As shown in FIG. 21, there are additional sub tabs 671-675 that are accessible through use of the left and right select buttons 310, 340 as follows: "Flyers" sub tab 671, "Video Walk thru" sub tab 672, "Video Fly Around" sub tab 673, "Disclosures" sub tab 674 and "Hit Counter" sub tab 675. This section may further comprise informational fields such as the sub tab title 680 and the third property address field 690. This section is adapted to display one or more information fields 700, which are populated, for example, in a manner described with reference to FIGS. 20-26. Since it is not generally necessary to pan, zoom and reset the information displayed in this section, the buttons 410-440 as described in FIG. 1 may be replaced with a non-functional decorative border 705 or may be eliminated entirely.

As shown in FIG. 3, when the third tab 290 labeled "Maps" is selected by a user, the resulting information may be the same as described with respect to FIG. 1 as noted in detail above except as follows: the "Maps" tab may comprise a sub-section comprising the first sub tab 710 labeled "Local," the second sub tab 720 labeled "Aerial" and the third sub tab 730 labeled "Schools." Also, a first sub tab icon 295 is a graphic symbol corresponding with the content of the first sub tab. As shown in FIGS. 15 and 19, there are additional tabs 708 and 732 that are accessible through use of the left and right select buttons 310, 340 as follows: "Directions" sub tab 708 and "Highways" sub tab 732. This section may further comprise informational fields such as the sub tab title 740 and the fourth property address field 750. This section is adapted to display one or more information fields 760, which are populated, for example, in a manner described with reference to FIGS. 14-19. Since it is generally necessary to pan, zoom and reset the information displayed in this section, the buttons 410-440 as described in FIG. 1 may be maintained in the navigation control bar 765.

As shown in FIG. 4, when the fourth tab 300 labeled "Agent" is selected by a user, the resulting information may be the same as described with respect to FIG. 1 as noted in detail above except as follows: the "Agent" tab may comprise a sub-section comprising the first sub tab 770 labeled "My Profile." Also, a fourth sub tab icon 305 is a graphic symbol corresponding with the content of the first sub tab. This section may further comprise informational fields such as the sub tab title 780 and a realtor name field 790. This section is adapted to display one or more information fields 800 including an realtor or agent photo field 805, which are populated, for example, in a manner described with reference to FIGS. 27-32. Since the information contained in this section is often lengthy, up scroll button 810, slide bar 820 and down scroll button 830 may be provided to facilitate navigation. Since it is not generally necessary to pan, zoom and reset the information displayed in this section, the buttons 410-440 as described in FIG. 1 may be replaced with a non-functional decorative border 840 or may be eliminated entirely. As shown in FIG. 36 there are additional sub tabs 1890-1920 that are accessible through use of the left and right select buttons 310, 340, depending on whether or not they contain content.

Figure 5:
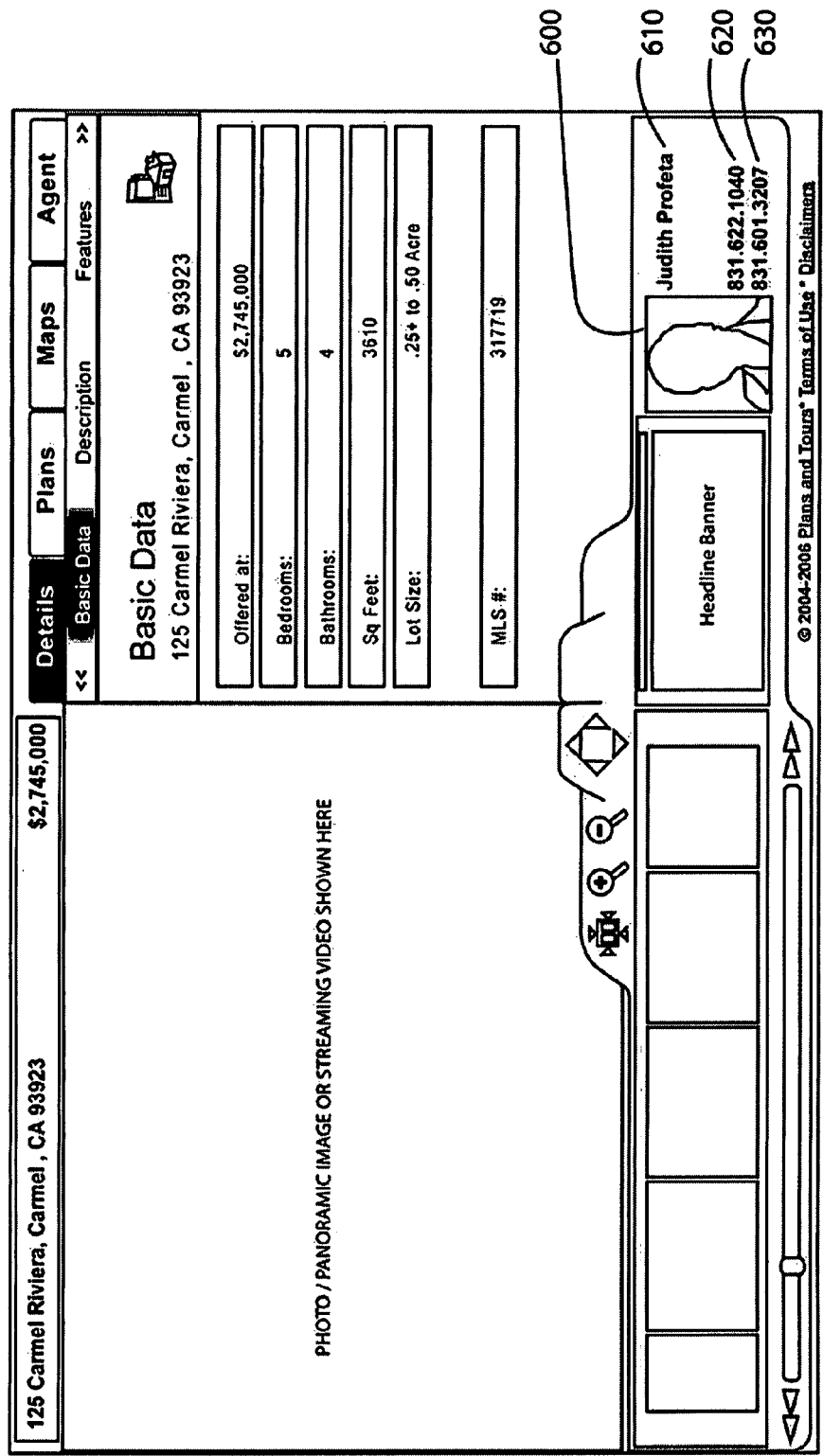
FIG. 5 is an example of the present invention when a first tab 270 is selected by a user (similar to FIG. 2) and when displayed using a display having a relatively lower resolution.

The present invention incorporates screen resolution auto sensing. For example, FIGS. 1-4 show an example of the present invention when displayed using a relatively high resolution display, for example, 1024×768 pixels or higher. FIG. 5 shows an example of the present invention when displayed using a display having a resolution of 800×600 pixels. When the system detects a lower resolution screen, the present system is adapted to show a different manifestation of the unified single-window viewing system by using a different layout or skin which removes portions of the display that are deemed optional. While the dimensions of the image display section, image navigation section and hierarchical information organization and navigation section differ from the dimensions used in the skin for high-resolution screens, the operation of these sections would be the same. For example, FIG. 5 is similar to FIG. 2, except that the buttons, links and fields 460-590 are not displayed, and the fields 600-630 replace the space occupied by the buttons 460-490 of FIG. 2. Also there are fewer thumbnails in the image navigation section of FIG. 2. It is to be generally understood that the differences between FIGS. 2 and 5 are merely exemplary and that any suitable configuration may be developed by the operator of the present invention including any number of different skins could be implemented FIGS. 6-46 describe examples of systems and methods used to input the raw data into the present system that is used to generate the displays shown in FIGS. 1-5. These examples are not meant to be limiting and may be modified to meet the needs of the individual user.

Figure 6:
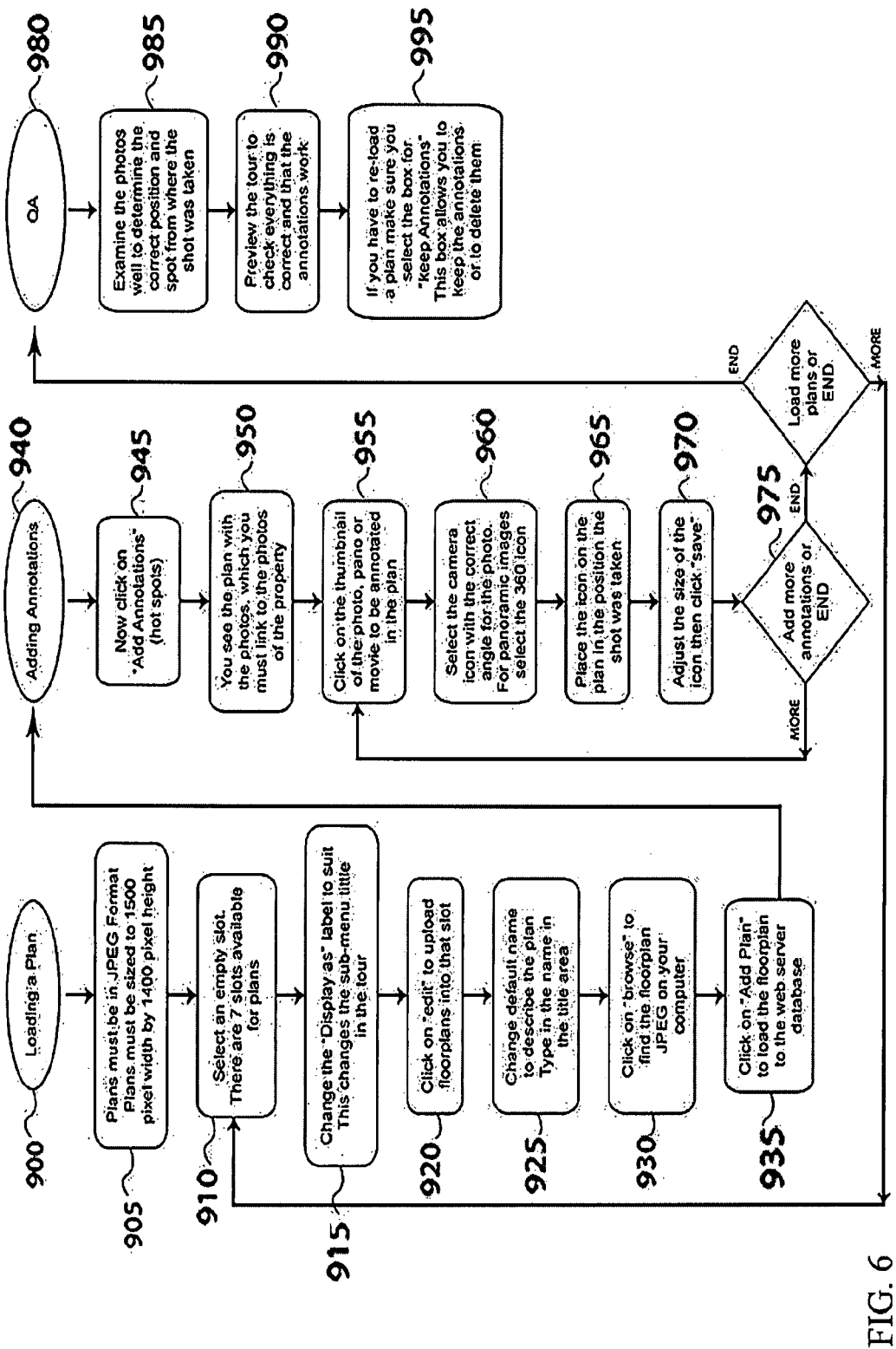

FIG. 6 shows an example of a basic flow for loading floor plans into a tour. The floor plan loading method generally comprises steps of loading the plan (900); adding annotations (940); and quality assurance (980). Specifically, the floor plan loading method may comprise one or more of the following steps:

(1) loading a plan (900) by providing the plan in JPEG or any other suitable format and sizing the plan to a suitable width and height, such as 1500 pixels wide by 1400 pixels high (905); selecting an empty sub tab, a finite number of sub tabs, e.g. seven, may be provided (910); changing the Display As label to suit the plan (915), where the Display As label corresponds to the sub tab label 330 shown in FIG. 1; clicking on the Edit button to upload a floor plan into the selected sub tab (920); changing the default name to describe the plan by typing the name into the sub tab title field (925); clicking on Browse to find the floor plan on a computer system (930); clicking on Add Plan to load the floor plan to a web server database (935);

(2) adding annotations (940) by clicking on Add annotations (hot spots) (945); identifying points on the plan that correspond with individual images in order to link the photos of the property (950); clicking on a thumbnail of the photograph, panoramic image or video to be annotated to the plan (955); selecting a camera icon with a correct angle for the photo or a panoramic image icon, which may include the text "360°," for panoramic images (960); placing the icon on the plan in a position that approximates the camera angle of the original photo (965); adjusting the size of the icon and clicking save (970); and deciding whether there are additional annotations or ending the adding annotations subroutine (975); and deciding whether there are additional plans or ending the loading plans subroutine (976); and (3) quality assurance (980) by examining the images to determine whether the correct position shown on the plan corresponds with the spot from there the image was taken (985); previewing the tour to check that everything is correct and that the annotations are correct (990); and if the user has to re-load a plan, ensuring that a box is selected in order to "keep annotations," which allows the user to keep the annotations or to delete them (995).

Figure 7:
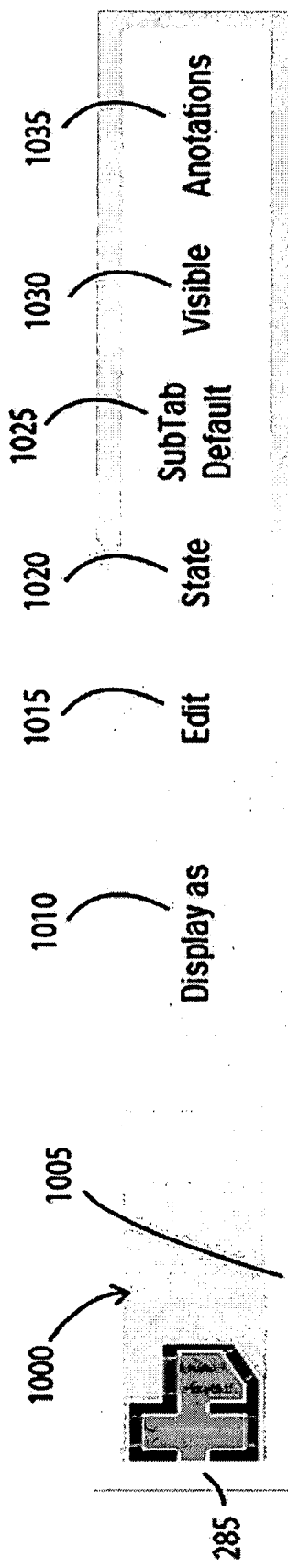

FIG. 7 shows an example where seven sub tabs are provided for loading a floor plan into the system. The screen 1000 may comprise one or more of the following sections: the second tab icon 285 described above; floor plan sub tab names 1005, Display as indicators 1010, Edit link 1015, State indicators 1020, Sub Tab Default mode selectors 1025, a Visible indicator field 1030 and an Annotations indicator field 1035.

Figure 8:
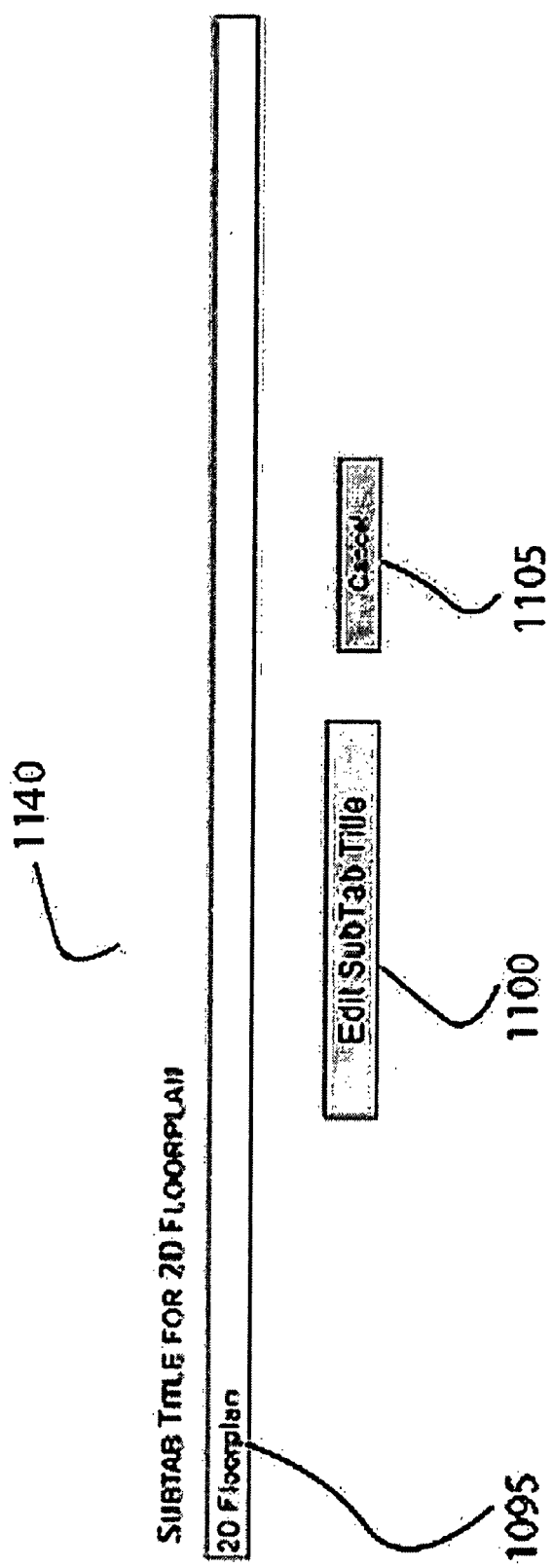

FIG. 8 shows an example of a data entry screen for changing the displayed sub tab title. The screen 1040 may comprise one or more of the following sections: a Sub Tab Title for 2D Floor plan entry field 1095, an Edit Sub Tab Title button 1100 and a Cancel button 1105.

Figure 9:
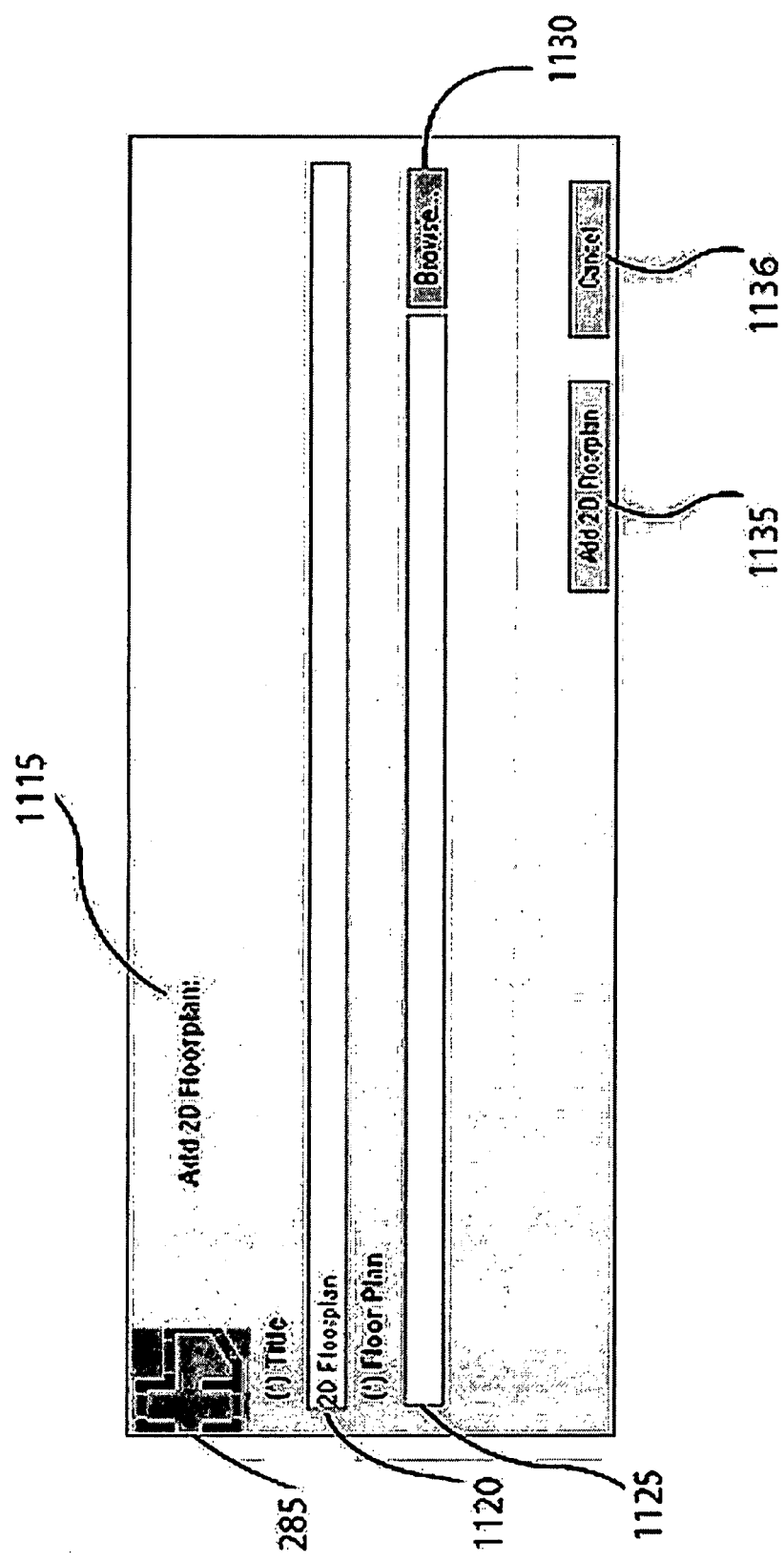

FIG. 9 shows an example of a data entry screen for loading a floor plan for an empty sub tab. In addition to the features described above, this screen may comprise one or more of the following: an Add 2D Floor plan section title field 1115, the sub tab icon 285, a Title entry field 1120, a Floor Plan filename entry field 1125, a Browse button 1130, and an Add 2D Floor plan button 1135 and a Cancel button 1136.

Figure 10:
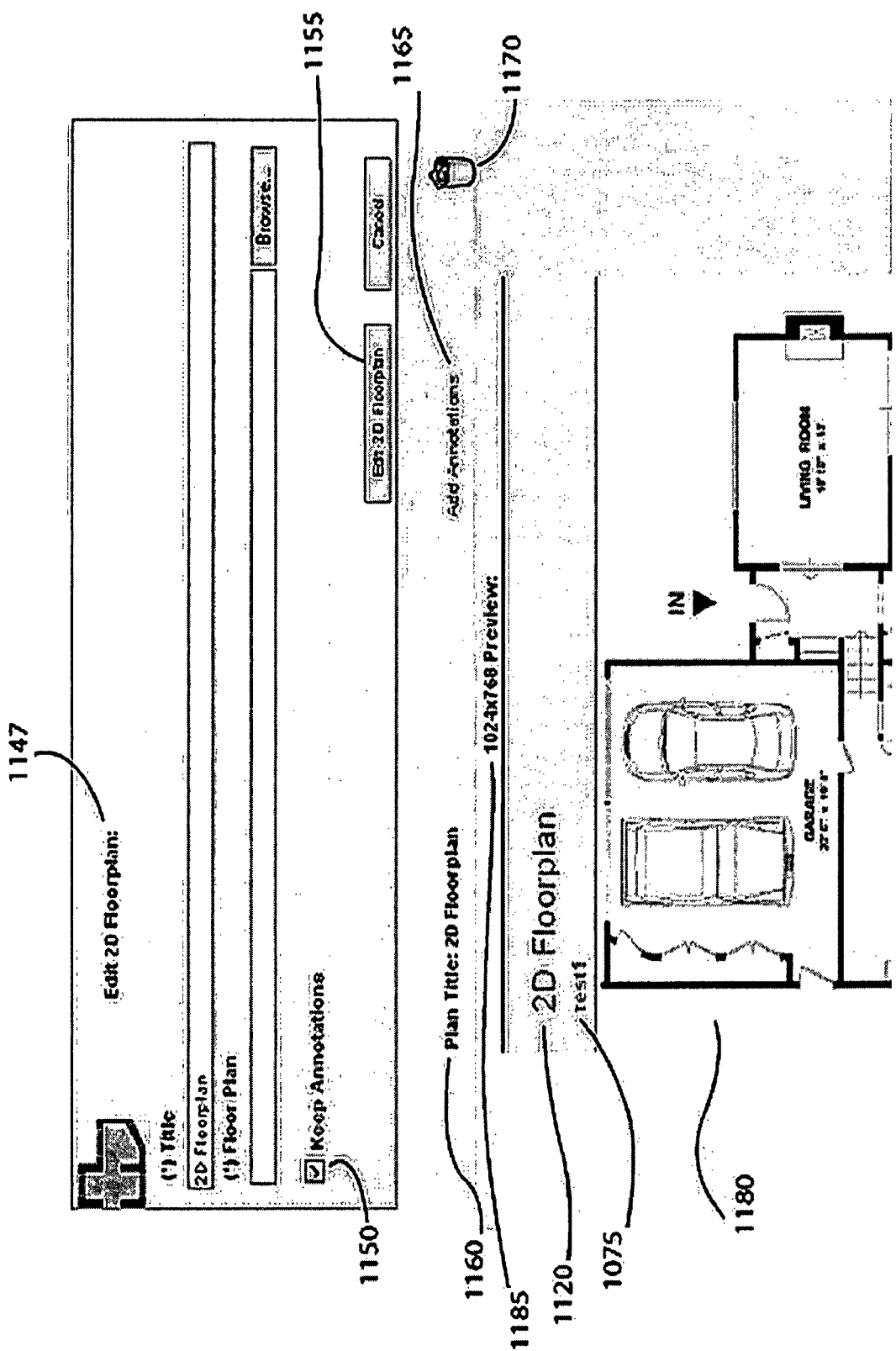

FIG. 10 shows an example of a screen for previewing, deleting or reloading, a floor plan that has been loaded into a sub tab. In addition to the features described above, this screen may further comprise one or more of the following: an Edit 2D Floor plan section label 1147, a Keep Annotations label with selectable check box 1150, an Edit 2D Floor plan button 1155, a Plan Title: 2D Floor plan title field 1160, an Add Annotations Wizard link 1165, a trash can button 1170, a screen resolution indicator and preview title field 1185, a sub tab title 1120, a property address field 1075, and a floor plan image preview pane 1180.

Figure 11:
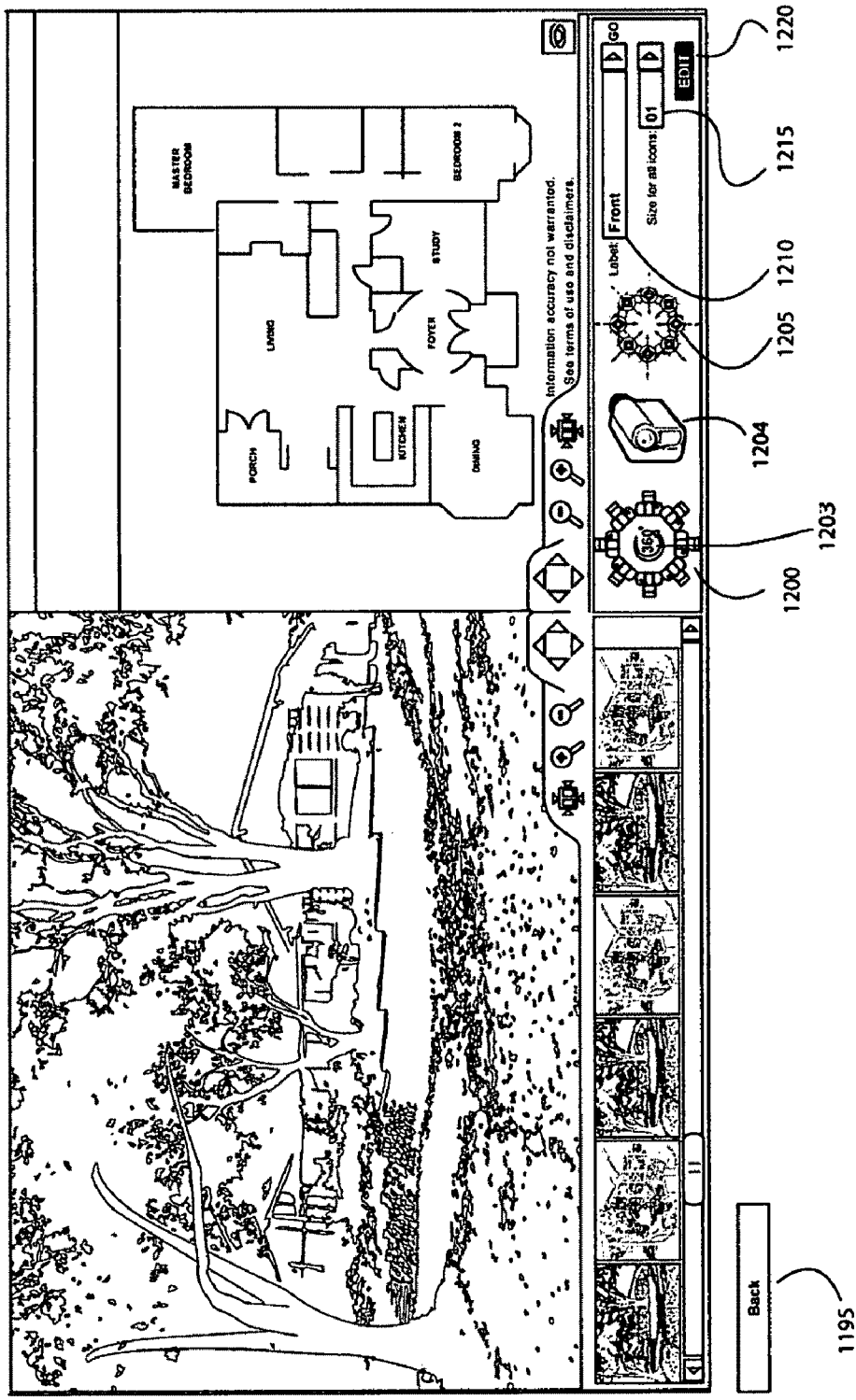

FIG. 11 shows an example of a drag and drop Annotations Wizard with a floor plan having no annotations. In addition to the features described above, this screen may further comprise one or more of the following: a Back button 1195, a plurality of multi-directional camera icons 1200 for representing still photographs, a panoramic image icon 1203 which may include the text "360°", for representing panoramic images, a video camera icon 1204, for representing video images, a plurality of multi-directional North Icons

1205, a label drop down selection box with GO button 1210, a Size for all Icons drop down selection box 1215 and an EDIT button 1220.

Figure 12:
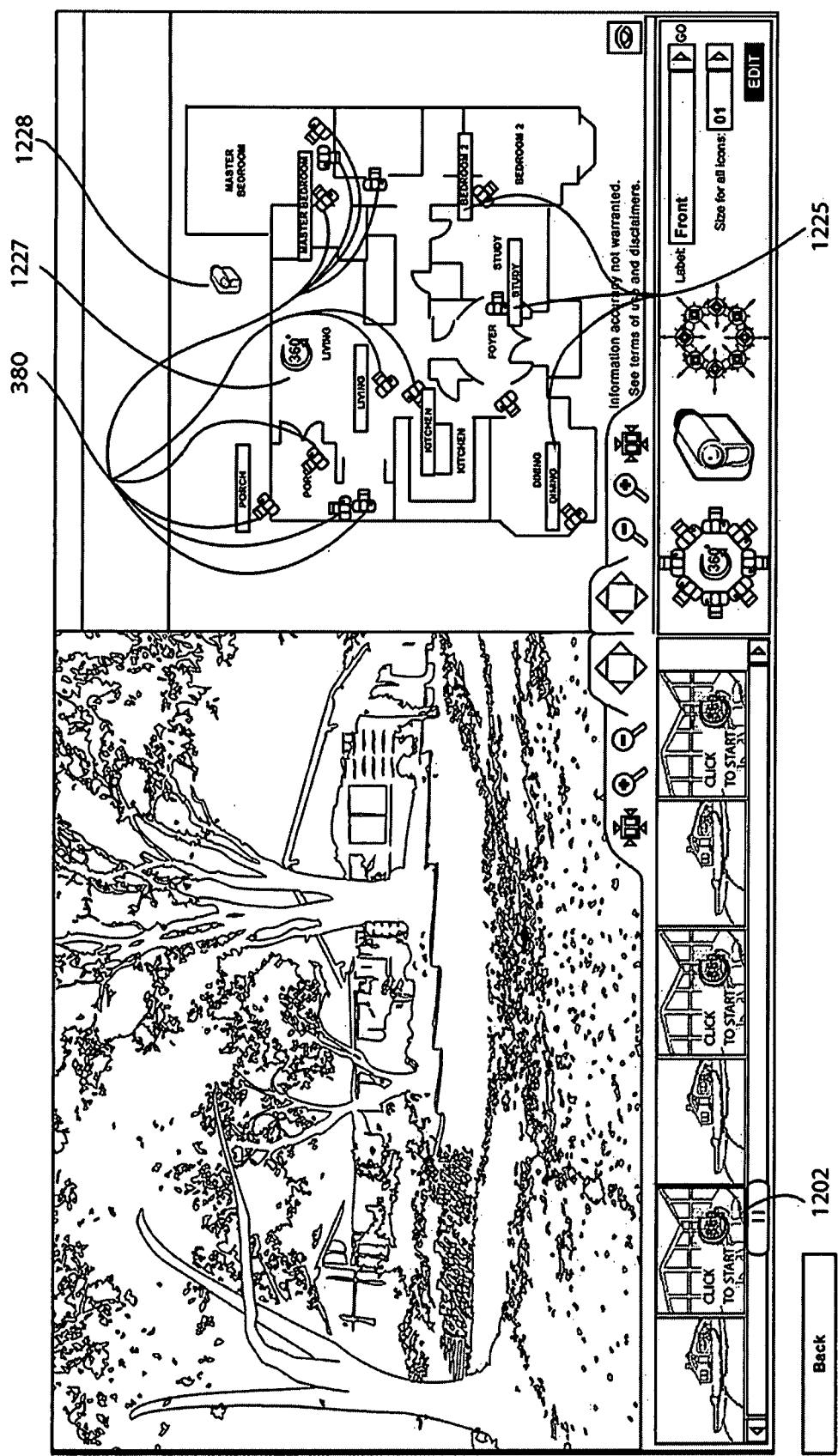

FIG. 12 shows an example of a drag and drop Annotation Wizard with a floor plan after annotations have been added. In addition to the features described above, this screen may further comprise one or more of the following: Thumbnail images that carry an overlay with a panorama image indicator icon 151 with superimposed text (e.g. "CLICK TO START" and an icon including the text "360°") to indicate that a panoramic view is available, and annotated text fields 1225 for each of the plurality of photograph, panorama or video point of origin and orientation icons 380.

Figure 13:
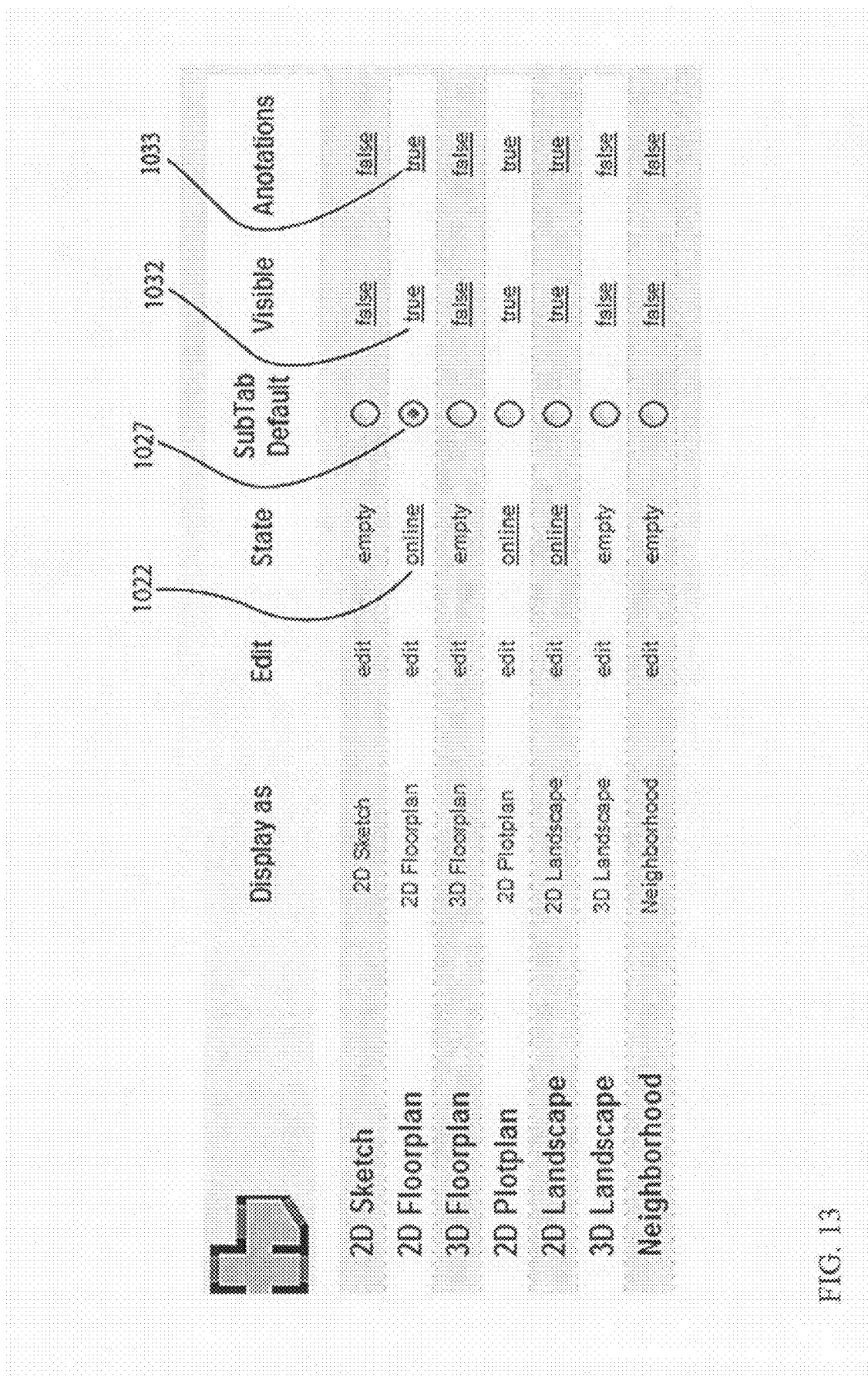

FIG. 13 is similar to FIG. 7 and shows an example where seven sub tabs are provided for loading floor plans and where one of the sub tabs has content loaded. In this example, the "2D Floor plan" has been selected as the default sub tab to be displayed when the plans tab is first displayed. The State field shows an "online" indicator 1022 instead of empty, the Sub Tab Default button has been selected 1027 and the Visible indicator is "true" 1032, and Annotations are "true", meaning annotations have been added 1033. As a result, the selected "2D Floor plan" image will be displayed when a user first views the Plans main tab 280 in the tour.

Figure 14:
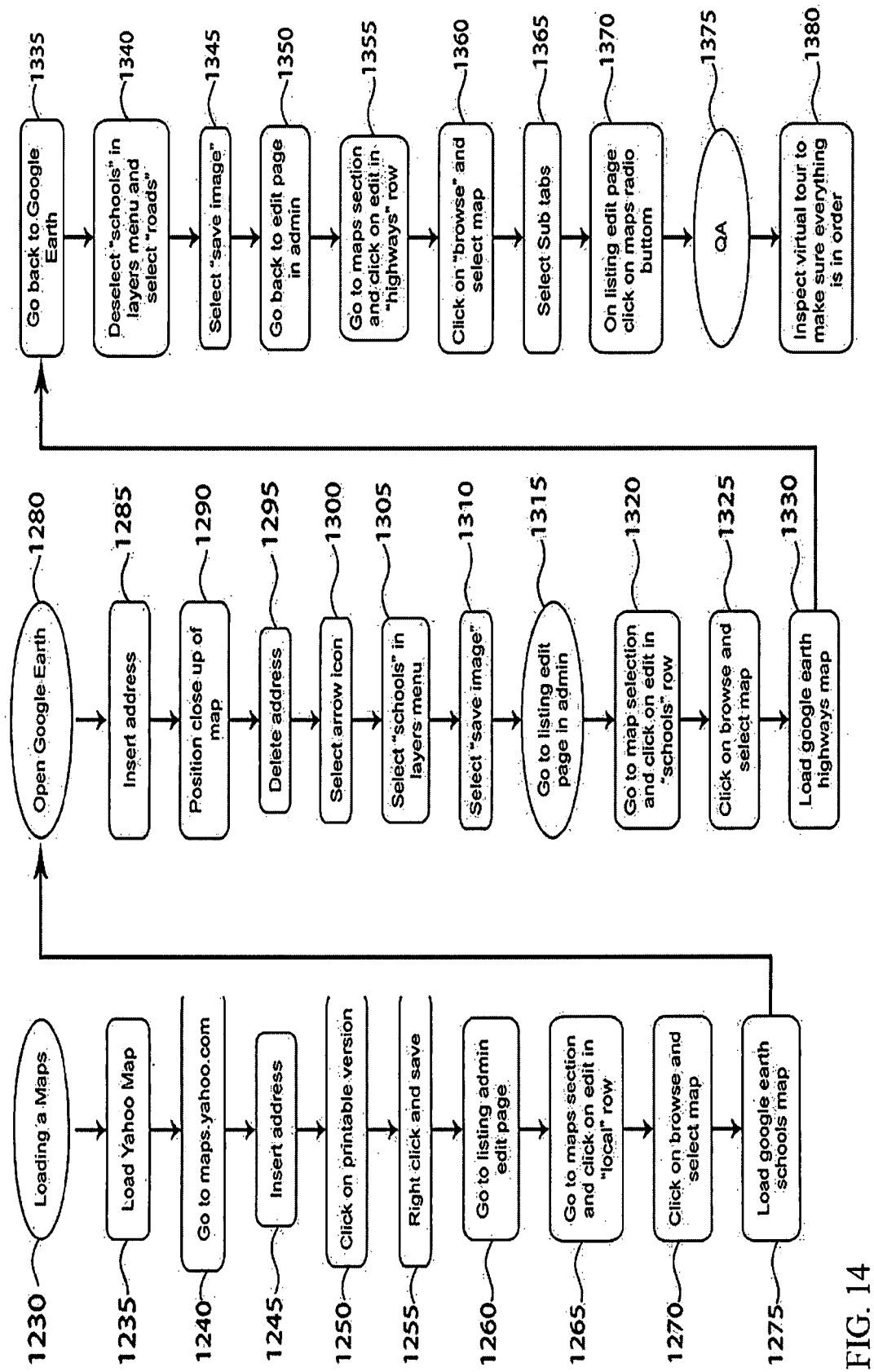
Figure 15:
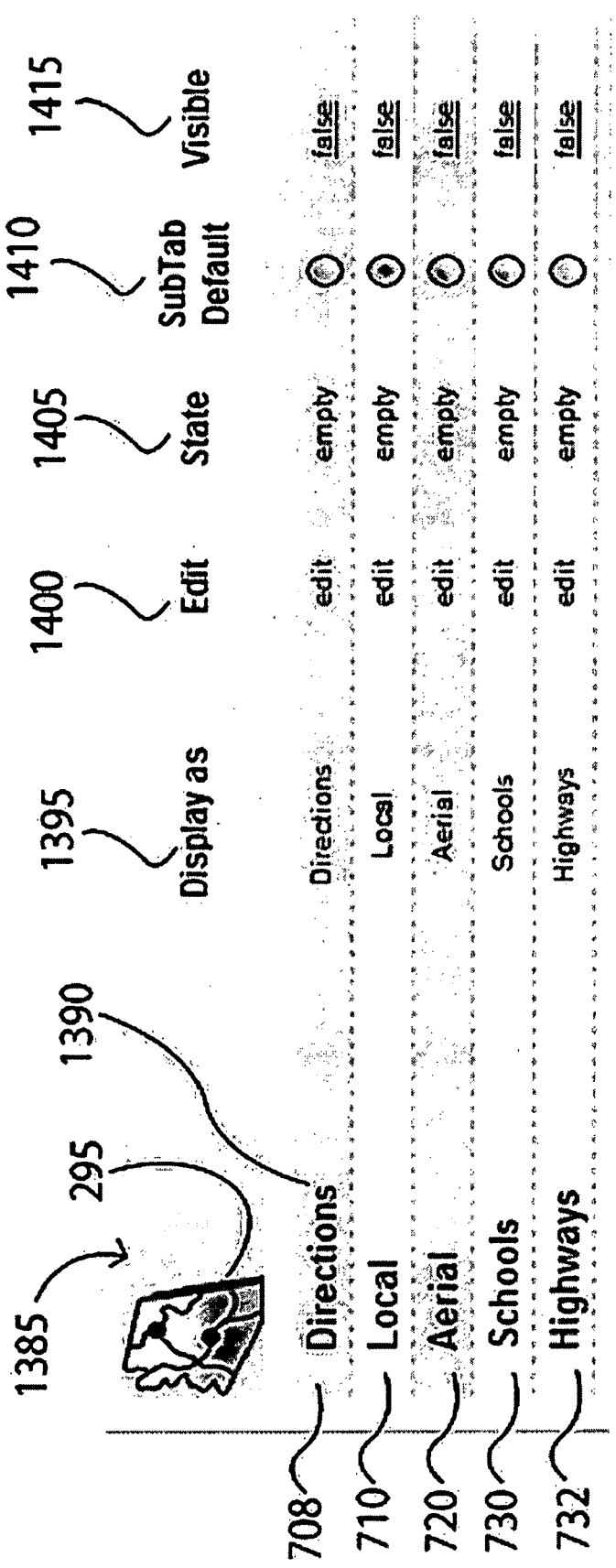

FIG. 14 depicts an example of a basic flow for loading Maps into a tour. The maps loading method generally comprises steps of loading the map (1230); opening a broadband, 3D geomapping application (1280), such as Google Earth; going to a listing edit page in admin mode (1315) and quality assurance (1375). Specifically, the map loading method may comprise one or more of the following steps:

(1) loading the map (1230) by loading a mapping program such as Yahoo Map (1235); going to a URL associated with the mapping program (1240); entering a property address (1245); clicking on a printable version of a desired map (1250); right clicking on the image and saving the image (1255); going to a listing admin edit page (1260); going to the maps section and clicking on edit in the "local" row (1265); clicking on browse and selecting the map (1270); and loading a broadband, 3D geomapping application, such as Google Earth, with a feature for showing schools (1275);

(2) opening the broadband, 3D geomapping application (1280); entering a property address (1285); positioning a close up of the map (1290); deleting the address (1300); selecting an arrow icon (1300); selecting "schools" in the layers menu (1305); and selecting "save image" (1310);

(3) going to a listing edit page in admin (1315); going to a map section and clicking on edit in "schools" row (1320); clicking on browse and selecting a map (1325); loading a highways map from the broadband, 3D geomapping application (1330); going back to the broadband, 3D geomapping application (1335); deselecting "schools" in the layers menu and selecting "roads" (1340); selecting "save image" (1345); going back to edit page in admin (1350); going to maps section and clicking on edit in "highways" row (1355); clicking on "browse" and selecting a map (1360); selecting sub tabs (1365); and on the listing edit page, clicking on maps radio button (1370); and (4) quality assurance (1375) by inspecting the virtual tour to make sure everything is in order (1380).

FIG. 15 shows an example where five sub tabs are provided for loading maps, all with no content loaded. The screen 1385 may comprise one or more of the following sections: the first sub tab icon 295 described above; map sub tab names 1390, Display as indicators 1395, Edit links 1400, State indicators 1405, Sub Tab Default selectors 1410, and Visible indicator fields 1415.

Figure 16:
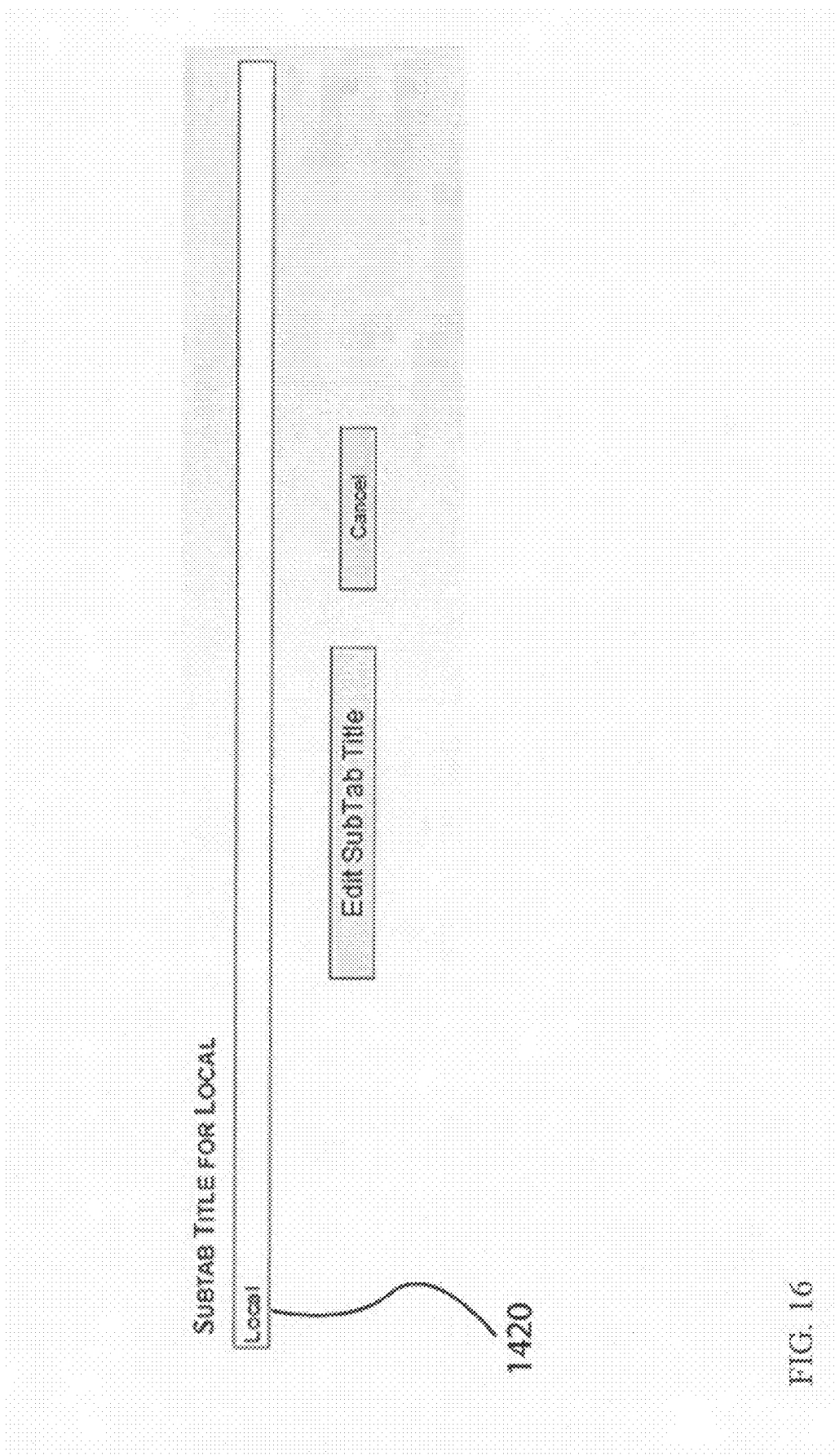

FIG. 16 shows an example of a data entry screen for changing the displayed sub tab label. In addition to the features described above, this screen may further comprise a Sub Tab Label entry field 1420.

Figure 17:
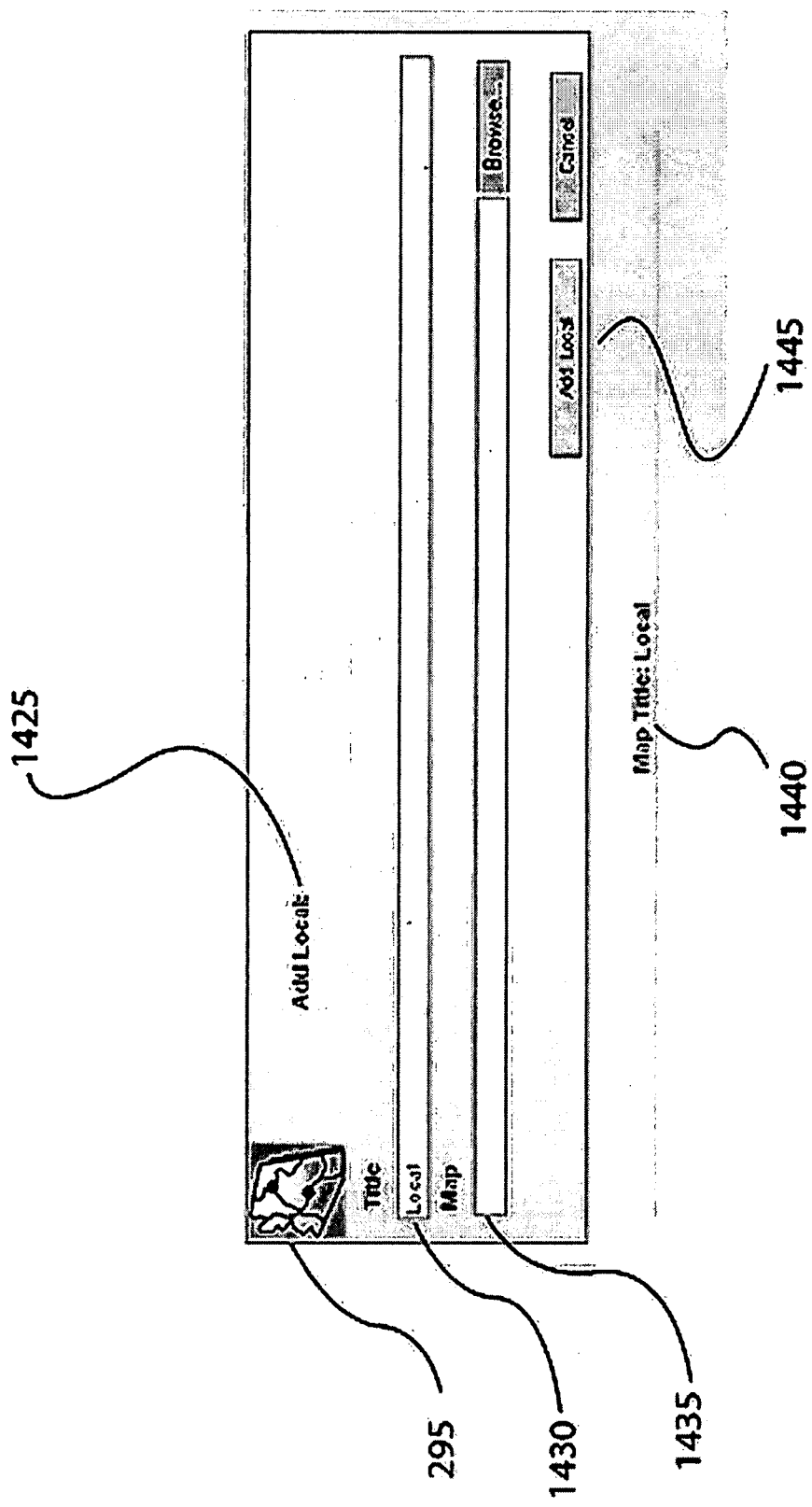

FIG. 17 shows an example of a data entry screen for loading a Map for an empty sub tab. In addition to the features described above, this screen may further comprise one or more of the following: the first tab icon 295 described above, an Add Local title field 1425, a sub tab Title data entry field 1430, a Map file location entry field 1435, a Map Title: Local title field 1440; and an Add Local button 1445.

Figure 18:
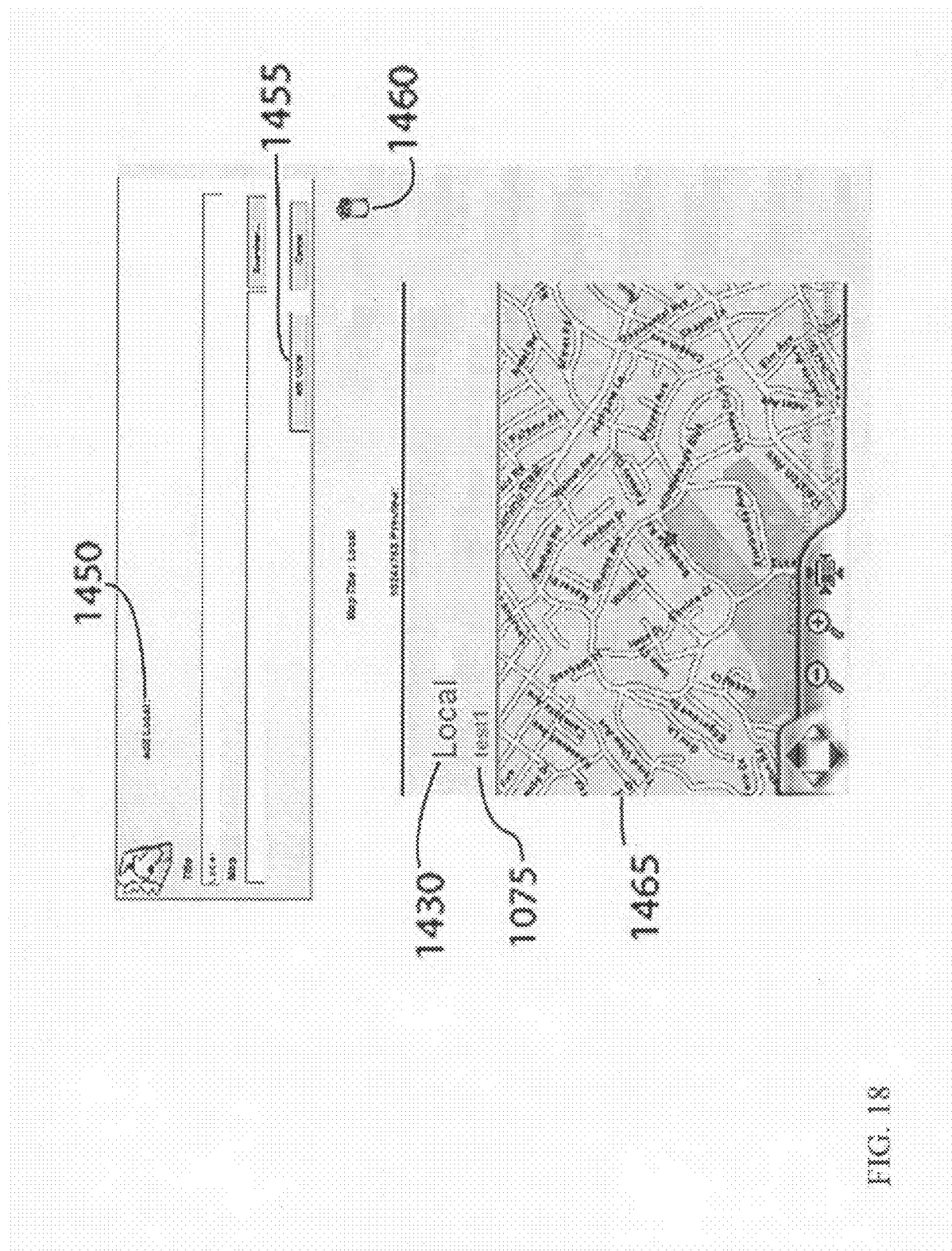

FIG. 18 shows an example of a screen for previewing, deleting or reloading, a Map that has been loaded into a sub tab. In addition to the features described above, this screen may further comprise one or more of the following: an edit Local title field 1450, an edit Local button 1455, a trash can button 1460, a sub tab title 1430, an Address field 1075, and a map image preview pane 1465.

FIG. 19 is similar to FIG. 15 and shows an example where five sub tabs are provided for loading maps and where one of the sub tabs has content loaded. In this example, the "Local" map has been selected as the default mode for the display. The State field shows an "online" indicator 1407 instead of empty, the Sub Tab Default button has been selected 1412 and the Visible indicator is "true" 1417. As a result, the selected "Local" map image will be displayed when a user first views the Maps main tab 290 in the tour.

Figure 20:
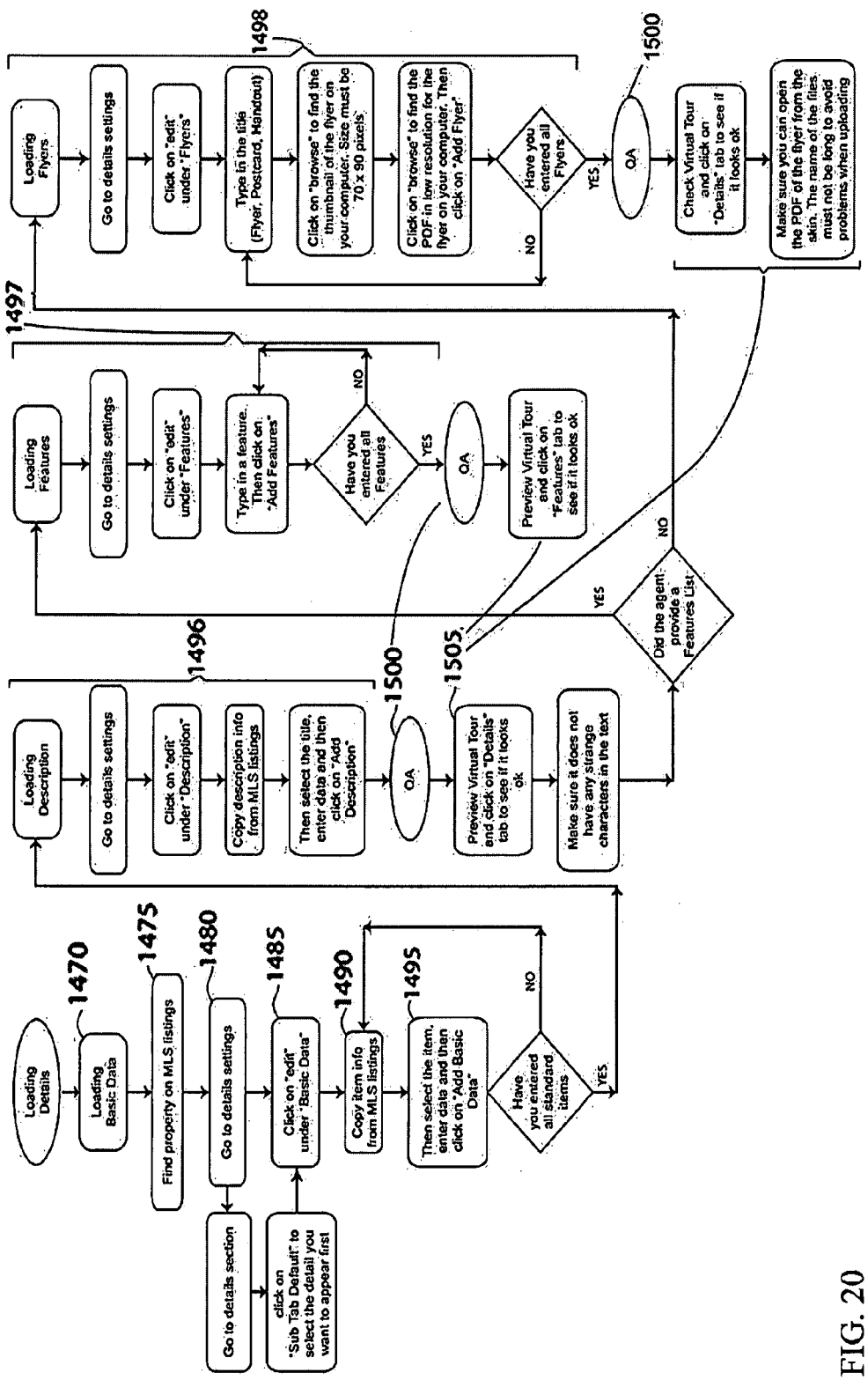
Figure 21:
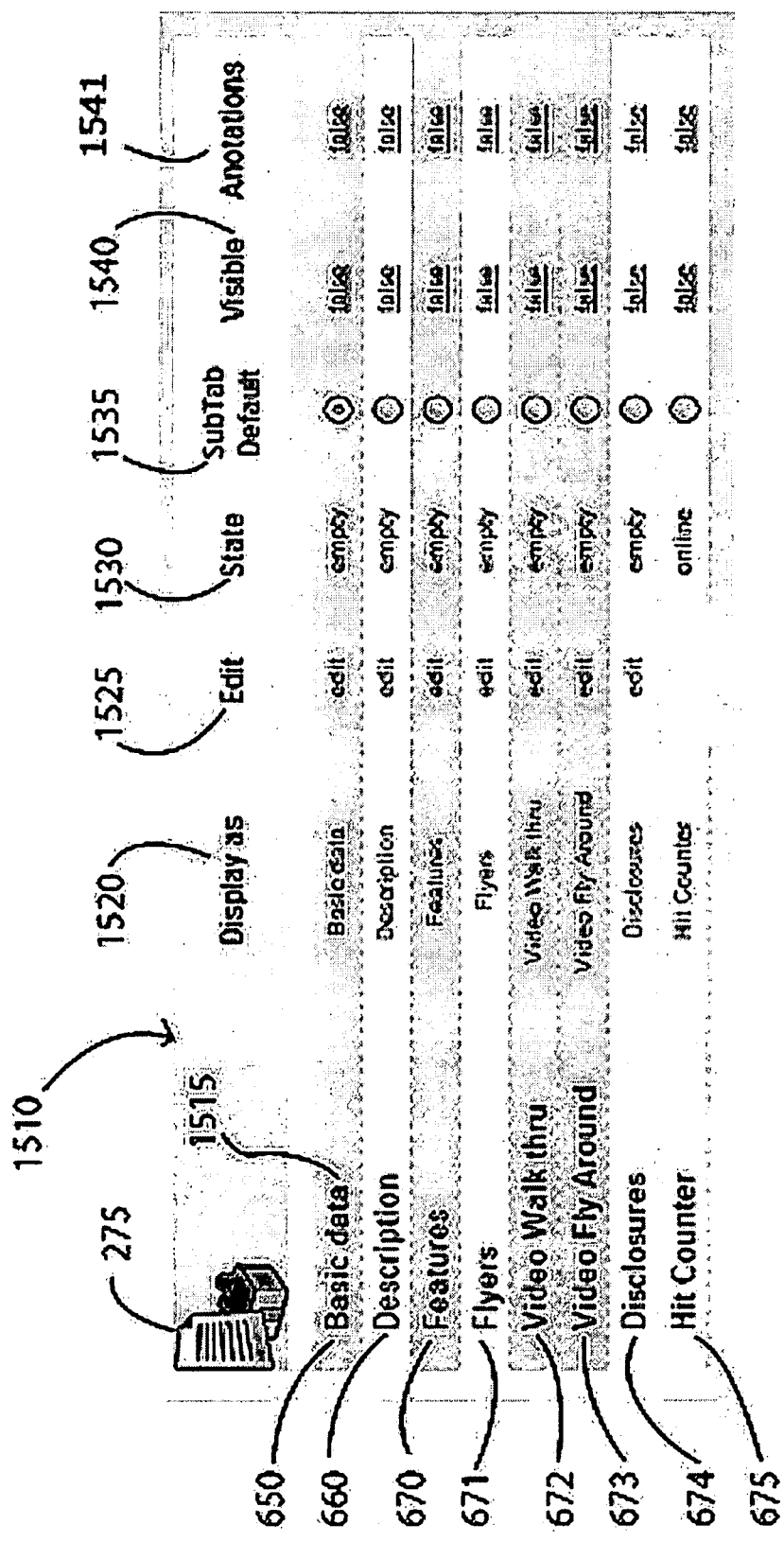

FIG. 20 depicts an example of a basic flow for loading Details of a Property into a tour. The Details loading method generally comprises one or more of the following steps of loading basic data (1470); loading descriptive text (1496); loading features bullets (1497); loading flyers (1498); and quality assurance (1500). Specifically, the Details loading method may comprise one or more of the following steps:

(1) loading basic data (1470); finding a property on the Multiple Listing Service (MLS) listings (1475); going to listing Detail.php in admin (1480); Clicking on edit under "Basic Data" (1485); copying information from the MLS listings (1490); and entering information such as price, bedrooms, bathrooms, garage, living area, lot size and the MLS number (1495); and (2) copying descriptive text from one of a number of possible sources into the description sub tab (1496) and (3) copying one or more elements of feature bullet text from one of a number of possible sources into the features sub tab (1497) and (4) uploading one or more elements of flyers from one of a number of possible sources into the flyers sub tab (1498) and (5) quality assurance (1500) by checking the virtual tour and clicking on the relevant tabs and sub tabs to see if it looks OK (1505) as well as testing flyers can be viewed.

FIG. 21 shows an example where eight sub tabs are provided for loading details, all with no content loaded. The screen 1510 may comprise one or more of the following sections: the first sub tab icon 275 described above; Details sub tab names 1515, Display as indicators 1520, Edit links 1525, State indicators 1530, Sub Tab Default selectors 1535, and a Visible indicator field 1540 and Annotations indicator field 1541.

Figure 22:
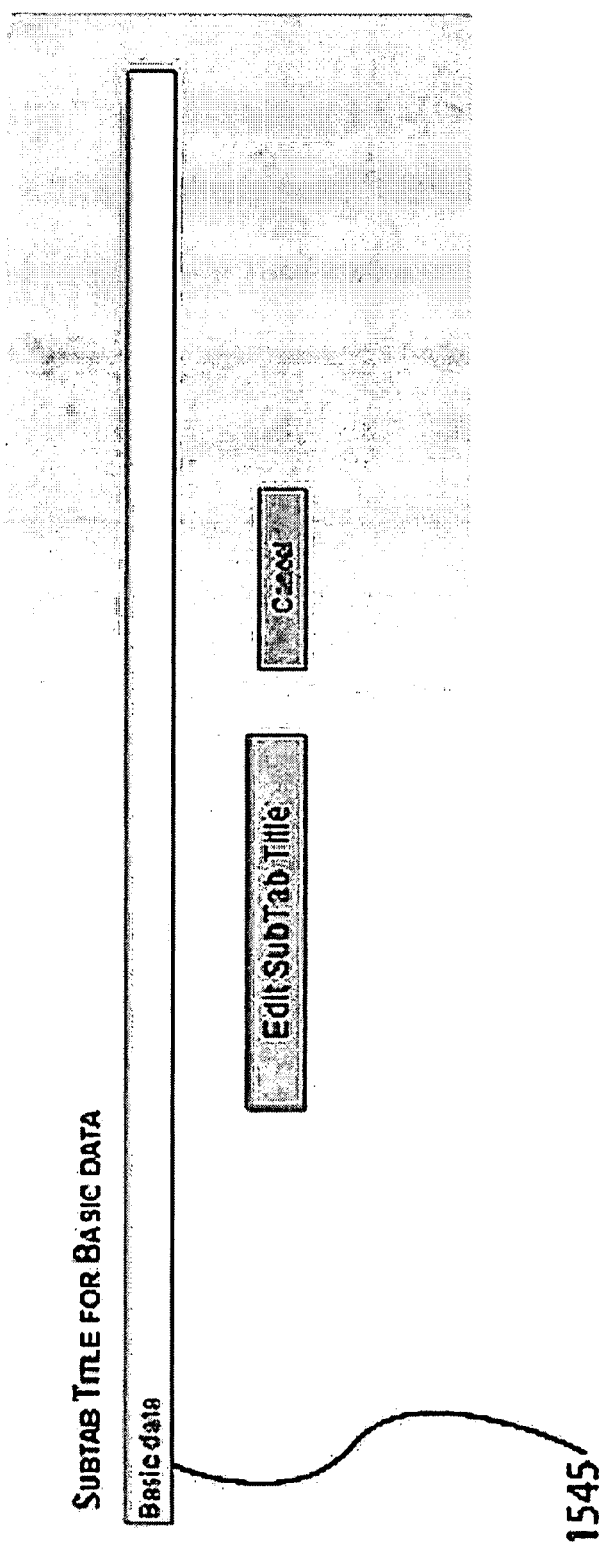

FIG. 22 shows an example of a data entry screen for changing the displayed sub tab label. In addition to the features described above, this screen may further comprise a Sub Tab Title for Basic Data entry field 1545.

Figure 23:
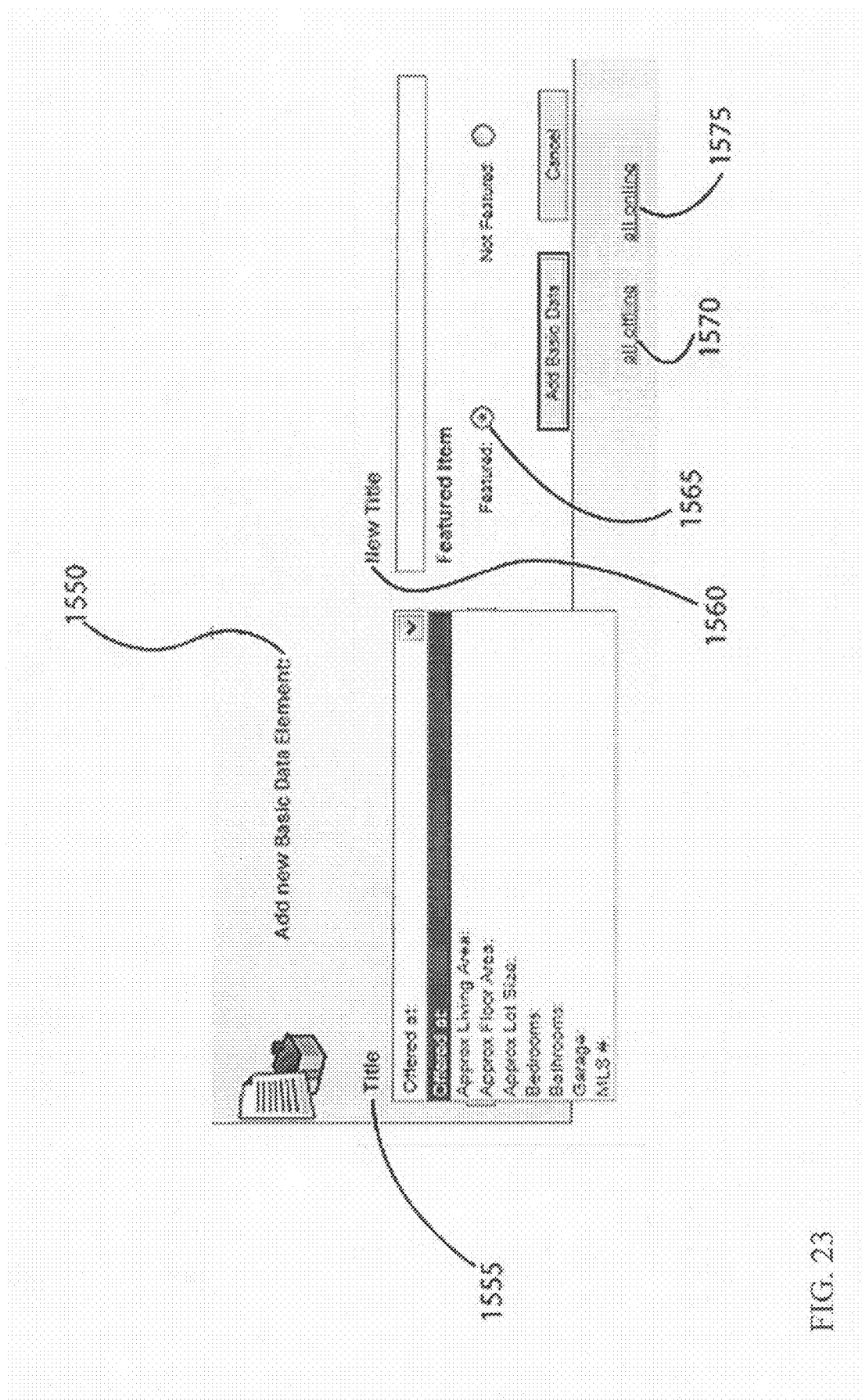

FIG. 23 shows an example of a data entry screen for loading standard basic data items or elements. In addition to the features described above, this screen may further comprise one or more of the following: an Add new Basic Data Element title field 1550, a Title drop down menu/entry field containing popular basic data elements 1555, a New Title entry field 1560 for entering basic data elements not contained in 1555, Featured or Not Featured radio buttons 1565; an all offline link/field 1570 and an all online link/field 1575.

Figure 24:
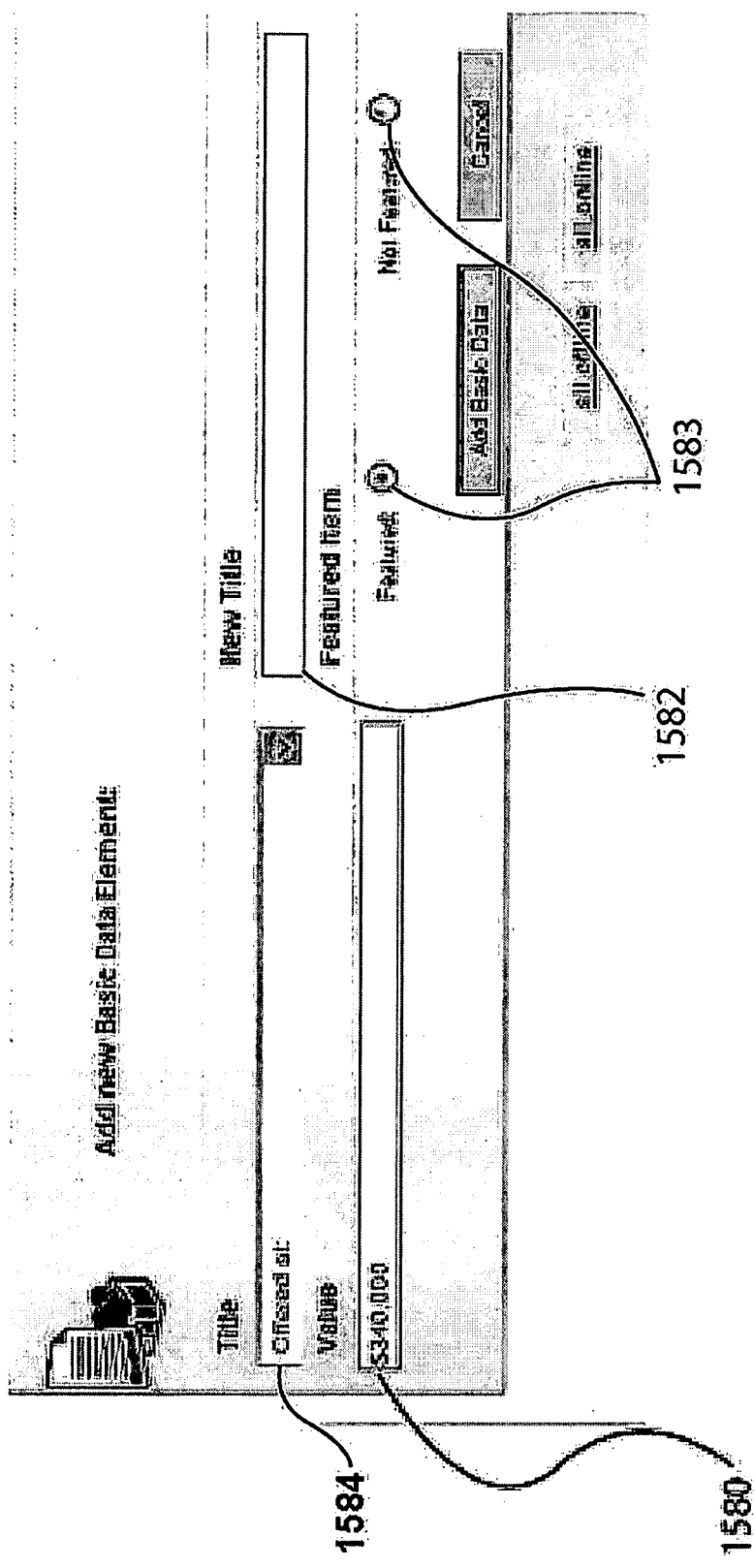

FIG. 24 shows an example of the same data entry screen as in FIG. 23 with an element of basic data information selected prior to loading to the basic data sub tab. In addition to the features described above, this screen may further comprise a Value data entry field 1580, and an New Title field 1582 for defining new data items that are not available in the a Title drop down menu/entry field 1584, and a Featured or Not featured radio button field 1583.

Figure 25:
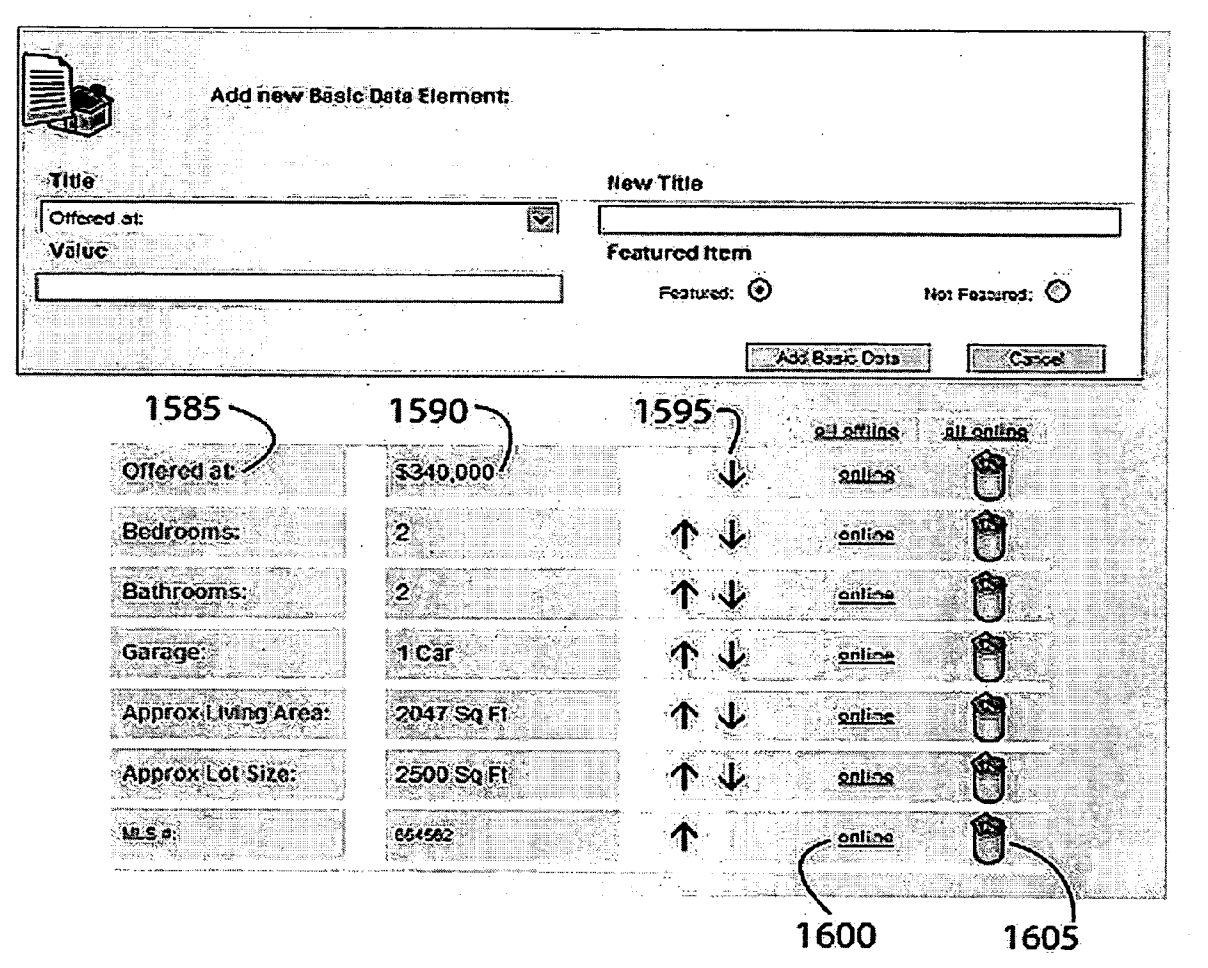

FIG. 25 shows an example of a screen for previewing, deleting or reloading any information that has been loaded into a sub tab. In addition to the features described above, this screen may further comprise one or more of the following: basic data category description fields 1585, data entries 1590 for each of the fields priority arrows 1595 for sorting the "Basic Data" elements, an online status indicator 1600 and trash can buttons 1605.

Figure 26:
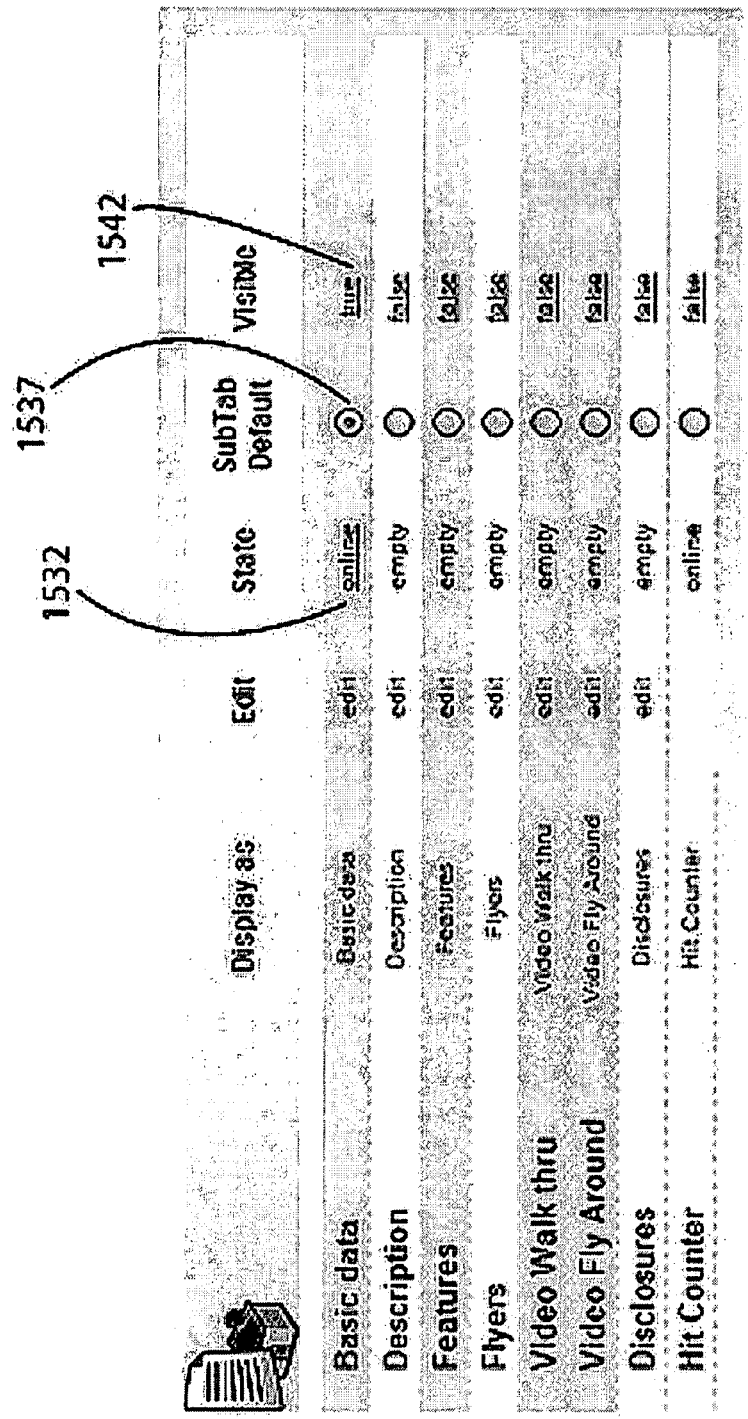

FIG. 26 is similar to FIG. 21 and shows an example where eight sub tabs are provided for loading details and where one of the sub tabs has content loaded. In this example, the "Basic data" field has been selected as the default mode for the display. The State field shows an "online" indicator 1532 instead of empty, the Sub Tab Default button has been selected 1537 and the Visible indicator is "true" 1542. As a result, the selected "Basic data" field will be displayed when a user first views the Details main tab 270 in the tour.

Figure 27:
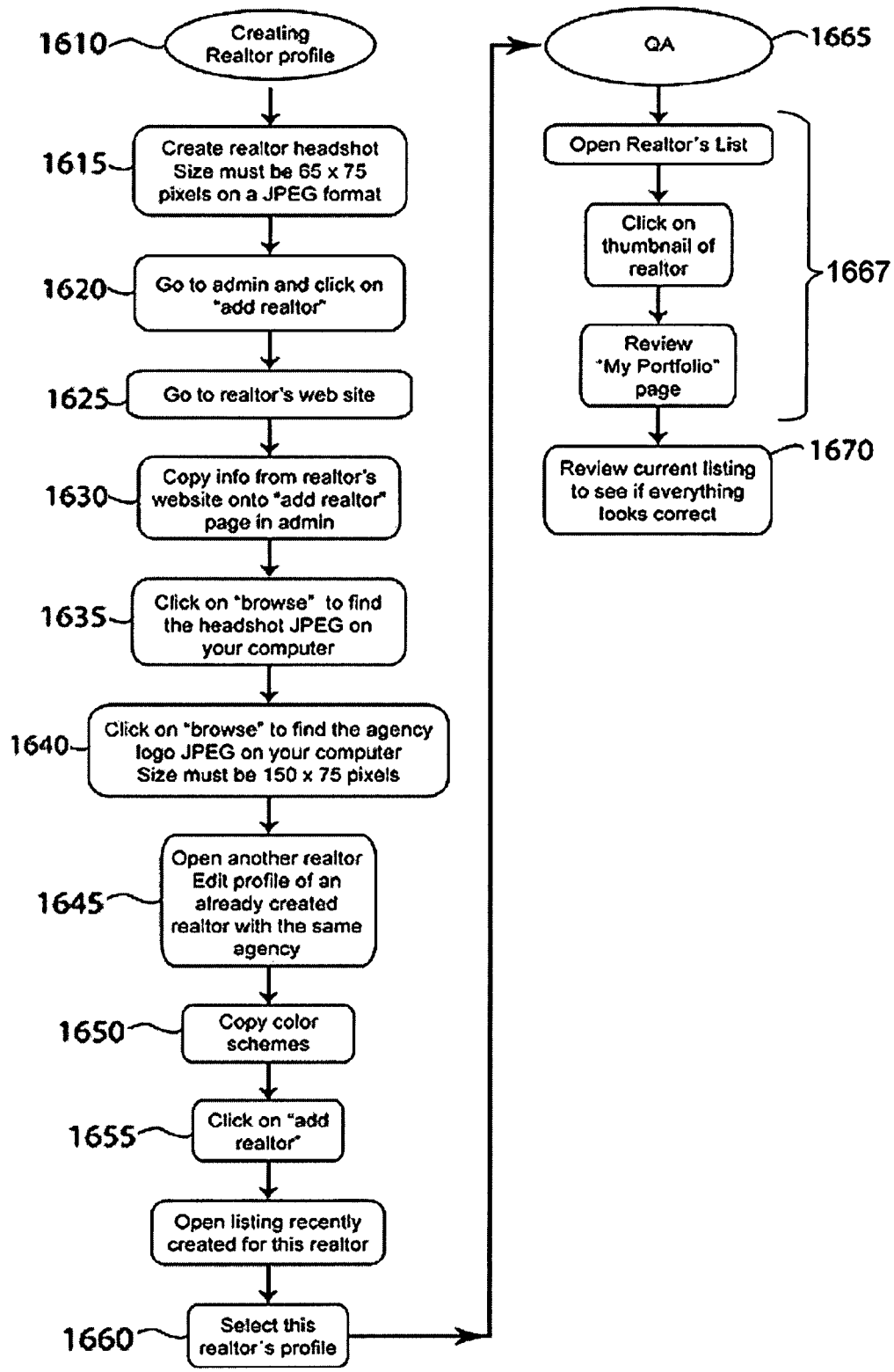

FIG. 27 depicts an example of a basic flow for loading a Realtor profile into a tour. The Realtor profile loading method generally comprises steps of creating a realtor profile (1610); and quality assurance (1665). Specifically, the Realtor profile loading method may comprise one or more of the following steps:

(1) creating a realtor profile (1610) by creating a realtor headshot (1615); going to admin and clicking "add realtor" (1620); going to the realtor's web site (1625); copying information from the realtor's website onto add realtor page in admin (1630); clicking on "browse" to add the headshot (1635); clicking on "browse" to add an agency logo (1640); opening another realtor edit profile of an already-created realtor with the same agency (1645); copying color schemes (1650); clicking on "add realtor" (1655); and selecting a realtor for the listing (1660); and (2) quality assurance (1665) by opening the realtor list, selecting the portfolio of the realtor and reviewing the portfolio (1667) and checking the current listing to see if everything looks correct (1670).

Figure 28:
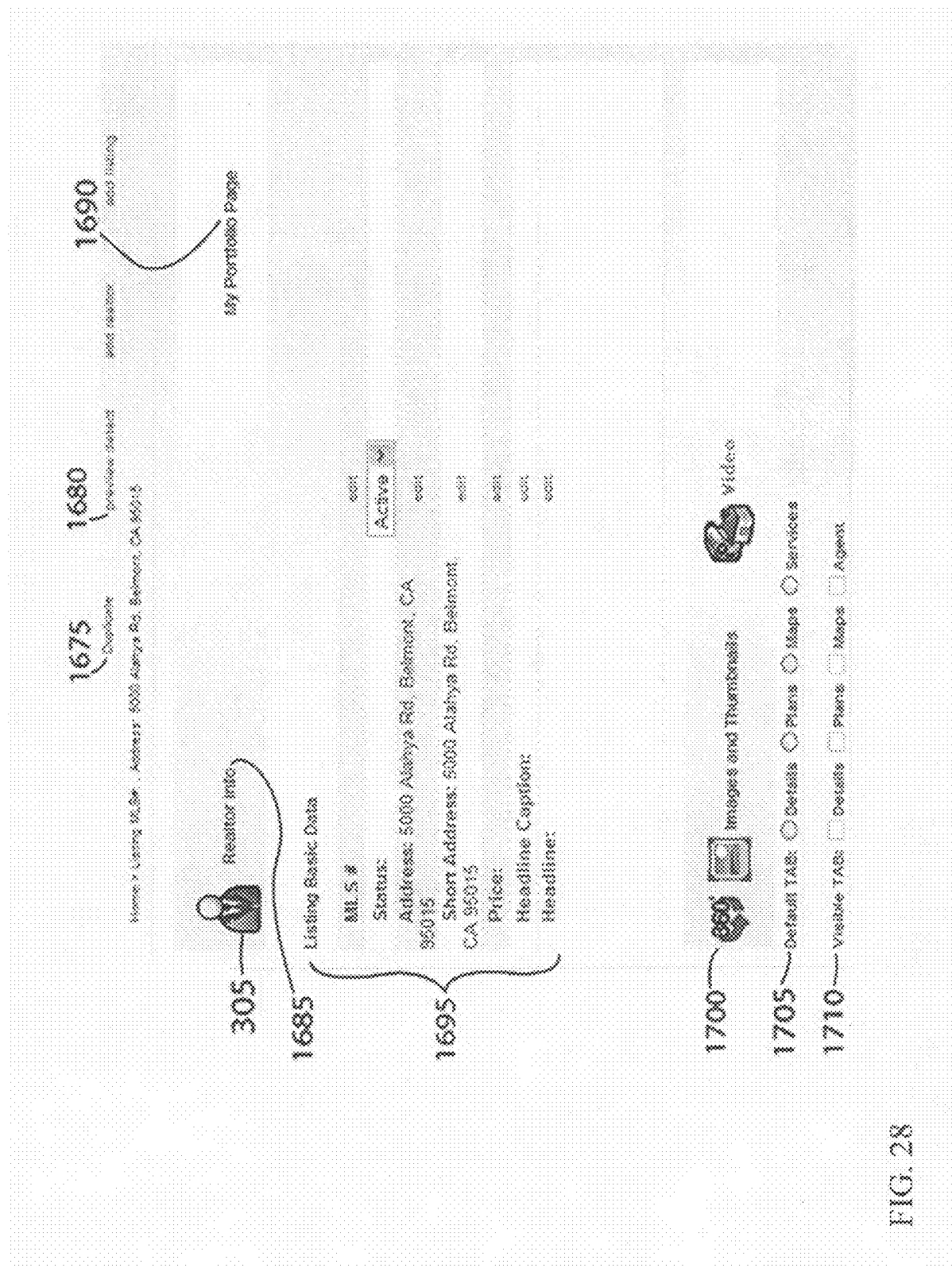

FIG. 28 shows an example of a virtual tour listing summary, showing no Agent Profile selected. In addition to the features described above, this screen may further comprise one or more of the following: a Realtor information title field 1685, a Duplicate button 1675 for creating a duplicate of the listing, a preview detect button 1680 for previewing the listing in the automated screen resolution detection mode, a My Portfolio Page link 1690, the Realtor profile icon 305 described above, Listing Basic Data fields 1695 including but not limited to MLS #, Status, Address, Short Address, Price, Headline Caption and Headline with edit buttons or drop-down menus for each category, Images and Thumbnails section 1700, a Default Tab selector 1705 with radio buttons to select the Details tab 270, the Plans tab 280, the Maps tab 290 and a Services tab as the default tab to be displayed on the initial load of a tour, a Visible Tab indicator 1710 with check boxes indicating the visibility status of the Details tab 270, the Plans tab 280, the Maps tab 290 and the Agent tab 300.

Figure 29:

FIG. 29 shows an example of a data entry screen for adding information for a new realtor profile. In addition to the features described above, this screen may further comprise one or more of the following: an Add New Realtor title field 1715, general information fields 1725 including but not limited to Name, Direct Phone, Cell Phone, Email Address, Agency Web Page, Realtor Web Page and My Profile, audio information fields 1730 including a field for selecting a filename of a music file to be used for all listings, an audio intro subtitle field and a field for selecting a filename of an audio intro, video information fields 1735 including a video intro subtitle field 1735 and a field for selecting a filename of a video intro 1735, and fields 1740 for selecting images for a realtor head shot and a company logo. The music files may, for example, be in MP3 format. The realtor head shot may, for example, be 65×75 pixels. The company logo may, for example, be 150× 75 pixels.

Figure 30:
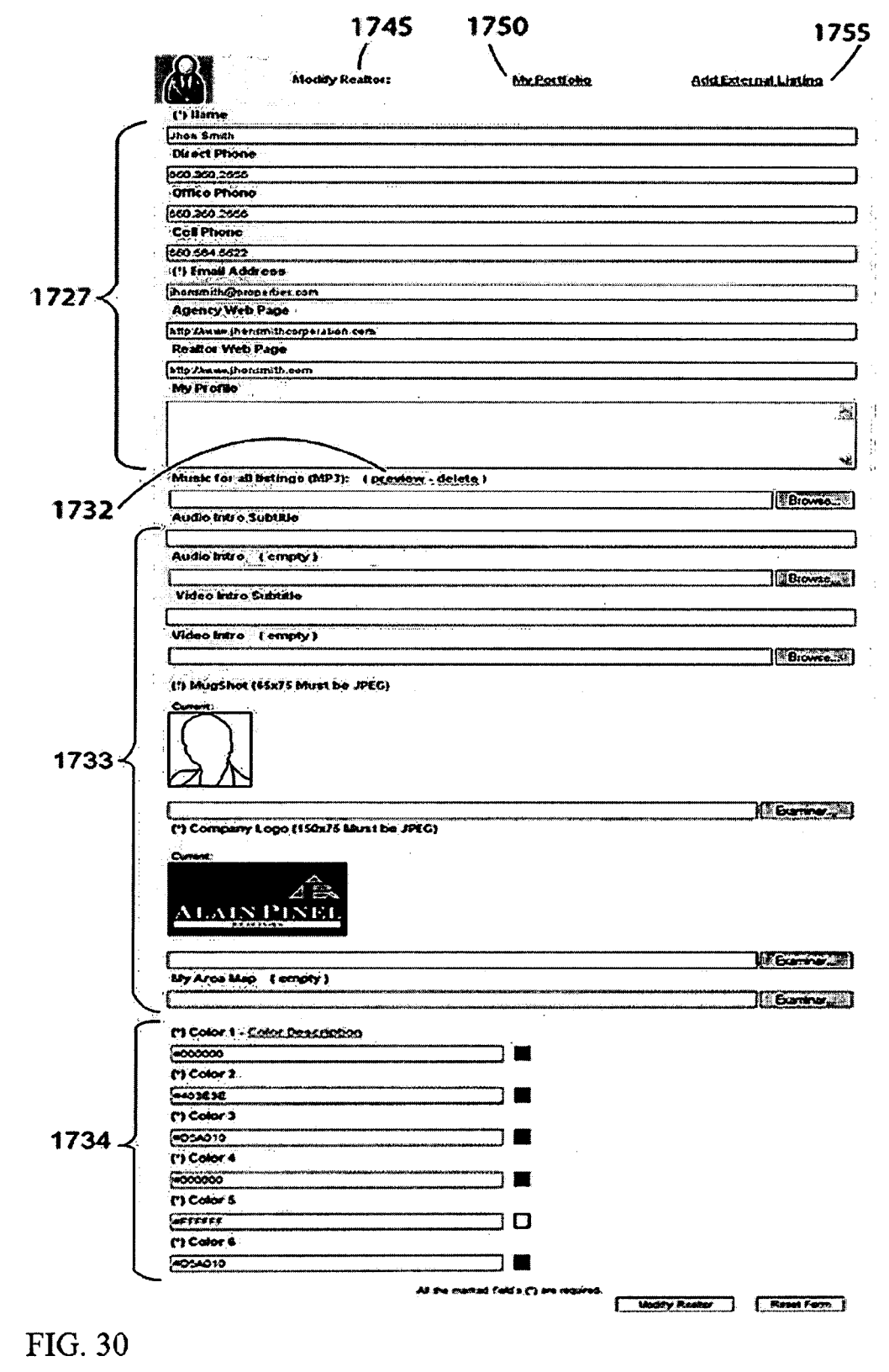

FIG. 30 shows an example of a data entry screen with Realtor information added. In addition to the features described above, this screen may further comprise one or more of the following: a Modify Realtor title field 1745, a My Portfolio link 1750, an Add External Listing link 1755 for adding links to virtual tours from other providers to the Agents portfolio page, completed general information fields 1727 a preview link 1732 for the music for all listings, entry fields for loading Audio and Video introduction files, Realtor Headshot, Agency Logo and Agents area map files 1733 and entry fields for defining the color scheme used to color brand the GUI 1734.

Figure 31:

FIG. 31 shows an example of a list of realtors 1760 that have been created. The tour producer may choose the realtor for the virtual tour by clicking "fixed down", "fixed up", "free down", or "free up" 1742, resulting in different configurations of the Display, next to the head shot and company logo for the realtor 1740.

Figure 32:
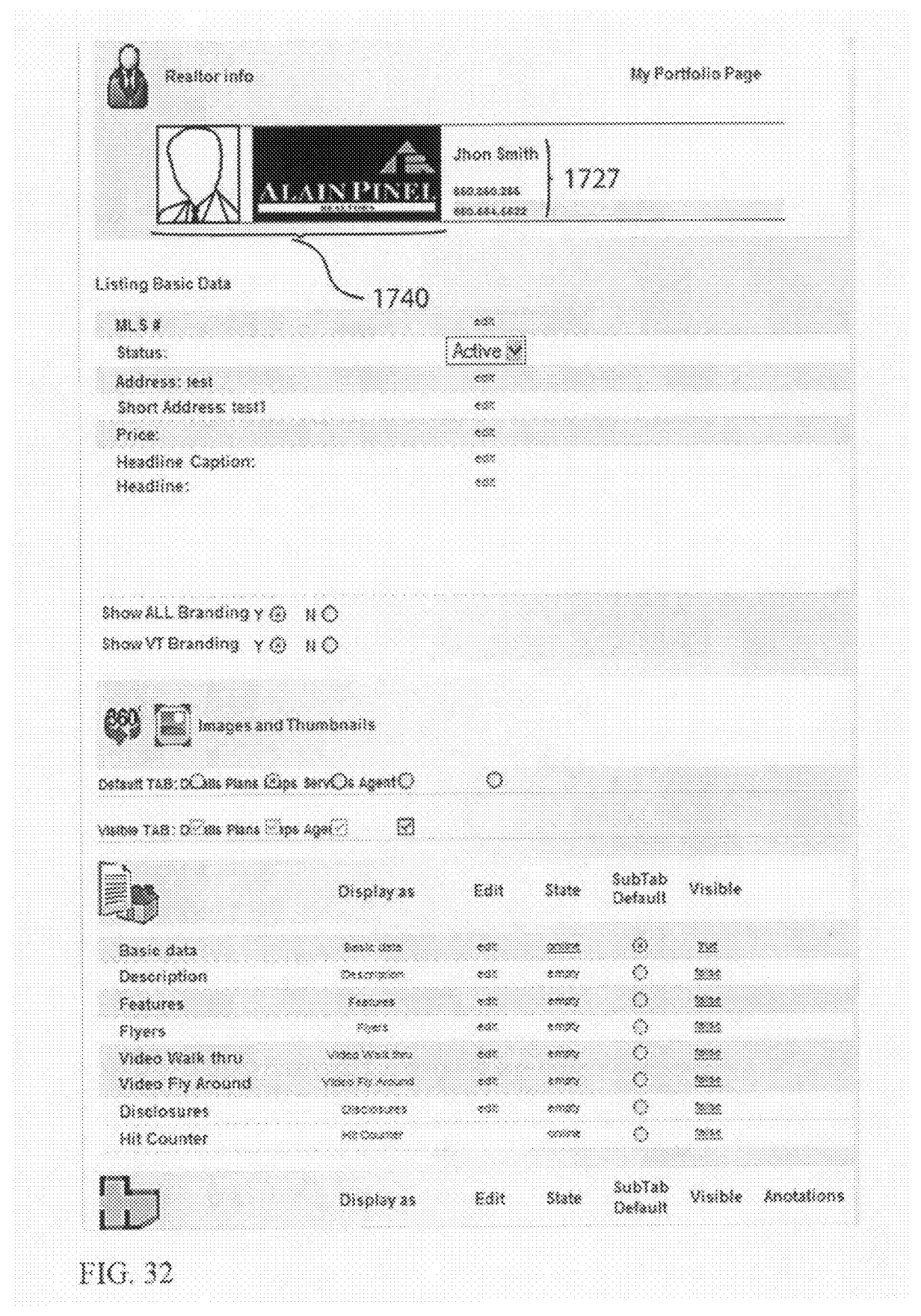

FIG. 32 shows the first half of an example of a virtual tour listing summary page with the selected agent or Realtor. In addition to the head shot and company logo for the realtor 1740, some or all of the completed general information fields 1727 appears.

Figure 33:
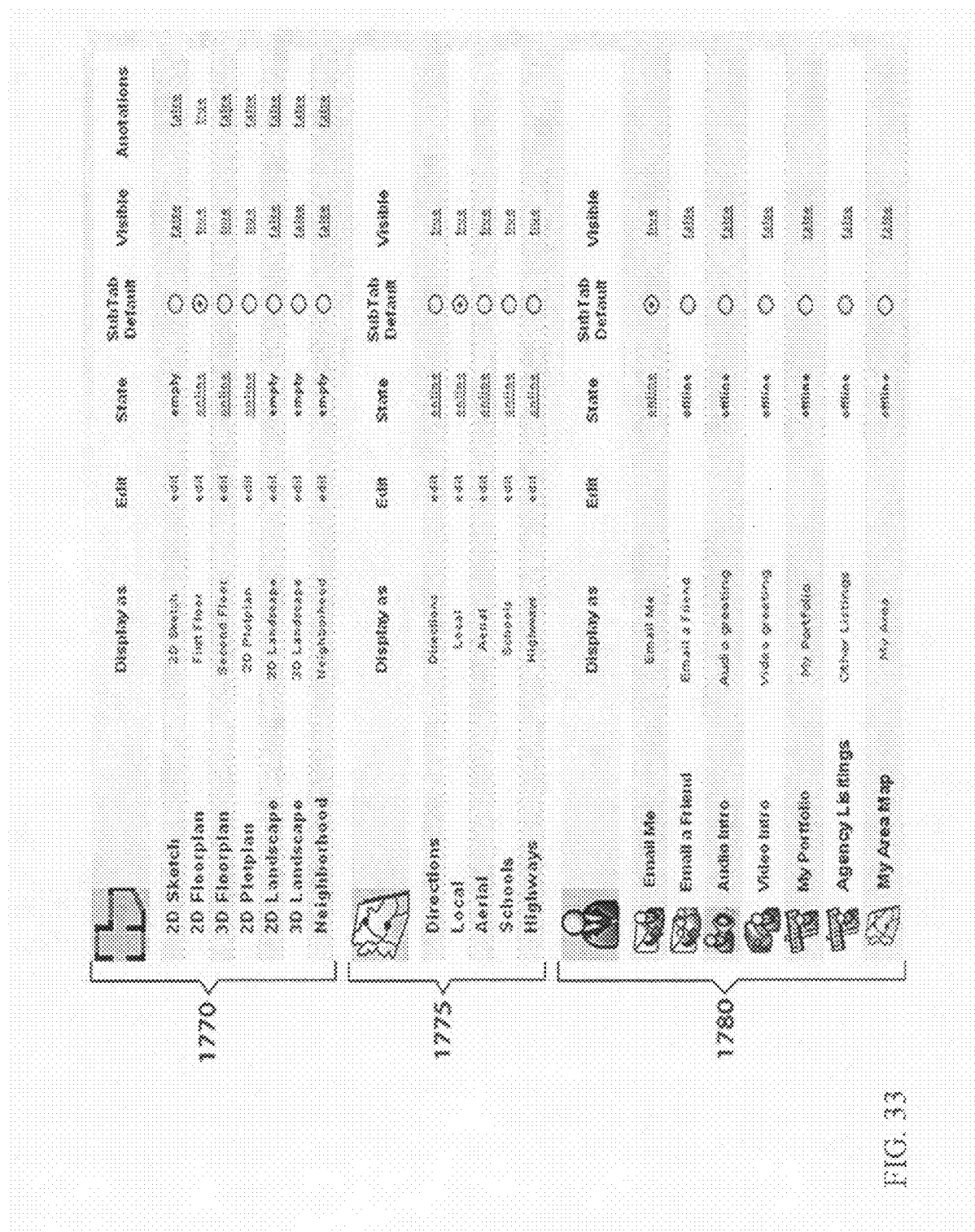

FIG. 33 shows a continuation of the listing summary page with the selected Realtor shown in FIG. 32. This screen may further comprise one or more of the following: Floorplans sub tab controls and status 1770, Maps sub tab controls and status 1775, Agent sub tab controls and status 1780.

Figure 34:
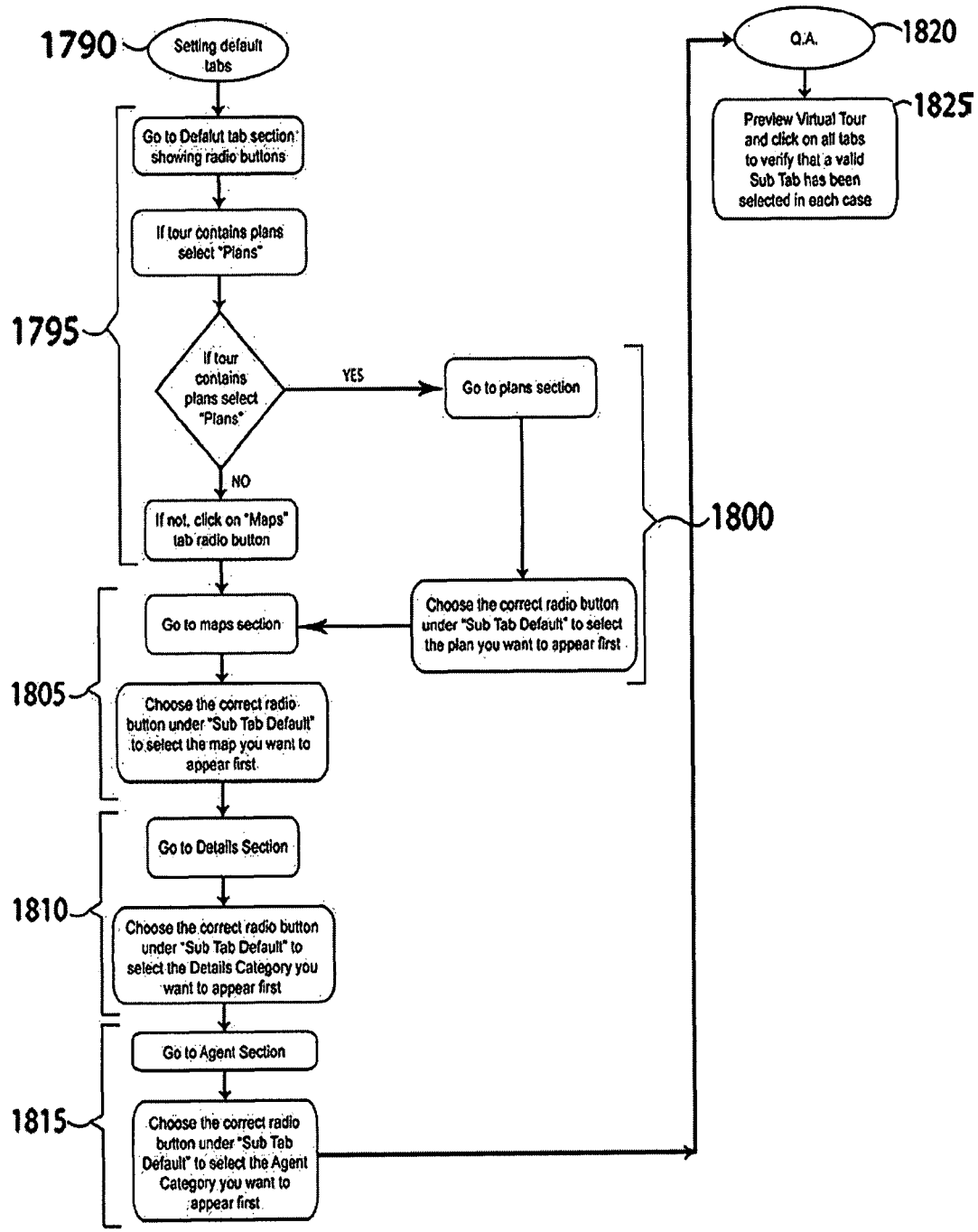

FIG. 34 depicts an example of a basic flow for setting the Default Tabs and Sub tabs for a tour. The Default Tab configuring method generally comprises steps of Setting tabs (1790); and quality assurance (1820). Specifically, the Default tab configuring method may comprise one or more of the following steps:

(1) Checking the preferred radio button to select the main Tab that will be displayed on first load of the tour (1795) verifying or changing the preferred Sub tab default for plans (1800); verifying or changing the preferred Sub tab default for maps (1805); verifying or changing the preferred Sub tab default for details (1810); verifying or changing the preferred Sub tab default for agent (1815) and (2) quality assurance (1820) by visualizing the listing and clicking on all tabs and sub tabs to see if everything looks correct (1825).

Figure 35:
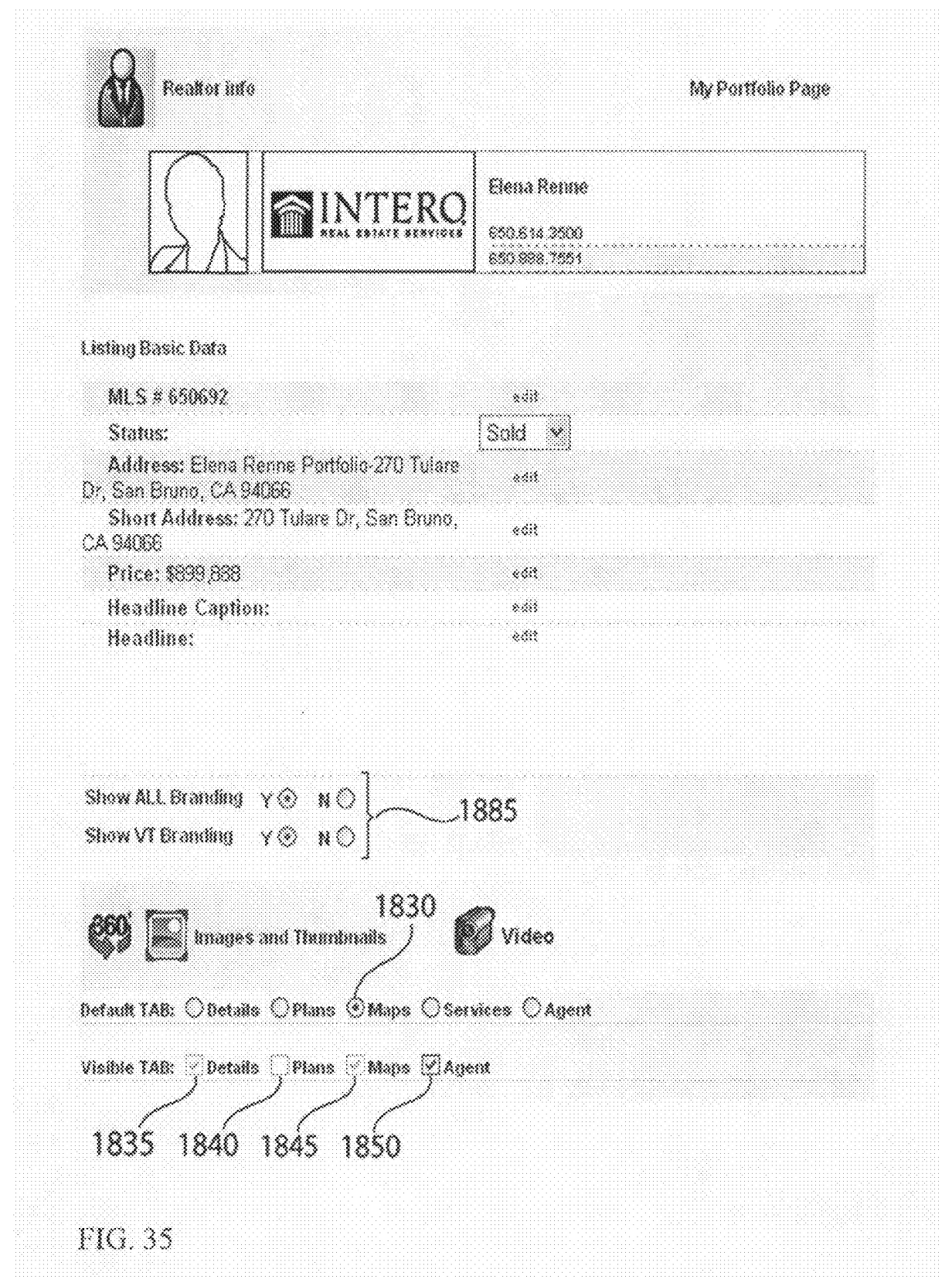

FIG. 35 shows an example of a virtual tour listing summary page with Maps selected as the Default Tab 1830. Also shown is an indicator of visible tabs showing that Details 1835 and Maps 1845 are set to visible—this is a result of these tabs containing at least one sub tab with information loaded; Plans 1840 is set to not visible—this is a result of these tabs containing no sub tabs with information loaded. Agent 1840 is set to visible—this is a result of these tabs containing at least one sub tab with information loaded. Agent may also be disabled manually and may be used in conjunction with "No Branding" radio buttons 1885 that may be used to hide either Agent or Tour operator branding, or both, from appearing in the tour.

FIG. 36 shows a portion of the virtual tour listing summary, showing the Agent Tab 300 sub tab controls and status. In addition to the features described above, this screen may further comprise one or more of the following: Email me sub tab controls and information 1890, Email friend sub tab controls and information 1895, Audio Intro sub tab controls and information 1900, Video intro sub tab controls and information 1905, My Portfolio sub tab controls and information 1910, Agency listings sub tab controls and information 1915, My Area Map sub tab controls and information 1920.

Figure 37:
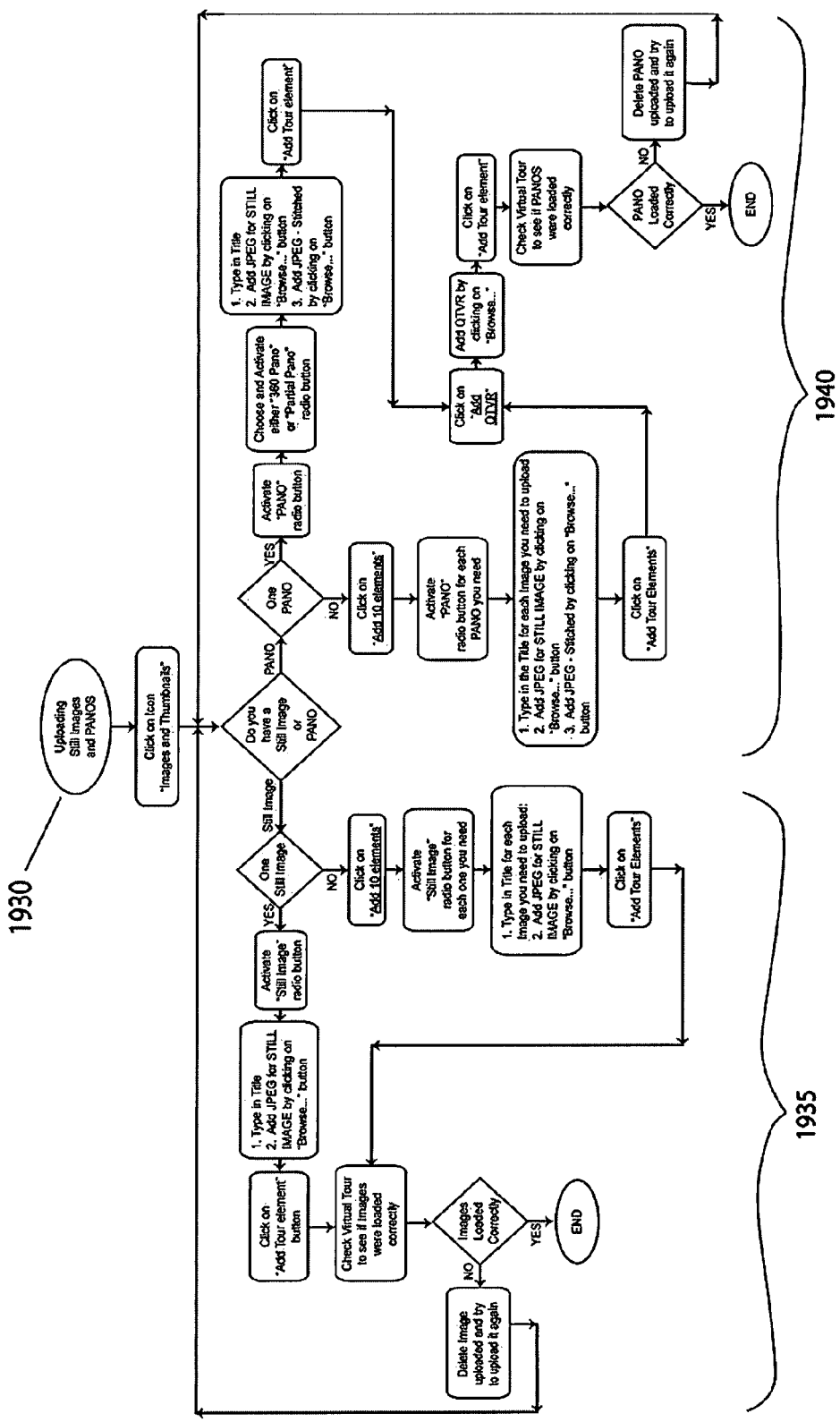

FIG. 37 depicts an example of a basic flow for loading still photographs or panoramic images into a tour 1930. The image uploading method generally comprises steps of uploading one or more, still photographs 1935; and may include uploading one or more panoramic images 1940.

Figure 38:
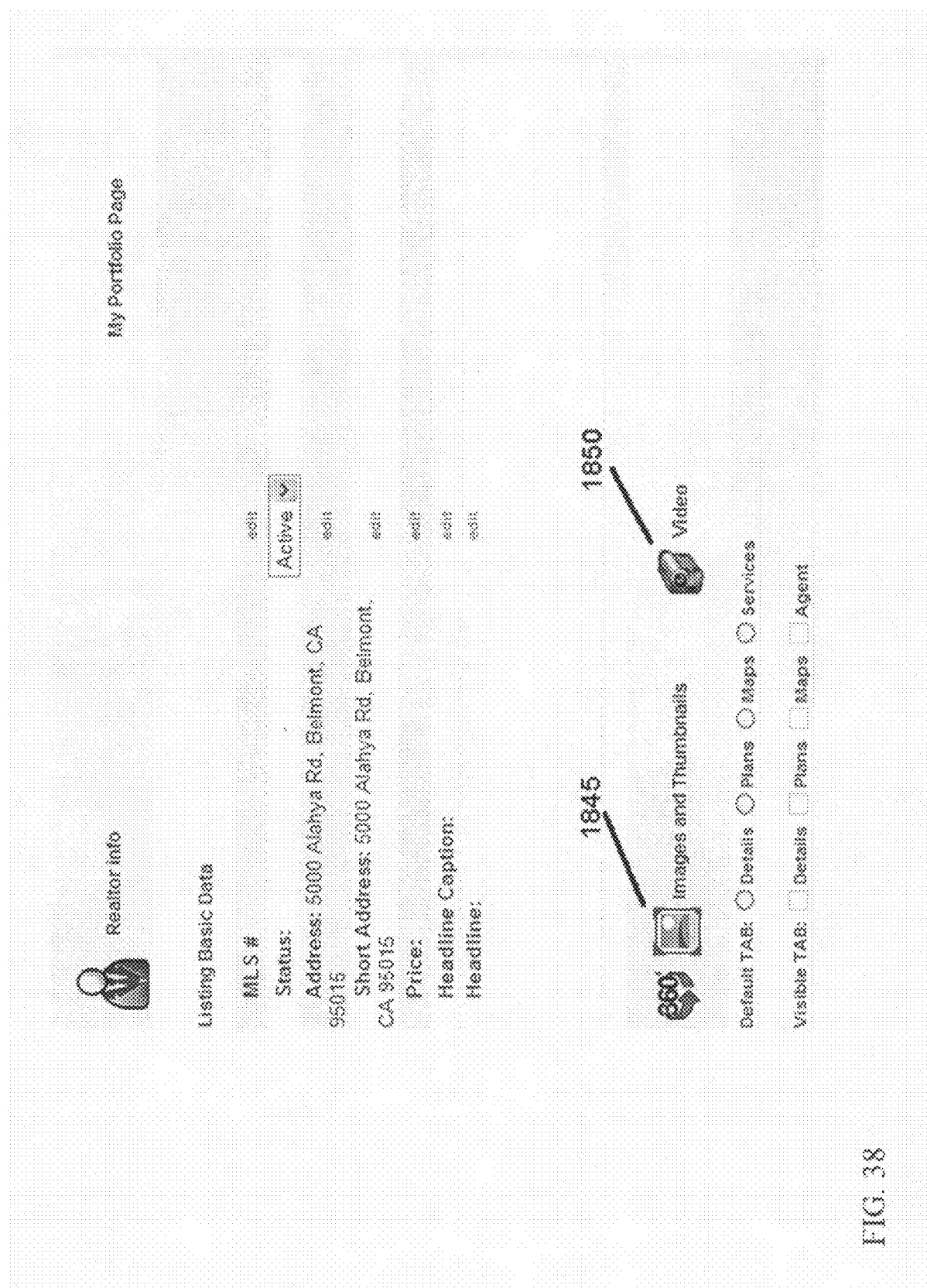
Figure 39:
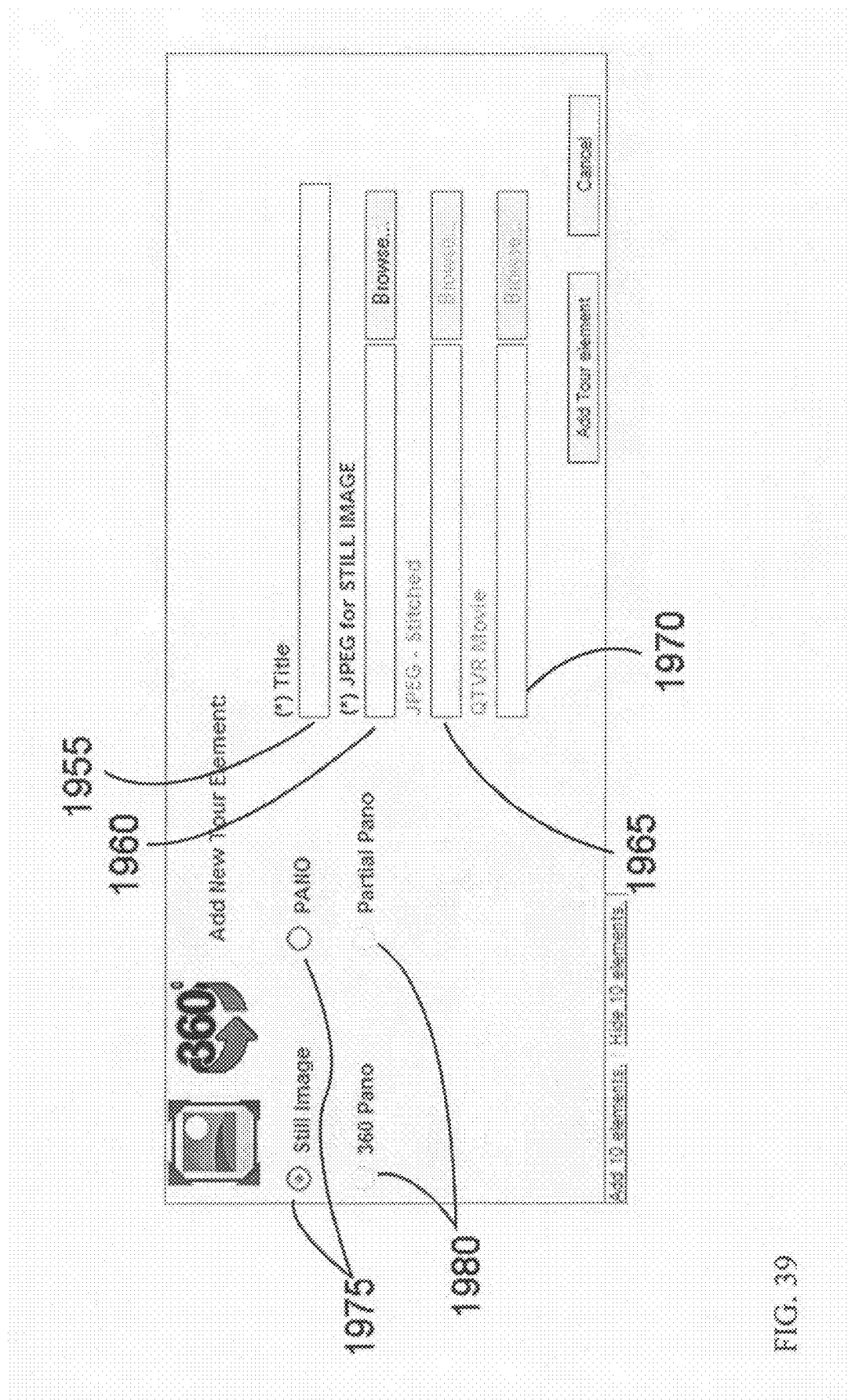

FIG. 38 shows an example of a virtual tour listing summary page, with buttons for selecting to upload still photographs and panoramic images and video files 1950 into a tour FIG. 39 shows an example of a data entry screen for loading a single still photograph or panoramic image to a tour. In addition to the features described above, this screen may further comprise one or more of the following: an image title field 1955, an image file field 1960, an stitched panoramic image file field 1965, an Quicktime panoramic image file field 1970, radio button controls for specifying whether the image is a still photograph or a panoramic image 1975, radio button controls for specifying whether a panoramic image is a full panoramic image or a partial panoramic image 1980.

Figure 40:
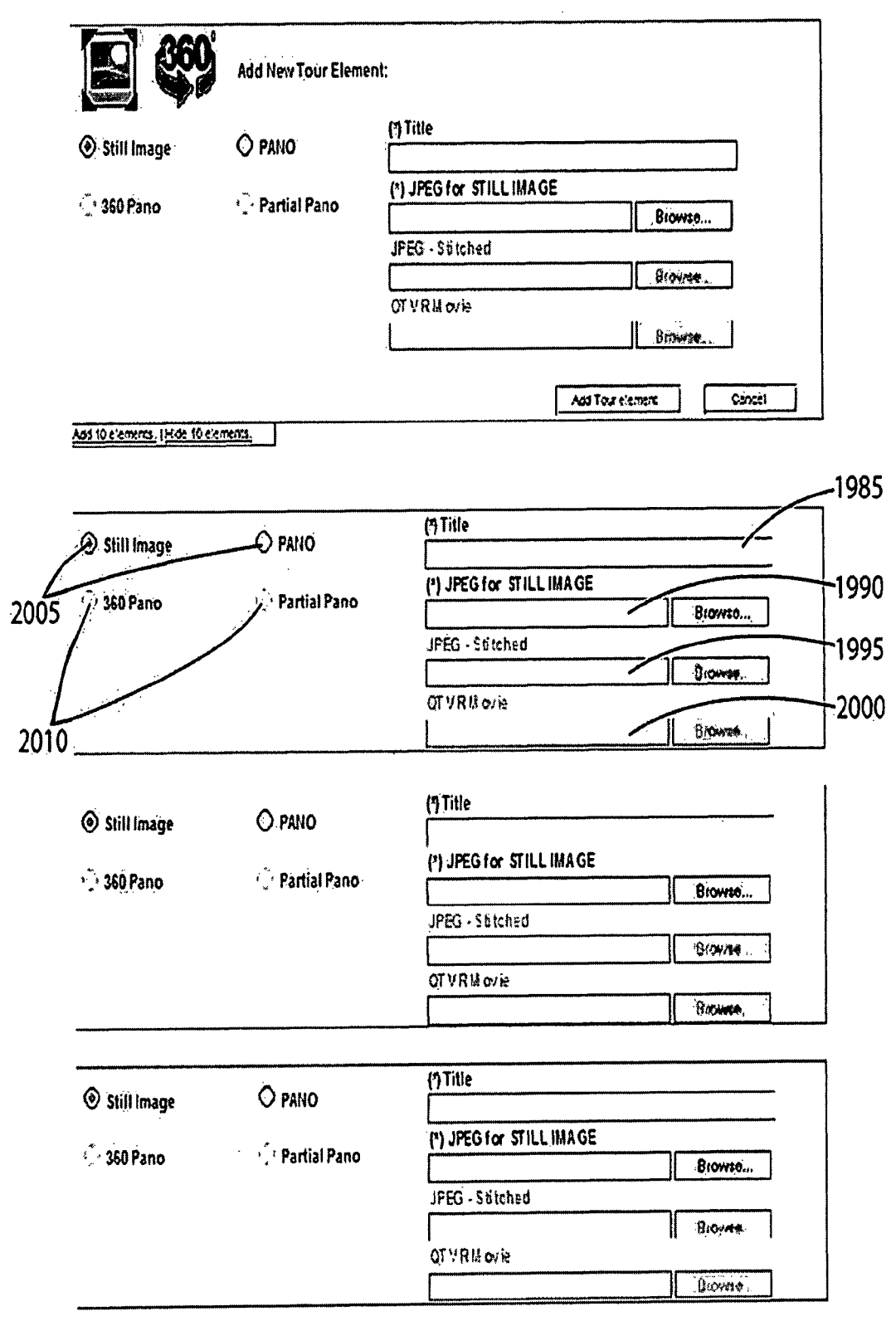

FIG. 40 shows an example of a data entry screen for loading a multiple still photograph or panoramic image to a tour in a batch. In addition to the features described above, this screen may further comprise one or more of the following: an image title field 1985, an image file field 1990, an stitched panoramic image file field 1995, an QuickTime panoramic image file field 2000, radio button controls for specifying whether the image is a still photograph or a panoramic image 2005, radio button controls for specifying whether a panoramic image is a full panoramic image or a partial panoramic image 2010.

Figure 41:
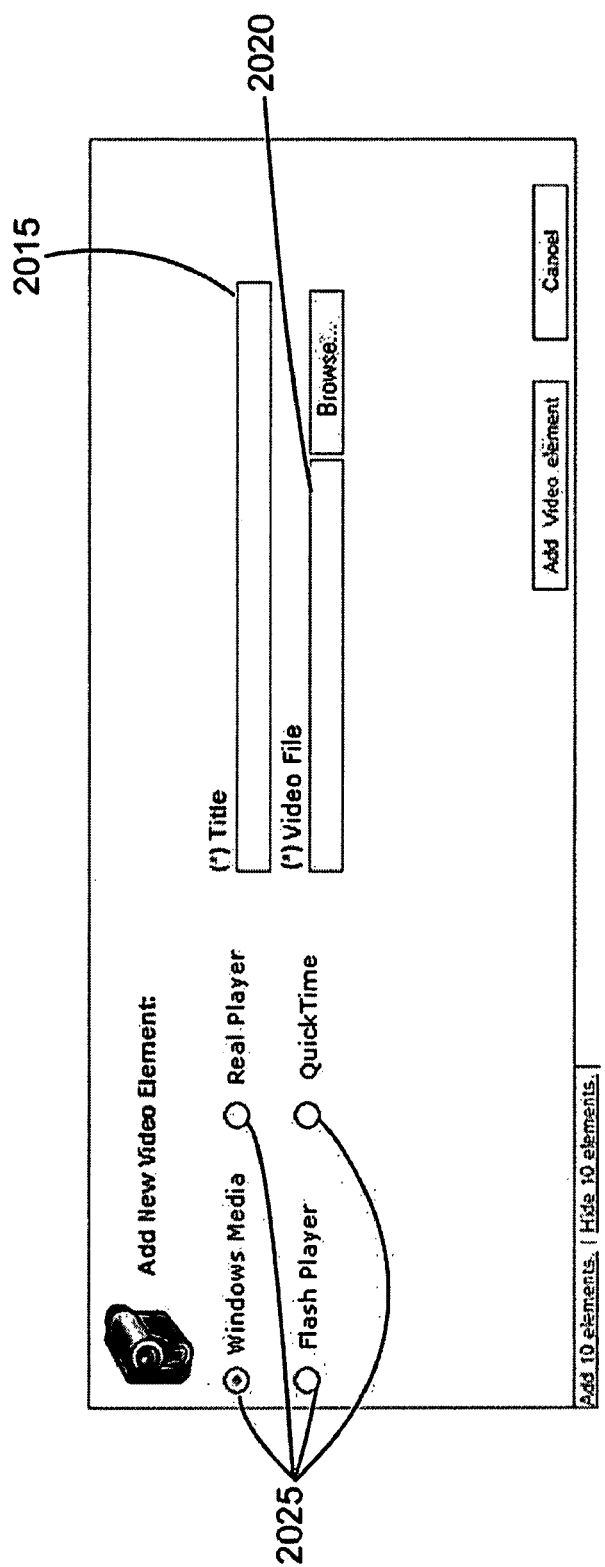

FIG. 41 shows an example of a data entry screen for loading a single Video file into a tour. In addition to the features described above, this screen may further comprise one or more of the following: a video image title field 2015, a video file field 2020, radio button controls for specifying the file format of the Video file 2025.

Figure 42:
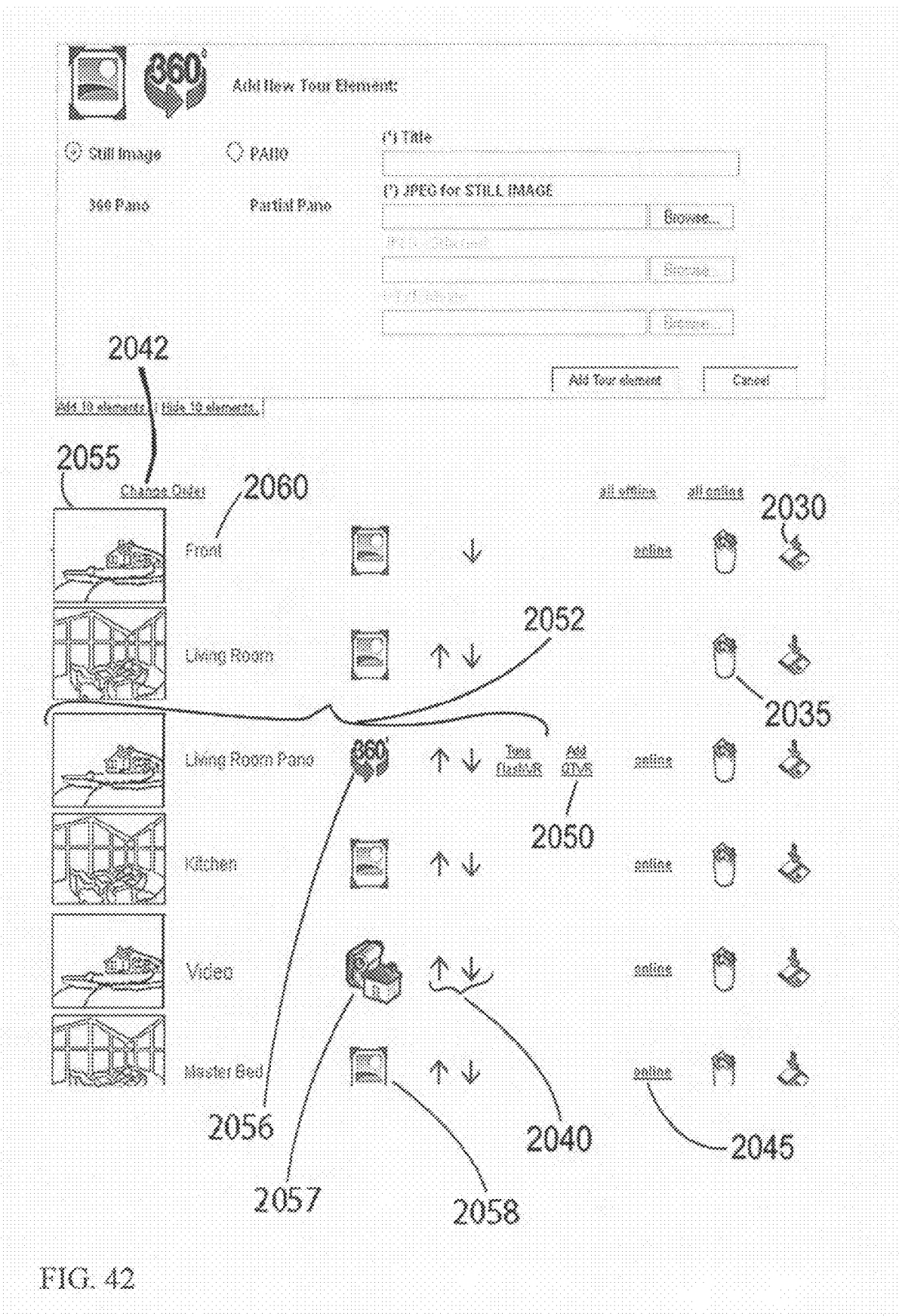

FIG. 42 shows an example of a data entry screen for loading a single still photograph or panoramic image to a tour after one or more still photographs, one or more panoramic images, one or more video images have been loaded to a tour. In addition to the features described above, this screen may further comprise one or more of the following: image download button 2030, a trash can button for deleting an image 2035, a positioning control to move the image up or down in the order 2040, an online/offline indicator 2045 an Add QTVR link 2050 for adding Quicktime file format panoramas to an existing panorama that is in a different file format 2052, a thumbnail image a representation of the full-sized image 2055, image title 2060, a panoramic image indicator icon 2056, a video image indicator icon 2057, still photograph image indicator icon 2058.

Figure 43:
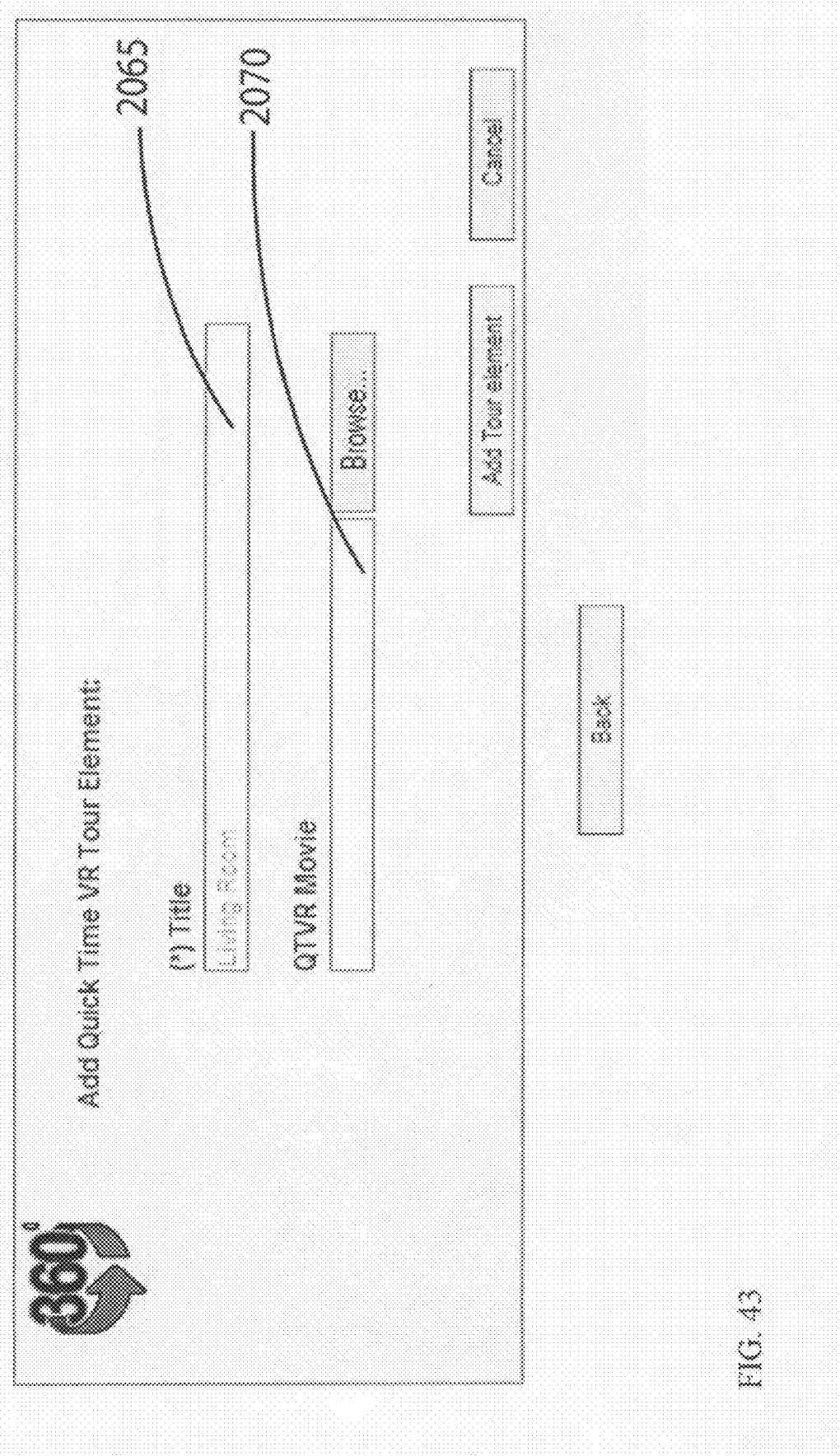

FIG. 43 shows an example of a data entry screen for loading a single QuickTime file format panoramas to an existing panorama that is in a different file format. This screen may be accessed after selecting the Add QTVR link 2050 shown in FIG. 42. In addition to the features described above, this screen may further comprise one or more of the following: a Quicktime VR title field 2065, a Quicktime VR file field 2070.

Figure 44:
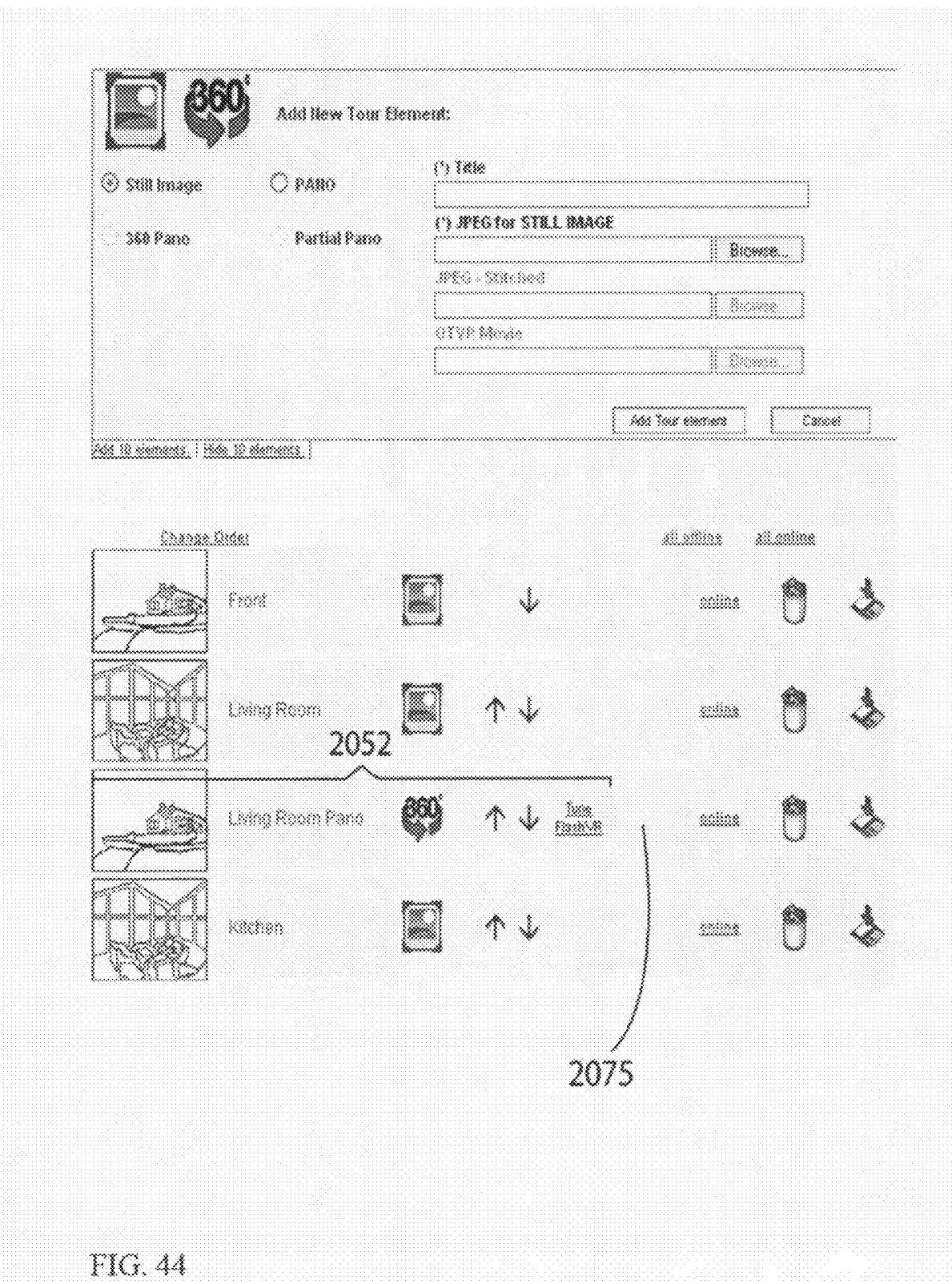

FIG. 44 shows an example of a data entry screen for loading a single still photograph or panoramic image to a tour after one or more still photographs, one or more panoramic images, one or more video images have been loaded to a tour, and after a Quicktime panoramic image has been added to an existing panorama that is in a different file format 2052. The absence of the Add QTVR link 2075, would indicate that this panorama has two versions in different formats loaded.

Figure 45:
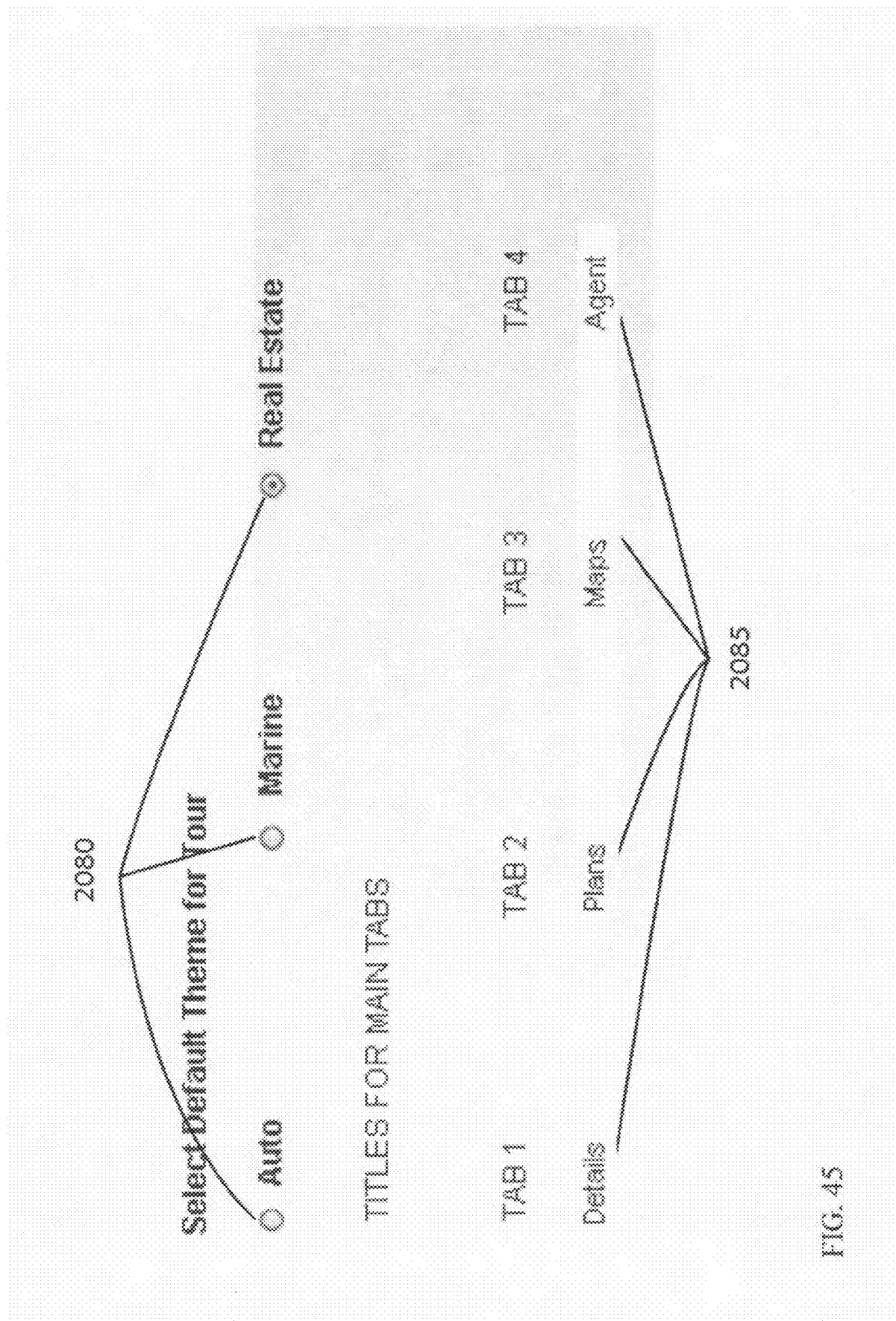

FIG. 45 shows an example of a data entry screen for configuring the general appearance of the GUI to suit different industries including but not limited to Automotive, Marine and Real Estate. By selecting different themes the sub tab icons and default sub tab names may all be altered to be more applicable to the industry theme. In addition to the features described above, this screen may further comprise one or more of the following: radio buttons for selecting an industry theme 2080, links to screens for editing the main tab labels 2085.

Figure 46:
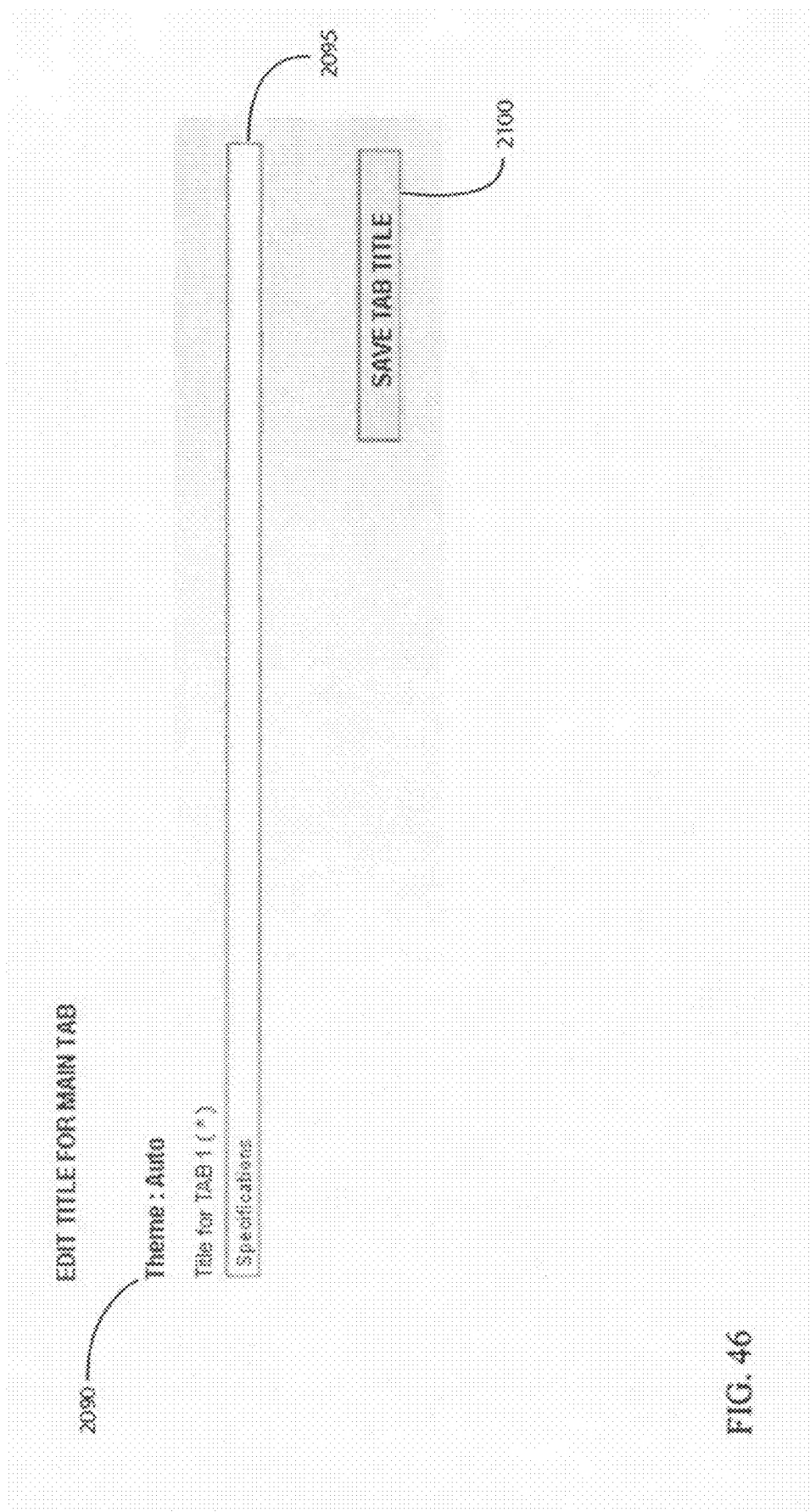

FIG. 46 shows an example of a data for editing the main tab labels 2085. In addition to the features described above, this screen may further comprise one or more of the following: A theme indication field 2090 an entry field for the main tab label 2095, a save tab title 2100 for updating the main tab label that will be displayed.

As has been mentioned above, the present invention utilizes Database Independent Architecture utilizing an XML-based separation layer, making it possible to feed information into the unified single-window viewing system from one or more databases owned or controlled by different entities. XML files are used to describe the source of all data, and the attributes and configuration options that have been set for a tour. Multiple XML files may be used to describe different sets of information that is displayed in the tour. There may be XML files defining, some of the following sets of information, but not limited to the following sets of information: the colors scheme, Agent information, sub tabs, floor plans and annotation, image files. Below are some examples of such XML files for one listing:

Example XML file, containing but not limited to agent profile information, tour images, supplementary icon information for the listing:

```
<?xml version="1.0" encoding="UTF-8" ?>
- <listing>
- <icons>
   <icon subtab_id="1678" type="icon" src="AddFav_btn" active="false" visible="false" />
   <icon subtab_id="1678" type="icon" src="Print_btn" active="false" visible="false" />
```

```
<icon subtab_id="1678" type="icon" src="SlideShow_btn" active="true" visible="true" />
<icon subtab_id="1678" type="icon" src="SetView_btn" active="false" visible="false" />
<icon subtab_id="1640" type="icon" src="EmailMe_btn" active="false" visible="true" />
<icon subtab_id="1612" type="icon" src="EmailFriend_btn" active="false" visible="true"
  />
<icon subtab_id="163" type="icon" src="MyWebsite_btn" active="true" visible="true" />
<icon subtab_id="1742" type="icon" src="ScheduleVisit_btn" active="true" visible="true"
  url="MyProfile.php?ID=387a0423" />
<icon subtab_id="1678" type="icon" src="PropertySearch_btn" active="false"
  visible="true" />
<icon subtab_id="1678" type="icon" src="AgentSearch_btn" active="false" visible="true"
  />
<icon subtab_id="1678" type="icon" src="flyers_btn" active="false" visible="true" />
<icon subtab_id="1678" type="icon" src="map_btn" active="true" visible="true" />
<icon subtab_id="1678" type="icon" src="Schools_btn" active="true" visible="true" />
<icon subtab_id="1678" type="icon" src="GetDisclosures_btn" active="false"
  visible="true" />
<icon subtab_id="1678" type="icon" src="NavLeft_btn" active="false" visible="false" />
<icon subtab_id="1678" type="icon" src="details_btn" active="false" visible="false" />
<icon subtab_id="1678" type="icon" src="NavRight_btn" active="false" visible="false" />
  </icons>
<realtor>
  <id>182</id>
  <name>
  <![CDATA[
Bonnie Newson
  ]]>
  </name>
  <email>
  <![CDATA[
bnewson@apr.com
  ]]>
  </email>
  <direct>650.543.1202</direct>
  <mobile>650.888.0846</mobile>
<photo state="vtapproved">
  <img
    src="/listing/Realtor/mug/b93e662b3e5e06be3555e0e087a2acb8Bonnie_Newson.jpg" />
  </photo>
<banner state="vtapproved">
  <img src="/listing/Realtor/logo/0e7c7d6c41c76b9ee6445ae01cc0181dAPR-
    black.jpg" href="http://www.bonnienewson.com" />
  </banner>
  <state>down</state>
  <realtorWeb>http://www.bonnienewson.com</realtorWeb>
  <phone>650.462.1111</phone>
  </realtor>
<vt>
  <img src="/sikjd" href="http://www.bonnienewson.com" />
  </vt>
<profile>
<![CDATA[
Selected Panelist at the 2004 Christie's Great Estates Conference<BR>- Alain
  Pinel Realtors #2 Ranking Agent, 2003<BR>- Alain Pinel Realtors #2 Ranking
  Agent, 2002 <BR>- Recipient of the Silicon Valley / San Jose Business
  Journal's Top Residential Real Estate Agent Award, 2002<BR>- Alain Pinel
  Realtors #3 Ranking Agent, 2001<BR>- Recipient of the Silicon Valley / San
  Jose Business Journal's Top Residential Real Estate Agent Award, 2001<BR>-
  Alain Pinel Realtors #4 Ranking Agent, 2000<BR>- Recipient of the Silicon
  Valley / San Jose Business Journal's Top Residential Real Estate Agent Award,
  2000<BR>- Coldwell Bankers 6th Top United States Residential Real Estate
  Producer, 1999<BR>- Coldwell Bankers 9th Top Worldwide Residential Real
  Estate Producer, 1999<BR>- Recipient of the Silicon Valley / San Jose
  Business Journal's Top Residential Real Estate Agent Award, 1999<BR><BR>With
  over $850 million in residential real estate transactions, Bonnie Newson
  achieves results that speak for themselves. But it's the extra personal
  efforts, the reassuring manner, and the conscientious eye for detail that
  have shaped her reputation in high-end residential sales. Bonnie builds her
  business around her clients' objectives - making her personalized service a
  direct reflection of the families and individuals she serves in the San
  Francisco Bay area's most desirable neighborhoods. With a unique marketing
  strategy for every transaction, Bonnie and her team provide a distinct
  advantage in the robust, highly competitive markets of San Mateo and Santa
  Clara counties.<BR><BR>Bonnie's success is founded on a strong team identity.
  Bonnie support team includes two full-time associates who bring invaluable
  marketing and escrow support service. In addition, Bonnie retains the
  services of a professional marketing firm to ensure the quality and impact of
  all her advertising and property marketing pieces. These assets, combined
  with her extensive channels of buyers and sellers, give Bonnie's clients the
```

-continued

```
      very finest real estate service available. Bonnie's status as a leader in the
      industry is a great networking advantage, as she is in close contact with the
      Bay area's top real estate professionals on a daily basis.<BR><BR>Like the
      communities she serves, Bonnie adopts the latest technologies for maximum
      productivity. Her Web site at www.bonnienewson.com is an excellent resource
      for buyers and sellers, showcasing her listings for optimum exposure. From
      interactive virtual property tours, to vital community information, the site
      is another indication of Bonnie's up-to-the-minute capabilities. Bonnie
      specializes in residential real estate sales in the communities of Atherton,
      Menlo Park, Palo Alto, Woodside, Portola Valley, Los Altos, and Los Altos
      Hills. Bonnie has consistently been ranked among the top 1% of real estate
      agents in the Bay Area. <BR><BR>Bonnie publishes a Referral Directory of
      reputable service professionals for the convenience of her clients and
      community. Whatever your real estate needs, she is always accessible and
      ready to craft a winning sales strategy.
      ]]>
      </profile>
- <tours>
- <tour>
      <title>Backyard</title>
-   <mmo state="vtapproved" type="image" altType="">
      <id altId="0">6880</id>
      <src altSrc="">/listing/400/Tours/Backyard/11_backyard_a</src>
      <tnsrc>/listing/400/Tours/Backyard/Thumbnail/11_Backyard_A.jpg</tnsrc>
      </mmo>
      </tour>
- <tour>
      <title>Front</title>
-   <mmo state="vtapproved" type="image" altType="">
      <id altId="1">6871</id>
      <src altSrc="">/listing/400/Tours/Front/01_front</src>
      <tnsrc>/listing/400/Tours/Front/Thumbnail/01_Front.jpg</tnsrc>
      </mmo>
      </tour>
- <tour>
      <title>Entry</title>
-   <mmo state="vtapproved" type="image" altType="">
      <id altId="2">6907</id>
      <src altSrc="">/listing/400/Tours/Entry/14_entry_a</src>
      <tnsrc>/listing/400/Tours/Entry/Thumbnail/14_Entry_A.jpg</tnsrc>
      </mmo>
      </tour>
- <tour>
      <title>Living Room</title>
-   <mmo state="vtapproved" type="image" altType="">
      <id altId="3">6872</id>
      <src altSrc="">/listing/400/Tours/Living Room/02_living</src>
      <tnsrc>/listing/400/Tours/Living Room/Thumbnail/02_Living.jpg</tnsrc>
      </mmo>
      </tour>
- <tour>
      <title>Dining Room</title>
-   <mmo state="vtapproved" type="image" altType="">
      <id altId="4">6873</id>
      <src altSrc="">/listing/400/Tours/Dining Room/03_dining</src>
      <tnsrc>/listing/400/Tours/Dining Room/Thumbnail/03_Dining.jpg</tnsrc>
      </mmo>
      </tour>
- <tour>
      <title>Dining Room 360</title>
-   <mmo state="vtapproved" type="QTVR" altType="FVR">
      <id altId="5">7914</id>
      <src altSrc="/listing/400/QTVR/Dining Room
      360/flashvr.xml">/listing/400/QTVR/Dining Room 360/Dining Room
      360_auto.mov</src>
      <tnsrc>/listing/400/QTVR/Dining Room 360/Thumbnail/Dining 360
      Thumb.jpg</tnsrc>
      </mmo>
      </tour>
- <tour>
      <title>Kitchen</title>
-   <mmo state="vtapproved" type="image" altType="">
      <id altId="6">6874</id>
      <src altSrc="">/listing/400/Tours/Kitchen/04_kitchen_a</src>
      <tnsrc>/listing/400/Tours/Kitchen/Thumbnail/04_Kitchen_A.jpg</tnsrc>
      </mmo>
      </tour>
- <tour>
      <title>Kitchen 360</title>
```

```
-continued

<mmo state="vtapproved" type="QTVR" altType="FVR">
    <id altId="7">7915</id>
    <src altSrc="/listing/400/QTVR/Kitchen
        360/flashvr.xml">/listing/400/QTVR/Kitchen 360/Kitchen 360_auto.mov</src>
    <tnsrc>/listing/400/QTVR/Kitchen 360/Thumbnail/360 Kitchen thumb.jpg</tnsrc>
    </mmo>
    </tour>
- <tour>
    <title>Nook</title>
- <mmo state="vtapproved" type="image" altType="">
    <id altId="8">6875</id>
    <src altSrc="">/listing/400/Tours/Nook/04_nook_c</src>
    <tnsrc>/listing/400/Tours/Nook/Thumbnail/04_Nook_C.jpg</tnsrc>
    </mmo>
    </tour>
- <tour>
    <title>Family Room</title>
- <mmo state="vtapproved" type="image" altType="">
    <id altId="9">6876</id>
    <src altSrc="">/listing/400/Tours/Family Room/05_family_a</src>
    <tnsrc>/listing/400/Tours/Family Room/Thumbnail/05_Family_A.jpg</tnsrc>
    </mmo>
    </tour>
- <tour>
    <title>Library</title>
- <mmo state="vtapproved" type="image" altType="">
    <id altId="10">6885</id>
    <src altSrc="">/listing/400/Tours/Library/19_library</src>
    <tnsrc>/listing/400/Tours/Library/Thumbnail/19_Library.jpg</tnsrc>
    </mmo>
    </tour>
- <tour>
    <title>Master Bedroom</title>
- <mmo state="vtapproved" type="image" altType="">
    <id altId="11">6877</id>
    <src altSrc="">/listing/400/Tours/Master Bedroom/06_mbed_a</src>
    <tnsrc>/listing/400/Tours/Master Bedroom/Thumbnail/06_MBed_A.jpg</tnsrc>
    </mmo>
    </tour>
- <tour>
    <title>Master Bath</title>
- <mmo state="vtapproved" type="image" altType="">
    <id altId="12">6878</id>
    <src altSrc="">/listing/400/Tours/Master Bath/07_mbath_a</src>
    <tnsrc>/listing/400/Tours/Master Bath/Thumbnail/07_MBath_A.jpg</tnsrc>
    </mmo>
    </tour>
- <tour>
    <title>Bedroom 2</title>
- <mmo state="vtapproved" type="image" altType="">
    <id altId="13">6879</id>
    <src altSrc="">/listing/400/Tours/Bedroom 2/09_bedroom_2</src>
    <tnsrc>/listing/400/Tours/Bedroom 2/Thumbnail/09_Bedroom_2.jpg</tnsrc>
    </mmo>
    </tour>
- <tour>
    <title>Dance Studio</title>
- <mmo state="vtapproved" type="image" altType="">
    <id altId="14">6883</id>
    <src altSrc="">/listing/400/Tours/Dance Studio/16_dance_studio</src>
    <tnsrc>/listing/400/Tours/Dance Studio/Thumbnail/16_Dance_Studio.jpg</tnsrc>
```

Example XML file, containing but not limited to Tabs and Sub tab configuration for the listing:

Example XML file, containing but not limited to status of annotations for the listing:

```
- <tab id="01" name="Plans">
    <subtab id="08" type="list" title="Upper Level"
        url="/ZoomA1Plans.php?id=400&src=%2Flisting%2F400%2FPlanos%-
        2Fc49b360013e94c4d5e72d5e7cc3742ed%2Fmir_mirou_-
        _main_level_2&zTitle=Upper+Level&Zaddress=13910+Mir+
        Mirou+Dr.%2C+Los+Altos+Hills%2C+CA+94022&annotations=true"
        active="true" checked="true" init="true" anotations="true" />
    <subtab id="09" type="list" title="Lower Level"
```

-continued
```
        url="/ZoomA1Plans.php?id=400&src=%2Flisting%2F400%2FPlanos%-
        2F48abd1b3f5452995d995eb78a77013c8%2Fmir_mirou_-
        _lower_level2&zTitle=Lower+Level&Zaddress=13910+Mir+
        Mirou+Dr.%2C+Los+Altos+Hills%2C+CA+94022&annotations=true"
        active="true" checked="false" init="false" anotations="true" />
    </tab>
    <tab id="02" name="Maps">
        <subtab id="15" type="list" title="Local"
        url="/ZoomA1Maps.php?id=400&src=%2Flisting%2F400%2FMaps%-
        2Ff75b757d3459c3e93e98ddab7b903938%2Fmapimage&zTitle=Local&-
        Zaddress=13910+Mir+Mirou+Dr.%2C+Los+Altos+Hills%-
        2C+CA+94022&annotations=false" active="true"
        checked="true" init="false" anotations="false" />
        <subtab id="16" type="list" title="Aerial"
        url="/ZoomA1Maps.php?id=400&src=%2Flisting%2F400%2FMaps%-
        2Fd3662dfc4a771095bd163ceb31ae6955%2Faerial_of_house&-
        zTitle=Aerial&Zaddress=13910+Mir+Mirou+Dr.%2C+Los+Altos+Hills%-
        2C+CA+94022&annotations=false"
        active="true" checked="false" init="false" anotations="false" />
        <subtab id="17" type="list" title="Schools"
        url="/ZoomA1Maps.php?id=400&src=%2Flisting%2F400%2FMaps%-
        2F5ef20b89bab8fed38253e98a12f26316%2Faerial_of_schools&-
        zTitle=Schools&Zaddress=13910+Mir+Mirou+Dr.%2C+Los+Altos+Hills%-
        2C+CA+94022&annotations=false"
        active="true" checked="false" init="false" anotations="false" />
        <subtab id="18" type="list" title="Highways"
        url="/ZoomA1Maps.php?id=400&src=%2Flisting%2F400%2FMaps%-
        2F7df552440682aa175b6ba97ff4522ad8%2Faerial_of_highways&-
        zTitle=Highways&Zaddress=13910+Mir+Mirou+Dr.%-
        2C+Los+Altos+Hills%2C+CA+94022&annotations=false"
        active="true" checked="false" init="false" anotations="false" />
    </tab>
```

Example XML file, containing but not limited to status of branding options for the listing:

```
<?xml version="1.0" encoding="UTF-8" ?>
<branding>
    <state>down</state>
    <no_agent>0</no_agent>
    <no_branding>0</no_branding>
    <no_all>0</no_all>
</branding>
```

Example XML file, containing but not limited to attributes of the color scheme for the listing:

```
<?xml version="1.0" encoding="UTF-8" ?>
<colors col1="000000" col2="403E3E" col3="D5A010" col4="000000"
    col5="FFFFFF" col6="D5A010" />
```

Example XML file, containing but not limited to basic data information for the listing:

```
<?xml version="1.0" encoding="UTF-8" ?>
<subtab id="" title="Basic Data" Address="13910 Mir Mirou Dr.,
Los Altos Hills, CA
    94022" Price="$ 7,100,000">
    <item title="Offered at:" highlight="true">
    - <![CDATA[
    $7,100,000
    ]]>
    </item>
    <item title="Bedrooms:" highlight="true">
    - <![CDATA[
    4
    ]]>
    </item>
    <item title="Bathrooms:" highlight="true">
    - <![CDATA[
    4 + Bathrooms
    ]]>
    </item>
    <item title="Garage:" highlight="true">
    - <![CDATA[
    3 or More Car
    ]]>
    </item>
    <item title="Approx Living Area:" highlight="true">
    - <![CDATA[
    6000
    ]]>
    </item>
    <item title="Approx Lot Size:" highlight="true">
    - <![CDATA[
    1+ to 2.5 Acres
    ]]>
    </item>
    <item title="MLS #:" highlight="false">
    - <![CDATA[
    661304
    ]]>
    </item>
</subtab>
```

Example XML file, containing but not limited to Tabs abd Sub tab configuration for the listing:

```xml
<?xml version="1.0" encoding="UTF-8" ?>
<tabs address="13910 Mir Mirou Dr., Los Altos Hills, CA 94022" visibleSubtabs="3">
  <tab id="00" name="Details">
    <subtab id="" type="list" title="Basic data"
        url="/A1/Submenus/BasicData.php?id=400&XMLURL=/listing/400/XML/
        basicdata.xml?id=400" active="true" checked="true" init="false" />
    <subtab id="38" type="list" title="Hit Counter"
        url="/A1/Submenus/MyStats.php?id=400&XMLURL=/listing/400/XML/
        bottom.xml&short=13910 Mir Mirou Dr., Los Altos Hills, CA 94022&?id=400" active="true"
        checked="false" init="false" />
  </tab>
  <tab id="01" name="Plans">
    <subtab id="08" type="list" title="Upper Level"
        url="/ZoomA1Plans.php?id=400&src=%2Flisting%2F400%2FPlanos%-
        2Fc49b360013e94c4d5e72d5e7cc3742ed%2Fmir_mirou_-
        _main_level_2&zTitle=Upper+Level&Zaddress=13910+Mir+Mirou+Dr.%-
        2C+Los+Altos+Hills%2C+CA+94022&annotations=true" active="true" checked="true"
        init="true" anotations="true" />
    <subtab id="09" type="list" title="Lower Level"
        url="/ZoomA1Plans.php?id=400&src=%2Flisting%2F400%2FPlanos%-
        2F48abd1b3f5452995d995eb78a77013c8%2Fmir_mirou_-
        _lower_level2&zTitle=Lower+Level&Zaddress=13910+Mir+Mirou+Dr.%-
        2C+Los+Altos+Hills%2C+CA+94022&annotations=true" active="true" checked="false"
        init="false" anotations="true" />
  </tab>
  <tab id="02" name="Maps">
    <subtab id="15" type="list" title="Local"
        url="/ZoomA1Maps.php?id=400&src=%2Flisting%2F400%2FMaps%-
        2Ff75b757d3459c3e93e98ddab7b903938%2Fmapimage&zTitle=Local&-
        Zaddress=13910+Mir+Mirou+Dr.%2C+Los+Altos+Hills%2C+CA+94022&-
        annotations=false" active="true"checked="true" init="false"
        anotations="false" />
    <subtab id="16" type="list" title="Aerial"
        url="/ZoomA1Maps.php?id=400&src=%2Flisting%2F400%2FMaps%-
        2Fd3662dfc4a771095bd163ceb31ae6955%2Faerial_of_house&-
        zTitle=Aerial&Zaddress=13910+Mir+Mirou+Dr.%2C+Los+Altos+Hills%-
        2C+CA+94022&annotations=false"
        active="true" checked="false" init="false" anotations="false" />
    <subtab id="17" type="list" title="Schools"
        url="/ZoomA1Maps.php?id=400&src=%2Flisting%2F400%2FMaps%-
        2F5ef20b89bab8fed38253e98a12f26316%2Faerial_of_schools&-
        zTitle=Schools&Zaddress=13910+Mir+Mirou+Dr.%2C+Los+Altos+Hills%-
        2C+CA+94022&annotations=false"
        active="true" checked="false" init="false" anotations="false" />
    <subtab id="18" type="list" title="Highways"
        url="/ZoomA1Maps.php?id=400&src=%2Flisting%2F400%2FMaps%-
        2F7df552440682aa175b6ba97ff4522ad8%2Faerial_of_highways&-
        zTitle=Highways&Zaddress=13910+Mir+Mirou+Dr.%2C+Los+Altos+Hills%-
        2C+CA+94022&annotations=false"
        active="true" checked="false" init="false" anotations="false" />
  </tab>
  <tab id="04" name="Agent">
    <subtab id="27" type="list" title="My Profile"
        url="/A1/Submenus/MyProfile.php?id=400&XMLURL=/listing/400/XML/
        bottom.xml" active="true" checked="true" init="false" />
  </tab>
</tabs>
```

Example XML file, containing but not limited to Image thumbnails shown in the image navigation section for the listing:

```xml
<?xml version="1.0" encoding="UTF-8" ?>
<thumbnails>
  <thumbnail>
    <id>0</id>
    <type altType="">image</type>
    <title>Backyard</title>
    <src altSrc="">/listing/400/Tours/Backyard/11_backyard_a</src>
    <tnsrc>/listing/400/Tours/Backyard/Thumbnail/11_Backyard_A.jpg</tnsrc>
  </thumbnail>
  <thumbnail>
    <id>1</id>
```

-continued

```
        <type altType="">image</type>
        <title>Front</title>
        <src altSrc="">/listing/400/Tours/Front/01_front</src>
        <tnsrc>/listing/400/Tours/Front/Thumbnail/01_Front.jpg</tnsrc>
    </thumbnail>
    <thumbnail>
        <id>2</id>
        <type altType="">image</type>
        <title>Entry</title>
        <src altSrc="">/listing/400/Tours/Entry/14_entry_a</src>
        <tnsrc>/listing/400/Tours/Entry/Thumbnail/14_Entry_A.jpg</tnsrc>
    </thumbnail>
    <thumbnail>
        <id>3</id>
        <type altType="">image</type>
        <title>Living Room</title>
        <src altSrc="">/listing/400/Tours/Living Room/02_living</src>
        <tnsrc>/listing/400/Tours/Living Room/Thumbnail/02_Living.jpg</tnsrc>
    </thumbnail>
    <thumbnail>
        <id>4</id>
        <type altType="">image</type>
        <title>Dining Room</title>
        <src altSrc="">/listing/400/Tours/Dining Room/03_dining</src>
        <tnsrc>/listing/400/Tours/Dining Room/Thumbnail/03_Dining.jpg</tnsrc>
    </thumbnail>
    <thumbnail>
        <id>5</id>
        <type altType="FVR">QTVR</type>
        <title>Dining Room 360</title>
        <src altSrc="/listing/400/QTVR/Dining Room
            360/flashvr.xml">/listing/400/QTVR/Dining Room 360/Dining Room
            360_auto.mov</src>
        <tnsrc>/listing/400/QTVR/Dining Room 360/Thumbnail/Dining 360
            Thumb.jpg</tnsrc>
    </thumbnail>
    <thumbnail>
        <id>6</id>
        <type altType="">image</type>
        <title>Kitchen</title>
        <src altSrc="">/listing/400/Tours/Kitchen/04_kitchen_a</src>
        <tnsrc>/listing/400/Tours/Kitchen/Thumbnail/04_Kitchen_A.jpg</tnsrc>
    </thumbnail>
    <thumbnail>
        <id>7</id>
        <type altType="FVR">QTVR</type>
        <title>Kitchen 360</title>
        <src altSrc="/listing/400/QTVR/Kitchen
            360/flashvr.xml">/listing/400/QTVR/Kitchen 360/Kitchen 360_auto.mov</src>
        <tnsrc>/listing/400/QTVR/Kitchen 360/Thumbnail/360 Kitchen thumb.jpg</tnsrc>
    </thumbnail>
    <thumbnail>
        <id>8</id>
        <type altType="">image</type>
        <title>Nook</title>
        <src altSrc="">/listing/400/Tours/Nook/04_nook_c</src>
        <tnsrc>/listing/400/Tours/Nook/Thumbnail/04_Nook_C.jpg</tnsrc>
    </thumbnail>
    <thumbnail>
        <id>9</id>
        <type altType="">image</type>
        <title>Family Room</title>
        <src altSrc="">/listing/400/Tours/Family Room/05_family_a</src>
        <tnsrc>/listing/400/Tours/Family Room/Thumbnail/05_Family_A.jpg</tnsrc>
    </thumbnail>
    <thumbnail>
        <id>10</id>
        <type altType="">image</type>
        <title>Library</title>
        <src altSrc="">/listing/400/Tours/Library/19_library</src>
        <tnsrc>/listing/400/Tours/Library/Thumbnail/19_Library.jpg</tnsrc>
    </thumbnail>
    <thumbnail>
        <id>11</id>
        <type altType="">image</type>
        <title>Master Bedroom</title>
        <src altSrc="">/listing/400/Tours/Master Bedroom/06_mbed_a</src>
        <tnsrc>/listing/400/Tours/Master Bedroom/Thumbnail/06_MBed_A.jpg</tnsrc>
    </thumbnail>
```

-continued

```
- <thumbnail>
    <id>12</id>
    <type altType="">image</type>
    <title>Master Bath</title>
    <src altSrc="">/listing/400/Tours/Master Bath/07_mbath_a</src>
    <tnsrc>/listing/400/Tours/Master Bath/Thumbnail/07_MBath_A.jpg</tnsrc>
      </thumbnail>
- <thumbnail>
    <id>13</id>
    <type altType="">image</type>
    <title>Bedroom 2</title>
    <src altSrc="">/listing/400/Tours/Bedroom 2/09_bedroom_2</src>
    <tnsrc>/listing/400/Tours/Bedroom 2/Thumbnail/09_Bedroom_2.jpg</tnsrc>
      </thumbnail>
- <thumbnail>
    <id>14</id>
    <type altType="">image</type>
    <title>Dance Studio</title>
    <src altSrc="">/listing/400/Tours/Dance Studio/16_dance_studio</src>
    <tnsrc>/listing/400/Tours/Dance Studio/Thumbnail/16_Dance_Studio.jpg</tnsrc>
      </thumbnail>
- <thumbnail>
    <id>15</id>
    <type altType="FVR">QTVR</type>
    <title>Pool 360</title>
    <src altSrc="/listing/400/QTVR/Pool 360/flashvr.xml">/listing/400/QTVR/Pool
      360/Pool 360_auto.mov</src>
    <tnsrc>/listing/400/QTVR/Pool 360/Thumbnail/Pool 360 Thumb.jpg</tnsrc>
      </thumbnail>
- <thumbnail>
    <id>16</id>
    <type altType="">image</type>
    <title>Hottub</title>
    <src altSrc="">/listing/400/Tours/Hottub/12_hottub</src>
    <tnsrc>/listing/400/Tours/Hottub/Thumbnail/12_Hottub.jpg</tnsrc>
      </thumbnail>
- <thumbnail>
    <id>17</id>
    <type altType="">image</type>
    <title>Fountain</title>
    <src altSrc="">/listing/400/Tours/Fountain/13_fountain</src>
    <tnsrc>/listing/400/Tours/Fountain/Thumbnail/13_Fountain.jpg</tnsrc>
      </thumbnail>
      </thumbnails>
```

40

Example XML file, containing but not limited to Floorplans and Annotations for the listing:

```
- <ZAS>
    <POI x="0" y="0" zoom="-1" user="Anonymous" date="20060220122026" id="0"
      name="Whole%20Slide" />
    <Note
      text="This%20is%20the%20default%20note%20for%20this%20POI%2E%20%-
      20Please%20edit%20me%2E%20%20I%20cannot%20be%20deleted%2E"
      user="Anonymous" date="20060220122026" id="0" name="Default%20Note" />
    <Label x="0.1872" y="0.0813" zoom="50" xscale="407" yscale="407"
      user="Anonymous" date="20060220122102" id="0" name="Dance%20Studio"
      movieClip="nw%5Fmc"
      url="ZoomB1%2Ephp%3Fsrc%3D%2Flisting%2F400%2FTours%2FDance%20Studio%-
      2F16%5Fdance%5Fstudio" textColor="0" textBackgroundColor="16777215"
      poiID="0" />
      </ZAS>
- <ZAS>
    <POI x="0" y="0" zoom="-1" user="Anonymous" date="20060220120302" id="0"
      name="Whole%20Slide" />
    <Note
      text="This%20is%20the%20default%20note%20for%20this%20POI%2E%20%-
      20Please%20edit%20me%2E%20%20I%20cannot%20be%20deleted%2E"
      user="Anonymous" date="20060220120302" id="0" name="Default%20Note" />
    <Label x="0.0748" y="-0.5799" zoom="50" xscale="229" yscale="229"
      user="Anonymous" date="20060220120336" id="0" name="Backyard"
      movieClip="n%5Fmc"
      url="ZoomB1%2Ephp%3Fsrc%3D%2Flisting%2F400%2FTours%2FBackyard%-
```

-continued

```
2F11%5F%5Fbackyard%5Fa" textColor="0" textBackgroundColor="16777215" poiID="0"
/>
<Label x="-0.4661" y="0.6261" zoom="50" xscale="229" yscale="229"
    user="Anonymous" date="20060220120417" id="1" name="Front"
    movieClip="sw%5Fmc"
    url="ZoomB1%2Ephp%3Fsrc%3D%2Flisting%2F400%2FTours%2FFront%2F01%-
    5Ffront" textColor="0" textBackgroundColor="16777215" poiID="0" />
<Label x="0.0774" y="0.1522" zoom="50" xscale="229" yscale="229"
    user="Anonymous" date="20060220120544" id="2" name="Entry"
    movieClip="s%5Fmc"
    url="ZoomB1%2Ephp%3Fsrc%3D%2Flisting%2F400%2FTours%2FEntry%2F14%-
    5Fentry%5Fa" textColor="0" textBackgroundColor="16777215" poiID="0" />
<Label x="0.009" y="0.212" zoom="50" xscale="229" yscale="229" user="Anonymous"
    date="20060220120639" id="3" name="Living%20Room" movieClip="ne%5Fmc"
    url="ZoomB1%2Ephp%3Fsrc%3D%2Flisting%2F400%2FTours%2FLiving%-
    20Room%2F02%5Fliving" textColor="0" textBackgroundColor="16777215" poiID="0" />
<Label x="-0.0603" y="-0.1277" zoom="50" xscale="229" yscale="229"
    user="Anonymous" date="20060220120700" id="4" name="Dining%20Room"
    movieClip="n%5Fmc"
    url="ZoomB1%2Ephp%3Fsrc%3D%2Flisting%2F400%2FTours%2FDining%-
    20Room%2F03%5Fdining" textColor="0" textBackgroundColor="16777215" poiID="0" />
<Label x="-0.0539" y="0.1087" zoom="50" xscale="229" yscale="229"
    user="Anonymous" date="20060220120853" id="5"
    name="Dining%20Room%20360" movieClip="VR%5Fmc"
    url="QVTRB1%2Ephp%3Fsrc%3D%2Flisting%2F400%2FQTVR%2FDining%-
    20Room%20360%2FDining%20Room%20360%5Fauto%2Emov" textColor="0"
    textBackgroundColor="16777215" poiID="0" />
<Label x="-0.2345" y="0.1092" zoom="50" xscale="229" yscale="229"
    user="Anonymous" date="20060220120940" id="6" name="Kitchen"
    movieClip="e%5Fmc"
    url="ZoomB1%2Ephp%3Fsrc%3D%2Flisting%2F400%2FTours%2FKitchen%-
    2F04%5Fkitchen%5Fa" textColor="0" textBackgroundColor="16777215" poiID="0" />
<Label x="-0.28" y="0.012" zoom="50" xscale="229" yscale="229" user="Anonymous"
    date="20060220121023" id="7" name="Kitchen%20360" movieClip="VR%5Fmc"
    url="QVTRB1%2Ephp%3Fsrc%3D%2Flisting%2F400%2FQTVR%2FKitchen%20360%-
    2FKitchen%20360%5Fauto%2Emov" textColor="0"
    textBackgroundColor="16777215" poiID="0" />
<Label x="-0.4448" y="0.1815" zoom="50" xscale="229" yscale="229"
    user="Anonymous" date="20060220121127" id="8" name="Nook"
    movieClip="sw%5Fmc"
    url="ZoomB1%2Ephp%3Fsrc%3D%2Flisting%2F400%2FTours%2FNook%2F04%-
    5Fnook%5Fc" textColor="0" textBackgroundColor="16777215" poiID="0" />
<Label x="-0.3981" y="-0.2859" zoom="50" xscale="229" yscale="229"
    user="Anonymous" date="20060220121158" id="9" name="Family%20Room"
    movieClip="nw%5Fmc"
    url="ZoomB1%2Ephp%3Fsrc%3D%2Flisting%2F400%2FTours%2FFamily%-
    20Room%2F05%5Ffamily%5Fa" textColor="0" textBackgroundColor="16777215"
    poiID="0" />
<Label x="0.1968" y="0.1815" zoom="50" xscale="229" yscale="229"
    user="Anonymous" date="20060220121238" id="10" name="Library"
    movieClip="n%5Fmc"
    url="ZoomB1%2Ephp%3Fsrc%3D%2Flisting%2F400%2FTours%2FLibrary%-
    2F19%5Flibrary" textColor="0" textBackgroundColor="16777215" poiID="0" />
<Label x="0.2868" y="-0.1962" zoom="50" xscale="229" yscale="229"
    user="Anonymous" date="20060220121318" id="11" name="Master%20Bedroom"
    movieClip="se%5Fmc"
    url="ZoomB1%2Ephp%3Fsrc%3D%2Flisting%2F400%2FTours%2FMaster%-
    20Bedroom%2F06%5Fmbed%5Fa" textColor="0" textBackgroundColor="16777215"
    poiID="0" />
<Label x="0.3858" y="-0.2033" zoom="50" xscale="229" yscale="229"
    user="Anonymous" date="20060220121352" id="12" name="Master%20Bath"
    movieClip="se%5Fmc"
    url="ZoomB1%2Ephp%3Fsrc%3D%2Flisting%2F400%2FTours%2FMaster%-
    20Bath%2F07%5Fmbath%5Fa" textColor="0" textBackgroundColor="16777215" poiID="0"
/>
<Label x="0.3648" y="0.225" zoom="50" xscale="229" yscale="229" user="Anonymous"
    date="20060220121430" id="13" name="Bedroom%202" movieClip="nw%5Fmc"
    url="ZoomB1%2Ephp%3Fsrc%3D%2Flisting%2F400%2FTours%2FBedroom%-
    202%2F09%5Fbedroom%5F2" textColor="0" textBackgroundColor="16777215"
    poiID="0" />
<Label x="-0.1932" y="-0.5087" zoom="50" xscale="229" yscale="229"
    user="Anonymous" date="20060220121559" id="14" name="Pool%20360"
    movieClip="VR%5Fmc"
    url="QVTRB1%2Ephp%3Fsrc%3D%2Flisting%2F400%2FQTVR%2FPool%-
    20360%2FPool%20360%5Fauto%2Emov" textColor="0" textBackgroundColor="16777215"
    poiID="0" />
<Label x="-0.0703" y="-0.7228" zoom="50" xscale="229" yscale="229"
    user="Anonymous" date="20060220121725" id="16" name="Fountain"
    movieClip="s%5Fmc"
```

-continued

```
url="ZoomB1%2Ephp%3Fsrc%3D%2Flisting%2F400%2FTours%2FFountain%-
2F13%5F%5Ffountain" textColor="0" textBackgroundColor="16777215" poiID="0" />
<Label x="0.2529" y="-0.5125" zoom="50" xscale="229" yscale="229"
user="Anonymous" date="20060220121928" id="15" name="Hottub"
movieClip="w%5Fmc"
url="ZoomB1%2Ephp%3Fsrc%3D%2Flisting%2F400%2FTours%2FHottub%-
2F12%5Fhottub" textColor="0" textBackgroundColor="16777215" poiID="0" />
</ZAS>
```

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

What is claimed is:

1. A graphical user interface for a comprehensive user friendly Internet-based multi-media dual-paned virtual tour presentation system having orientational capabilities, the graphical user interface comprising:

an image navigation section;
an image display section; and
a hierarchical information organization and navigation section,
wherein the image navigation section, the image display section and the hierarchical information organization and navigation section are provided on a single computer display screen all visible at the same time, within a visible area of one browser window;
wherein the image display section comprises a selected one of photographic, panoramic image and streaming video display section;
wherein the photographic or panoramic image or streaming video display section displays high definition content;
wherein the image display section comprises a zoom in button, a zoom out button and a multi-directional pan button and an image reset button;
wherein the hierarchical information organization and navigation section comprises a plurality of tabs, wherein each of the plurality of tabs comprises one or more sub tabs;
wherein the hierarchical information organization and navigation section comprises a plan-based navigation system;
wherein the plan-based navigation system comprises a plurality of photograph, panorama or video point of origin and orientation icons;
wherein a corresponding image is displayed in the image display section when one of the plurality of photograph, panorama or video point of origin and orientation icons is selected,
wherein the image navigation section comprises a plurality of thumbnails, wherein the image navigation section comprises a left select button, a slide bar and a right select button,
wherein any on of an image or video file, property data, an interactive floor plan, a map and agent information is accessed with one click,
wherein the graphical user interface simultaneously displays one type of content in the image display section and another type of content in the hierarchical information organization and navigation section,
wherein the hierarchical information organization and navigation section optionally serves as a navigational system for the image display section,
wherein the image navigation section, the image display section and the hierarchical information organization and navigation section display information all visible at the same time, within a visible area of one browser window at one time without the need for scrolling or the generation of new windows,
wherein information from the image navigation section, the image display section and the hierarchical information organization and navigation section display information is accessed with a selected on of one click and one click after dragging a slider;
wherein the image navigation system, the image display section and the hierarchical information organization and navigation section together comprise the dual paned virtual tour presentation system, and
wherein the virtual tour presentation system comprises information relating to a selected one of real estate, boats and cars.

* * * * *